United States Patent
Kurosu et al.

(10) Patent No.: US 10,164,396 B2
(45) Date of Patent: Dec. 25, 2018

(54) LASER UNIT AND NON-TRANSITORY COMPUTER-READABLE STORAGE MEDIUM

(71) Applicant: GIGAPHOTON INC., Tochigi (JP)

(72) Inventors: Akihiko Kurosu, Tochigi (JP); Takashi Matsunaga, Tochigi (JP); Hiroyuki Masuda, Tochigi (JP); Osamu Wakabayashi, Tochigi (JP); Hiroaki Tsushima, Tochigi (JP); Masanori Yashiro, Tochigi (JP); Takeshi Ohta, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/720,122

(22) Filed: Sep. 29, 2017

(65) Prior Publication Data

US 2018/0026414 A1    Jan. 25, 2018

Related U.S. Application Data

(60) Division of application No. 15/144,081, filed on May 2, 2016, now Pat. No. 9,825,417, which is a
(Continued)

(51) Int. Cl.
| | |
|---|---|
| *H01S 3/036* | (2006.01) |
| *H01S 3/097* | (2006.01) |
| *H01S 3/0971* | (2006.01) |
| *H01S 3/104* | (2006.01) |
| *H01S 3/04* | (2006.01) |

(Continued)

(52) U.S. Cl.
CPC ............ *H01S 3/036* (2013.01); *H01S 3/0404* (2013.01); *H01S 3/0971* (2013.01); *H01S 3/09702* (2013.01); *H01S 3/104* (2013.01); *H01S 3/03* (2013.01); *H01S 3/041* (2013.01); *H01S 3/0407* (2013.01); *H01S 3/08009* (2013.01);
(Continued)

(58) Field of Classification Search
CPC ...... H01S 3/036; H01S 3/0404; H01S 3/0971; H01S 3/104; H01S 3/09702; H01S 3/0407; H01S 3/041; H01S 3/2258; H01S 3/1306; H01S 3/08031; H01S 3/134; H01S 3/08009; H01S 3/03
See application file for complete search history.

(56) References Cited

U.S. PATENT DOCUMENTS

| | | | |
|---|---|---|---|
| 5,754,579 A | 5/1998 | Mizoguchi et al. |
| 6,735,236 B2 | 5/2004 | Cybulski et al. |

(Continued)

FOREIGN PATENT DOCUMENTS

| | | | |
|---|---|---|---|
| JP | 01262682 A | * | 10/1989 |
| JP | 401262682 A | * | 10/1989 |

(Continued)

OTHER PUBLICATIONS

International Search Report; PCT/JP2013/079912 dated May 13, 2014.
(Continued)

*Primary Examiner* — Dung Nguyen
(74) *Attorney, Agent, or Firm* — Studebaker & Brackett PC

(57) ABSTRACT

There may be provided a laser unit including a display configured to display one or both of electric power consumed by the laser unit and electric energy consumed by the laser unit.

8 Claims, 39 Drawing Sheets

Related U.S. Application Data continuation of application No. PCT/JP2013/079912, filed on Nov. 5, 2013.

(51) Int. Cl.
| | | |
|---|---|---|
| *H01S 3/03* | (2006.01) |
| *H01S 3/08* | (2006.01) |
| *H01S 3/134* | (2006.01) |
| *H01S 3/13* | (2006.01) |
| *H01S 3/225* | (2006.01) |
| *H01S 3/041* | (2006.01) |

(52) U.S. Cl.
CPC ........... *H01S 3/08031* (2013.01); *H01S 3/134* (2013.01); *H01S 3/1306* (2013.01); *H01S 3/2258* (2013.01)

(56) References Cited

U.S. PATENT DOCUMENTS

| 6,973,111 B2 | 12/2005 | Yamashita et al. |
| 7,835,414 B2 | 11/2010 | Dunstan et al. |
| 2013/0039377 A1 | 2/2013 | Kagiwada et al. |
| 2013/0100980 A1 | 4/2013 | Abe et al. |
| 2013/0226161 A1 | 8/2013 | Hickenbotham |

FOREIGN PATENT DOCUMENTS

| JP | H08-008481 A | 1/1996 |
| JP | H10-173273 A | 6/1998 |
| JP | H11-026838 A | 1/1999 |
| JP | 3773858 A | 2/2006 |
| JP | 2010-519782 A | 6/2010 |
| JP | 2013-38251 A | 2/2013 |

OTHER PUBLICATIONS

An Office Action; "Notification of Reasons for Refusal", issued by the Japanese Patent Office dated Jul. 11, 2017, which corresponds to Japanese Patent Application No. 2015-546175 and is related to U.S. Appl. No. 15/144,081; with English language translation.

\* cited by examiner

LASER UNIT AND NON-TRANSITORY COMPUTER-READABLE STORAGE MEDIUM

CROSS REFERENCE TO RELATED APPLICATIONS

This is a Divisional application of U.S. application Ser. No. 15/144,081 filed May 2, 2016 which is a Continuation application of International Application No. PCT/JP2013/079912 filed Nov. 5, 2013, the entire contents of which are incorporated herein by reference.

BACKGROUND

The disclosure relates to a laser unit and a non-transitory computer-readable storage medium.

With miniaturization and high integration of a semiconductor integrated circuit, improvement of resolution is demanded in a semiconductor exposure apparatus. Hereinafter, the semiconductor exposure apparatus is simply referred to as "exposure apparatus". Shortening of a wavelength of light outputted from an exposure light source is accordingly proceeding. A gas laser unit is used for the exposure light source, in place of an existing mercury lamp. Currently, as a gas laser unit for exposure, a KrF excimer laser unit that outputs ultraviolet rays of a wavelength of 248 nm and an ArF excimer laser unit that outputs ultraviolet rays of a wavelength of 193 nm are used.

As current exposure technology, liquid immersion exposure is practically used in which a clearance between a projection lens on exposure apparatus side and a wafer is filled with a liquid to change a refractive index of the clearance, shortening an apparent wavelength of light from the exposure light source. When the liquid immersion exposure is performed with use of the ArF excimer laser unit as the exposure light source, ultraviolet rays with a wavelength of 134 nm in water is applied to the wafer. This technology is referred to as ArF liquid immersion exposure. The ArF liquid immersion exposure is also referred to as ArF liquid immersion lithography.

Since a spectral line width in free oscillation of the KrF and ArF excimer laser units is wide and about 350 pm to about 400 pm, color aberration of laser light (ultraviolet rays) that is reduced and projected on the wafer by the projection lens on the exposure apparatus side occurs, which results in decrease in resolution. It is therefore necessary to narrow the spectral line width of the laser light outputted from the gas laser unit to an extent that the color aberration is negligible. The spectral line width is also referred to as a spectrum width. A line narrow module including a line narrowing device is thus provided in a laser resonator of the gas laser unit, which achieves narrowing of the spectrum width. Note that examples of the line narrowing device may include an etalon and a grating. The laser unit narrowed in spectrum width in this way is referred to as a line narrowing laser unit. Examples of the technology in this field may include Japanese Patent No. 3773858, U.S. Pat. No. 6,973,111, Japanese Unexamined Patent Application Publication (Translation of PCT Application) No. 2010-519782, U.S. Pat. No. 7,835,414, U.S. Patent Application Publication No. 2013/0100980 specification, and U.S. Pat. No. 6,735,236.

SUMMARY

A laser unit according to an embodiment of the disclosure may include a display configured to display one or both of electric power consumed by the laser unit and electric energy consumed by the laser unit.

A non-transitory computer-readable storage medium according to an embodiment of the disclosure may hold a program that is configured to cause a computer to display, on a display, one or both of electric energy consumed by a laser unit and electric energy consumed by the laser unit.

BRIEF DESCRIPTION OF THE DRAWINGS

Some embodiments of the disclosure are described below as mere examples with reference to the accompanying drawings.

In the drawings, a dashed arrow indicates one or both of input and output of a signal. In the drawings, a solid arrow indicates movement of substance or traveling of light.

DETAILED DESCRIPTION

Figure 1A:
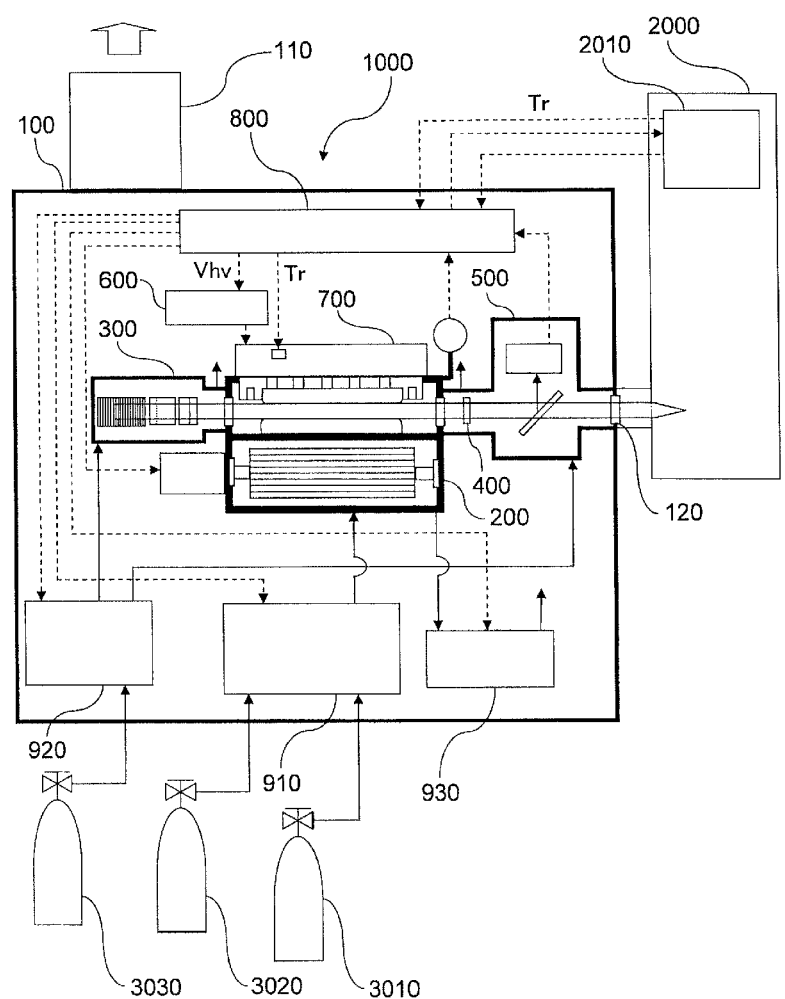
FIG. 1A is a diagram illustrating an entire configuration of a discharge-excited gas laser unit for a semiconductor exposure apparatus.

Contents
1. Outline
2. Laser unit
   2.1 Configuration of laser unit
   2.2 Operation of laser unit
   2.3 Issue of laser unit
3 Laser unit according to first embodiment of disclosure
   3.1 Configuration of laser unit according to first embodiment of disclosure
   3.2 Operation of laser unit according to first embodiment of disclosure
   3.3 Energy saving and resource saving in laser unit according to first embodiment of disclosure
4. Laser unit according to second embodiment of disclosure
   4.1 Configuration and operation of laser unit according to second embodiment of disclosure
   4.2 Energy saving and resource saving in laser unit according to second embodiment of disclosure
5. Others
   5.1 Pulse power module
   5.2 Control section (controller)
   5.3 Computer-readable storage medium In the following, some embodiments of the disclosure are described in detail with reference to the drawings. Embodiments described below each illustrate one example of the disclosure and are not intended to limit the contents of the disclosure. Also, all of the configurations and operations described in each embodiment are not necessarily essential for the configurations and operations of the disclosure. Note that the like elements are denoted with the same reference numerals, and any redundant description thereof is omitted.

1. Outline

An embodiment of the disclosure may relate to a laser unit. An embodiment of the disclosure may relate to a laser unit including a system for energy saving or resource saving.

A laser unit according to an embodiment of the disclosure may be a laser unit for exposure. The laser unit for exposure may be a laser unit for a semiconductor exposure apparatus.

The laser unit according to the embodiment of the disclosure may be a discharge-excited gas laser unit. The discharge-excited gas laser unit may be a unit that applies, for laser oscillation, a predetermined voltage to a pair of electrodes that is disposed in a chamber, to discharge and excite laser gas fed to the chamber.

In the laser unit, energy consumption and resource consumption may occur. The energy consumption in the discharge-excited gas laser unit may include electric power consumption for a charger and a cross flow fan motor that are included in the laser unit. The resource consumption in the discharge-excited gas laser unit may include laser gas consumption, purge gas consumption, cooling water consumption, and exhaust air consumption. The laser gas consumption may include consumption of mixed gas of argon (Ar) and neon (Ne), and consumption of mixed gas of fluorine ($F_2$), argon (Ar), and neon (Ne). The laser gas consumption may include consumption of mixed gas of krypton (Kr) and neon (Ne), and consumption of mixed gas of fluorine ($F_2$), krypton (Kr), and neon (Ne). The purge gas consumption may include nitrogen ($N_2$) gas consumption and helium (He) gas consumption. The cooling water consumption may include consumption of water that cools a charger and a pulse power module that are included in the laser unit, and a heat exchanger included in the chamber. The exhaust air consumption may include consumption of exhaust air for ventilation.

The laser unit may monitor the energy consumption and the resource consumption in the laser unit, and may display the energy consumption and the resource consumption on a display. The display may be included inside the laser unit or may be provided outside the laser unit. The discharge-excited gas laser unit may monitor consumption of the electric power, the laser gas, the purge gas, the cooling water, and the exhaust air, and may display the consumption on the display.

The laser unit may include a system to reduce the energy consumption and the resource consumption in the laser unit.

A method of displaying or calculating the energy consumption and the resource consumption in the laser unit may be recorded in a form of a computer program in a computer-readable storage medium. A method of reducing the energy consumption and the resource consumption in the laser unit may be recorded in a form of a computer program in a computer-readable storage medium.

2. Laser Unit 2.1 Configuration of Laser Unit

Figure 1B:
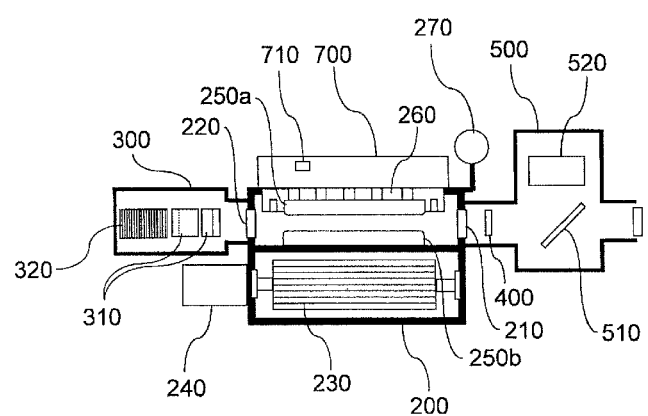
FIG. 1B is a diagram illustrating a part of the configuration of the discharge-excited gas laser unit for a semiconductor exposure apparatus.

FIG. 1A is a diagram illustrating an entire configuration of a discharge-excited gas laser unit for a semiconductor exposure apparatus. FIG. 1B is a diagram illustrating a part of the configuration of the discharge-excited gas laser unit for a semiconductor exposure apparatus.

A laser unit 1000 that is a discharge-excited gas laser unit may be used together with a semiconductor exposure apparatus 2000. Laser light emitted from the laser unit 1000 may enter the semiconductor exposure apparatus 2000. The semiconductor exposure apparatus 2000 may include an exposure apparatus controller 2010. The exposure apparatus controller 2010 may control the semiconductor exposure apparatus 2000.

The laser unit 1000 may include a housing 100. The housing 100 may include a ventilation port 110 and a laser emission window 120. The laser unit 1000 may include, in the housing 100, a chamber 200, a line narrow module (LNM) 300, an output coupling mirror (OC) 400, an energy monitor 500, a charger 600, and a pulse power module (PPM) 700.

The laser unit 1000 may include, in the housing 100, a laser controller 800, a laser gas feeder 910, a purge gas feeder 920, and an exhaust unit 930.

The chamber 200 may include a first window 210, a second window 220, a cross flow fan (CCF) 230, a motor 240, a pair of electrodes 250a and 250b, an electric insulator 260, a pressure sensor 270, and a heat exchanger (not illustrated).

The line narrow module 300 may include two prism beam expanders 310 and a grating 320.

The energy monitor 500 may include a beam splitter 510 and a pulse energy sensor 520.

The pulse power module 700 may include a semiconductor switch 710 and a pulse compression circuit (not illustrated).

The cross flow fan 230 may feed laser gas to a clearance between the pair of electrodes 250a and 250b. The cross flow fan 230 may circulate the laser gas fed in the chamber 200. The motor 240 may rotate the cross flow fan 230.

The pulse power module 700 may be coupled to the first electrode 250a through a feed-through of the electric insulator 260 that is included in the chamber 200. The pulse power module 700 may apply a pulsed voltage between the first electrode 250a and the second electrode 250b.

The output coupling mirror 400 may be a partial reflection mirror. The line narrow module 300 and the output coupling mirror 400 may be so disposed as to configure an optical resonator of the laser unit 1000. The chamber 200 may be disposed on an optical path of the optical resonator.

The two prism beam expanders 310 included in the line narrow module 300 may expand a diameter of the laser light that passes through the second window 220 provided on the chamber 200. The laser light passing through the second window 200 may enter the grating 320 included in the line narrow module 300. The grating 320 may select a wavelength of the laser light. The grating 320 may be provided in Littrow arrangement to allow a diffraction angle of the laser light to be coincident with an incident angle of the laser light.

The beam splitter 510 included in the energy monitor 500 may be disposed on the optical path of the optical resonator. The beam splitter 510 may be disposed to allow part of the laser light that passes through the beam splitter 510 to be outputted through the laser emission window 120. The beam splitter 510 may be disposed to allow part of the laser light reflected by the beam splitter 510 to enter the pulse energy sensor 520 included in the energy monitor 500. The pulse energy sensor 520 may measure the pulse energy of the laser light.

The chamber 200 and the line narrow module 300 may be coupled to each other through a pipe. The chamber 200 and the energy monitor 500 may be coupled to each other through a pipe. The energy monitor 500 and the laser emission window 120 may be coupled to each other through a pipe.

The laser gas feeder 910 may be coupled to each of a first gas cylinder 3010 and a second gas cylinder 3020 through piping. The first gas cylinder 3010 and the second gas cylinder 3020 may be provided outside the laser unit 1000. The first gas cylinder 3010 may contain laser gas containing halogen gas. The laser gas containing halogen gas may be, for example, mixed gas of fluorine ($F_2$), argon (Ar), and neon (Ne). The second gas cylinder 3020 may contain laser gas not containing halogen gas. The laser gas not containing halogen gas may be, for example, mixed gas of argon (Ar) and neon (Ne). The laser gas feeder 910 and the chamber 200 may be coupled to each other through piping. The laser gas feeder 910 may include a valve (not illustrated) and a flow control valve (not illustrated). The laser gas feeder 910 may feed the laser gas from the first gas cylinder 3010 and the laser gas from the second gas cylinder 3020, to the chamber 200.

The purge gas feeder 920 may be coupled to a third gas cylinder 3030 that is provided outside the laser unit 1000, through piping. The third gas cylinder 3030 may contain purge gas. The purge gas may be, for example, one or both of nitrogen ($N_2$) gas and helium (He) gas. The purge gas feeder 920 and the line narrow module 300 may be coupled to each other through piping. The purge gas feeder 920 and the energy monitor 500 may be coupled to each other through piping. The purge gas feeder 920 may include a valve (not illustrated) and a flow control valve (not illustrated). The purge gas feeder 920 may feed the purge gas from the third gas cylinder 3030 to the line narrow module 300 and the energy monitor 500.

The exhaust unit 930 may be coupled to the chamber 200 through piping. The exhaust unit 930 may exhaust at least part of the laser gas in the chamber 200 from the chamber 200. The exhaust unit 930 may include an exhaust pump (not illustrated) and a halogen filter (not illustrated) that removes halogen. The exhaust unit 930 may exhaust the laser gas into the housing 100.

2.2 Operation of Laser Unit

Figure 2:
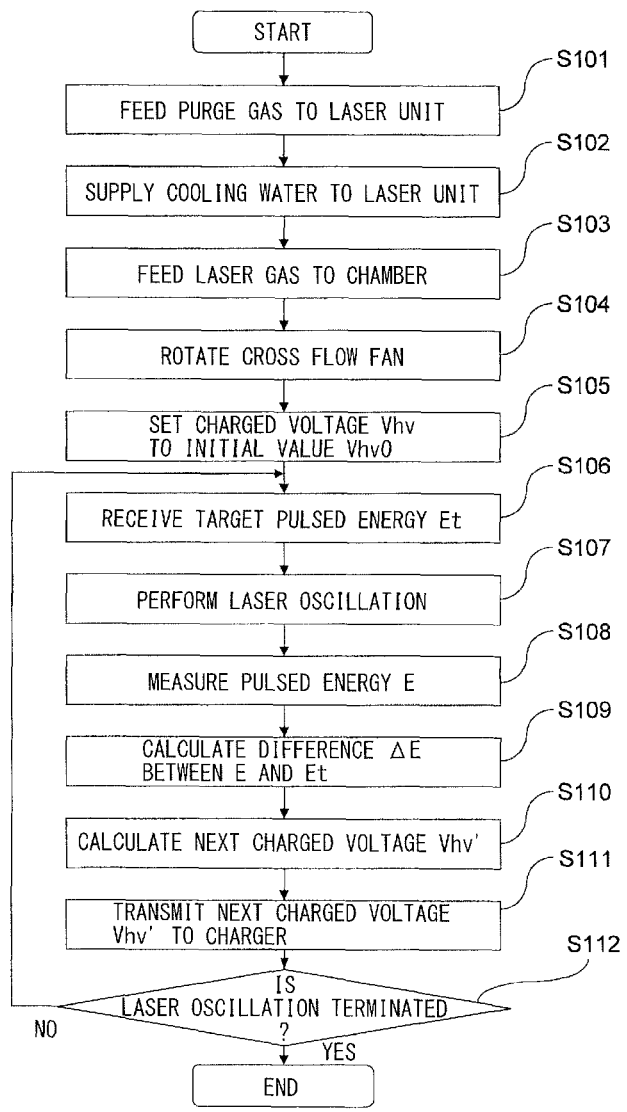
FIG. 2 is a diagram illustrating operation of the discharge-excited gas laser unit for a semiconductor exposure apparatus.

FIG. 2 is a diagram illustrating operation of the discharge-excited gas laser unit for a semiconductor exposure apparatus.

At step S101, the laser controller 800 may feed the purge gas to the line narrow module 300 and the energy monitor 500 through the purge gas feeder 920. Feeding the purge gas to the line narrow module 300 and the energy monitor 500 may suppress contamination of an optical device included in each of the line narrow module 300 and the energy monitor 500.

At step S102, the laser controller 800 may open the valve of the piping (not illustrated) to supply the cooling water to the laser unit 1000.

At step S103, the laser controller 800 may exhaust the laser gas in the chamber 200 through the exhaust unit 930, and may feed the laser gas to the chamber 200 through the laser gas feeder 910. The mixed gas of argon and neon or the mixed gas of fluorine, argon, and neon may be fed as the laser gas into the chamber 200 to obtain a desired composition and entire pressure of the laser gas.

At step 104, the laser controller 800 may rotate the cross flow fan 230 with use of the motor 240. The laser controller 800 may rotate the cross flow fan 230 to feed the laser gas to the clearance between the first electrode 250*a* and the second electrode 250*b*.

At step S105, the laser controller 800 may set a charged voltage Vhv to be applied to the charger 600, to an initial value Vhv0.

At step S106, the laser controller 800 may receive a target pulse energy Et of the laser light from the exposure apparatus controller 2010. The laser controller 800 may transmit data of the charged voltage Vhv to the charger 600 to allow the pulse energy of the laser light to be the target pulse energy Et.

At step S107, the charger 600 may apply the charged voltage Vhv to the pulse power module 700. When a trigger Tr is provided from the exposure apparatus controller 2010 to the laser controller 800, the trigger Tr may be provided from the laser controller 800 to the semiconductor switch 710 of the pulse power module 700 in synchronization with the trigger Tr provided from the exposure apparatus controller 2010. When the semiconductor switch 710 is turned on, a current pulse may be compressed by a magnetic compression circuit included in the pulse power module 700, and a predetermined pulsed voltage may be applied between the first electrode 250*a* and the second electrode 250*b*. As a result, pulsed discharge may occur between the first electrode 250*a* and the second electrode 250*b*, which may result in excitation of the laser gas. The optical resonator including the output coupling mirror 400 and the grating 320 may reduce line width of the laser light, and the pulsed laser light may be outputted from the output coupling mirror 400. The pulsed laser light outputted from the output coupling mirror 400 may enter the energy monitor 500. The laser unit 1000 may perform laser oscillation in such a manner.

At step S108, part of the pulsed laser light entering the energy monitor 500 may be reflected by the beam splitter 510. Pulse energy E of the pulsed laser light that has been reflected by the beam splitter 510 may be measured by the pulse energy sensor 520. Measurement data of the pulse energy E of the pulsed laser light may be transmitted to the laser controller 800.

At step S109, the laser controller 800 may calculate difference $\Delta E = E - Et$ between the target pulse energy Et received from the exposure apparatus controller 2010 and the pulse energy E measured by the pulse energy sensor 520.

At step S110, the laser controller 800 may use the difference $\Delta E$ obtained at the step S109 to calculate next charged voltage Vhv' that is to be transmitted to the charger 600. The next charged voltage Vhv' to be transmitted to the charger 600 may be calculated with use of an expression $Vhv' = Vhv - k \cdot \Delta E$, where k may be a proportionality coefficient.

At step S111, the laser controller 800 may transmit the next charged voltage Vhv' to the charger 600. The laser controller 800 may control the charged voltage Vhv to be transmitted to the charger 600 in this way, to stabilize the pulse energy E to the target pulse energy Et.

At step S112, when the laser oscillation is to be terminated, the laser controller 800 may terminate the control of the laser unit 1000. When the laser oscillation is not to be terminated, the laser controller 800 may proceed to step S106. The laser unit 1000 may output the pulsed laser light by discharge in synchronization with the trigger Tr every time when the laser controller 800 receives the next target pulse energy Et and the trigger Tr is provided to the laser controller 800.

When such output of the pulsed laser light by discharge is repeated, fluorine gas in the laser gas may be consumed and impurity gas may be generated. The laser controller 800 may control the laser gas feeder 910 and the exhaust unit 930 to restock the consumed fluorine gas and to control the concentration of the impurity gas in the laser gas. The fluorine gas in the laser gas that is exhausted through the exhaust unit 930 may be removed by the halogen filter (not illustrated) provided in the exhaust unit 930. The laser gas from which the fluorine gas is removed may be exhausted into the housing 100 through the exhaust unit 930. The laser gas exhausted into the housing 100 may be exhausted to the outside of the laser unit 1000 through the ventilation port 110 and the piping coupled to the ventilation port 110.

2.3 Issue of Laser Unit

In the laser unit 1000, energy consumption and resource consumption may occur. The energy consumed by the laser unit 1000 may include electric power consumed by the charger 600, electric power consumed by the cross flow fan 230, and standby electric power of the laser unit 1000. The resource consumed by the laser unit 1000 may include laser gas such as mixed gas of argon and neon and mixed gas of fluorine, argon, and neon, and purge gas such as nitrogen gas and helium gas. The resource consumed by the laser unit 1000 may include cooling water for the laser unit 1000, such as the cooling water for the heat exchanger included in the chamber 200 and the cooling water for the charger 600 and the pulse power module 700 that are included in the laser unit 1000. The resource consumed by the laser unit 1000 may include the exhaust air for the ventilation of the laser unit 1000.

The laser unit 1000 may measure electric power consumed by the major components of the laser unit 1000 in order to save the energy in the laser unit 1000. The laser unit 1000 may measure the amount of various kinds of laser gas consumed by the laser unit 1000 in order to save the resource in the laser unit 1000. The laser unit 1000 may measure the amount of various kinds of purge gas consumed by the laser unit 1000 in order to save the resource in the laser unit 1000. The laser unit 1000 may measure the amount of the cooling water consumed to cool the major components of the laser unit 1000 in order to save the resource in the laser unit 1000. The laser unit 1000 may measure the amount of the exhaust air consumed by the ventilation of the laser unit 1000 in order to save the resource in the laser unit 1000.

Figure 3:
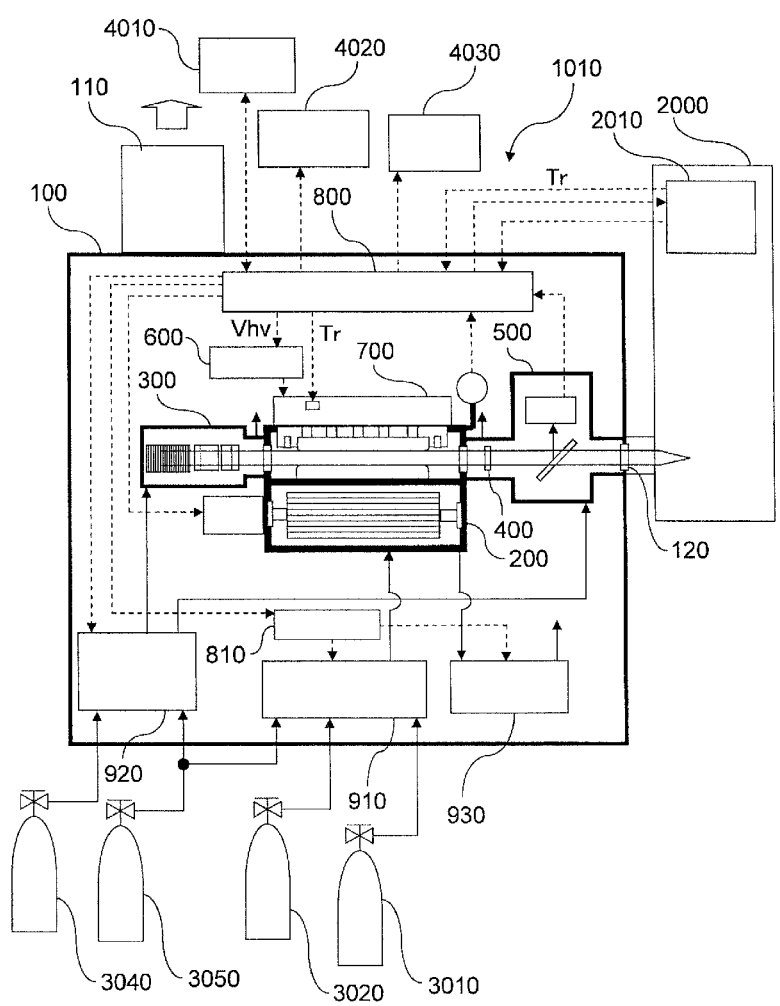
FIG. 3 is a diagram illustrating a schematic configuration of a laser unit according to a first embodiment of the disclosure.

3. Laser Unit According to First Embodiment of Disclosure 3.1 Configuration of Laser Unit According to First Embodiment of Disclosure FIG. 3 is a diagram illustrating a schematic configuration of a laser unit according to a first embodiment of the disclosure. Components of the laser unit illustrated in FIG. 3 substantially same as those of the laser unit illustrated in FIG. 1 are denoted by the same reference numerals, and any redundant description thereof is omitted. Components of a semiconductor exposure apparatus illustrated in FIG. 3 substantially same as those of the semiconductor exposure apparatus illustrated in FIG. 1 are denoted by the same reference numerals, and any redundant description thereof is omitted.

A laser unit 1010 illustrated in FIG. 3 may include a gas controller 810 in the housing 100 in addition to the laser controller 800. The gas controller 810 may be coupled to the laser controller 800. The gas controller 810 may be coupled to the laser gas feeder 910 and the exhaust unit 930. The laser controller 800 may be coupled to the purge gas feeder 920. The laser gas feeder 910 may be controlled by the laser controller 800 through the gas controller 810. The purge gas feeder 920 may be controlled by the laser controller 800. The purge gas feeder 920 may be coupled to the gas controller 810 through the laser controller 800. The exhaust unit 930 may be coupled to the laser controller 800 through the gas controller 810.

The laser unit 1010 illustrated in FIG. 3 may include a fourth gas cylinder 3040 and a fifth gas cylinder 3050 in place of the third gas cylinder 3030 illustrated in FIG. 1. The fourth gas cylinder 3040 may contain first purge gas such as nitrogen gas. The fifth gas cylinder 3050 may contain second purge gas different from the first purge gas, such as helium gas. The fourth gas cylinder 3040 may be coupled to the purge gas feeder 920 through piping. The fifth gas cylinder 3050 may be coupled to the laser gas feeder 910 and the purge gas feeder 920 through piping. Feeding of the first purge gas from the fourth gas cylinder 3040 to the line narrow module 300 and the energy monitor 500 may be controlled by the purge gas feeder 920. Feeding of the second purge gas from the fifth gas cylinder 3050 to the chamber 200 and the energy monitor 500 may be controlled by the laser gas feeder 910.

The laser controller 800 may be coupled to an Internet line 4010, a user interface 4020, and a fault detection and classification (FDC) system 4030 that are provided outside the laser unit 1000. The data received by the laser controller 800 may be transmitted to a computer through the Internet line 4010. The computer may transmit data to the laser controller 800 through the Internet line 4010. The user interface 4020 may include a function of a display that displays the data received by the laser controller 800. The data to be transmitted to the laser controller 800 may be provided to the user interface 4020. The fault detection and classification (FDC) system 4030 may include a function of monitoring states of one or both of the laser unit 1010 and the semiconductor exposure apparatus 2000. When abnormality of the laser unit 1010 is detected, the FDC system 4030 may statistically process the detected abnormality and may classify the detected abnormality. The data received by the laser controller 800 may be transmitted to the FDC system 4030.

Figure 4:
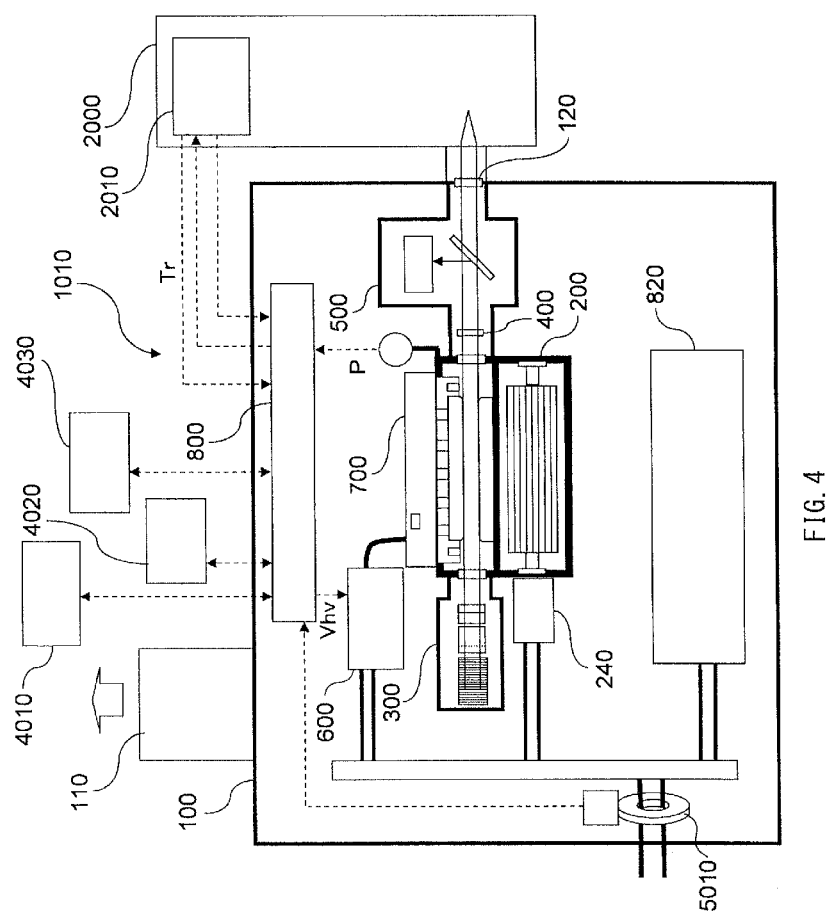
FIG. 4 is a diagram illustrating a configuration of a power system of the laser unit according to the first embodiment of the disclosure.

FIG. 4 is a diagram illustrating a configuration of a power system of the laser unit according to the first embodiment of the disclosure. Components of the laser unit illustrated in FIG. 4 substantially same as those of the laser unit illustrated in FIG. 3 are denoted by the same reference numerals, and any redundant description thereof is omitted. Components of a semiconductor exposure apparatus illustrated in FIG. 4 substantially same as those of the semiconductor exposure apparatus illustrated in FIG. 3 are denoted by the same reference numerals, and any redundant description thereof is omitted.

In the power system of the laser unit 1010, the motor 240, the charger 600, the laser controller 800, and other devices 820 may be coupled to a power source (not illustrated). The other devices 820 may include a controller such as the gas controller 810, and a system holding electric power during standby of the laser unit 1010. The motor 240, the charger 600, the laser controller 800, and the other devices 820 may be supplied with electric power from the power source. The electric power supplied from the power source to the motor 240, the charger 600, the laser controller 800, and the other devices 820 may be measured by a wattmeter 5010. The electric power may be calculated by the laser controller 800. The electric power may be controlled by the laser controller 800.

Figure 5:
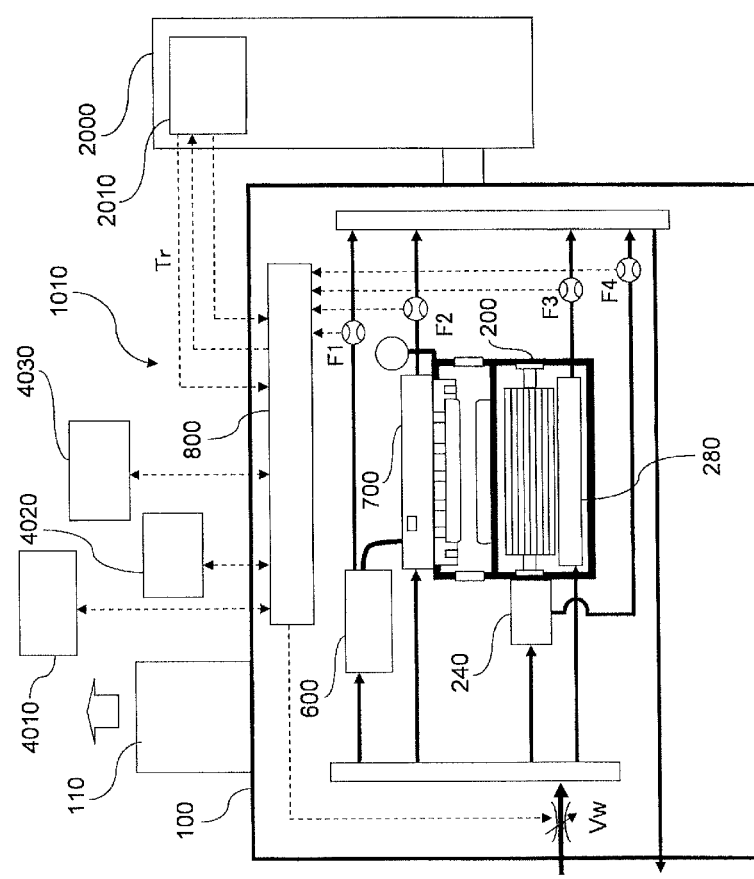
FIG. 5 is a diagram illustrating a configuration of a cooling system of the laser unit according to the first embodiment of the disclosure.

FIG. 5 is a diagram illustrating a configuration of a cooling system of the laser unit according to the first embodiment of the disclosure. Components of the laser unit illustrated in FIG. 5 substantially same as those of the laser unit illustrated in FIG. 3 are denoted by the same reference numerals, and any redundant description thereof is omitted. Components of a semiconductor exposure apparatus illustrated in FIG. 5 substantially same as those of the semiconductor exposure apparatus illustrated in FIG. 3 are denoted by the same reference numerals, and any redundant description thereof is omitted.

In the cooling system of the laser unit 1010, the motor 240, the heat exchanger 280 provided in the chamber 200, the charger 600, and the pulse power module 700 may be coupled to a cooling water tank (not illustrated) through piping. The motor 240, the heat exchanger 280 provided in the chamber 200, the charger 600, and the pulse power module 700 may be supplied with cooling water from the cooling water tank through the piping. The motor 240, the heat exchanger 280, the charger 600, and the pulse power module 700 may be cooled by the cooling water. The cooling water supplied to the motor 240, the heat exchanger 280 provided in the chamber 200, the charger 600, and the pulse power module 700 may be returned to the cooling water tank through the piping. The flow rate of the cooling water supplied to the motor 240, the heat exchanger 280 provided in the chamber 200, the charger 600, and the pulse power module 700 may be controlled by a flow-rate control valve Vw that is provided in the piping. The flow-rate control valve Vw may be controlled by the laser controller 800. The flow rate of the cooling water passing through the charger 600 may be measured by a flowmeter F1. The flow rate of the cooling water passing through the pulse power module 700 may be measured by a flowmeter F2. The flow rate of the cooling water passing through the heat exchanger 280 may be measured by a flowmeter F3. The flow rate of the cooling water passing through the motor 240 may be measured by a flowmeter F4. The flow rates of the cooling water measured by the flowmeters F1, F2, F3, and F4 may be transmitted to the laser controller 800.

Figure 6:
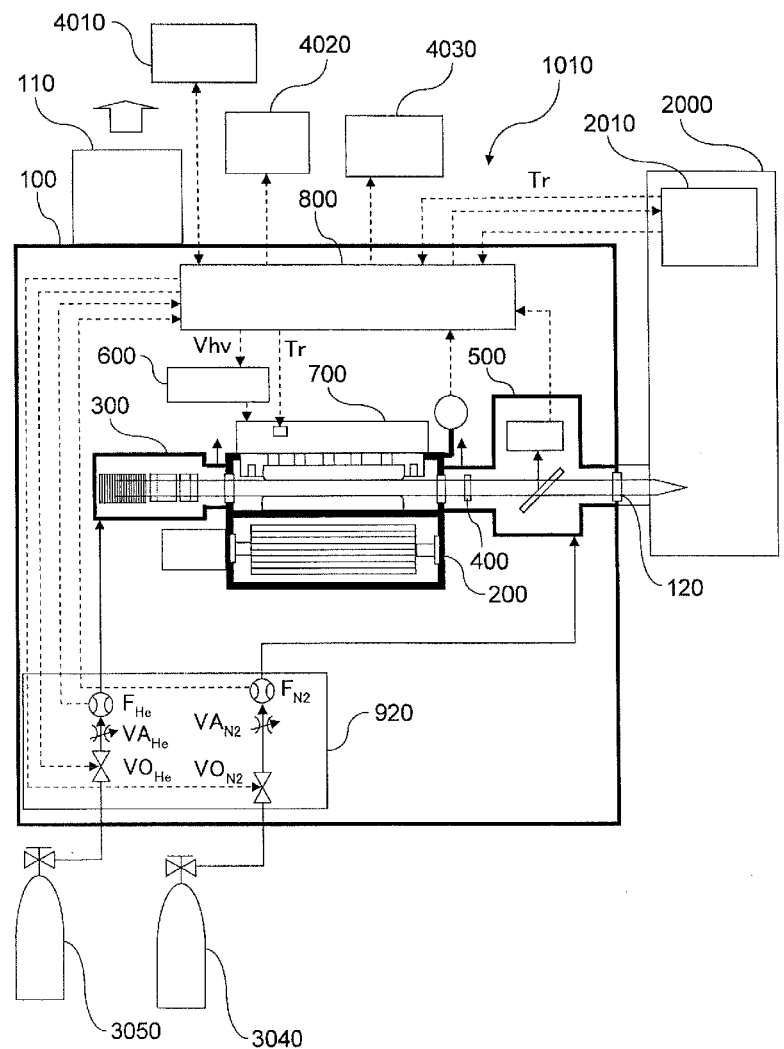
FIG. 6 is a diagram illustrating a configuration of a purge gas system of the laser unit according to the first embodiment of the disclosure.

FIG. 6 is a diagram illustrating a configuration of a purge gas system of the laser unit according to the first embodiment of the disclosure. Components of the laser unit illustrated in FIG. 6 substantially same as those of the laser unit illustrated in FIG. 3 are denoted by the same reference numerals, and any redundant description thereof is omitted. Components of a semiconductor exposure apparatus illustrated in FIG. 6 substantially same as those of the semiconductor exposure apparatus illustrated in FIG. 3 are denoted by the same reference numerals, and any redundant description thereof is omitted.

In the purge gas system of the laser unit 1010, the fourth gas cylinder 3040 containing nitrogen gas and the fifth gas cylinder 3050 containing helium gas may be coupled to the purge gas feeder 920 through piping. The fourth gas cylinder 3040 containing nitrogen gas may be coupled to the energy monitor 500 to feed the nitrogen gas to the energy monitor 500 through the purge gas feeder 920. The optical device included in the energy monitor 500 may be cleaned by the nitrogen gas. The fifth gas cylinder 3050 containing helium gas may be coupled to the line narrow module 300 to feed the helium gas to the line narrow module 300 through the purge gas feeder 920. The optical device included in the line narrow module 300 may be cleaned by the helium gas.

In the purge gas feeder 920, the piping that couples the fourth gas cylinder 3040 to the energy monitor 500 may be provided with a nitrogen gas flowmeter $F_{N2}$, a nitrogen gas flow-rate control valve $VA_{N2}$, and a nitrogen gas system operation valve $VO_{N2}$. The flow rate of the nitrogen gas to be fed to the energy monitor 500 may be measured by the nitrogen gas flowmeter $F_{N2}$. The flow rate of the nitrogen gas to be fed to the energy monitor 500 may be controlled by the nitrogen gas flow-rate control valve $VA_{N2}$. The feeding of the nitrogen gas from the fourth gas cylinder 3040 to the energy monitor 500 may be started or stopped by the nitrogen gas system operation valve $VO_{N2}$. The nitrogen gas flowmeter $F_{N2}$ may be coupled to the laser controller 800, and the flow rate of the nitrogen gas measured by the nitrogen gas flowmeter $F_{N2}$ may be transmitted to the laser controller 800. The nitrogen gas system operation valve $VO_{N2}$ may be coupled to the laser controller 800 and may be controlled by the laser controller 800.

In the purge gas feeder 920, the piping that couples the fifth gas cylinder 3050 to the line narrow module 300 may be provided with a helium gas flowmeter $F_{He}$, a helium gas flow-rate control valve $VA_{He}$, and a helium gas system operation valve $VO_{He}$. The flow rate of the helium gas to be fed to the line narrow module 300 may be measured by the helium gas flowmeter $F_{He}$. The flow rate of the helium gas to be fed to the line narrow module 300 may be controlled by the helium gas flow-rate control valve $VA_{He}$. The feeding of the helium gas from the fifth gas cylinder 3050 to the line narrow module 300 may be started or stopped by the helium gas system operation valve $VO_{He}$. The helium gas flowmeter $F_{He}$ may be coupled to the laser controller 800, and the flow rate of the helium gas measured by the helium gas flowmeter $F_{He}$ may be transmitted to the laser controller 800. The helium gas system operation valve $VO_{He}$ may be coupled to the laser controller 800 and may be controlled by the laser controller 800.

Figure 7:
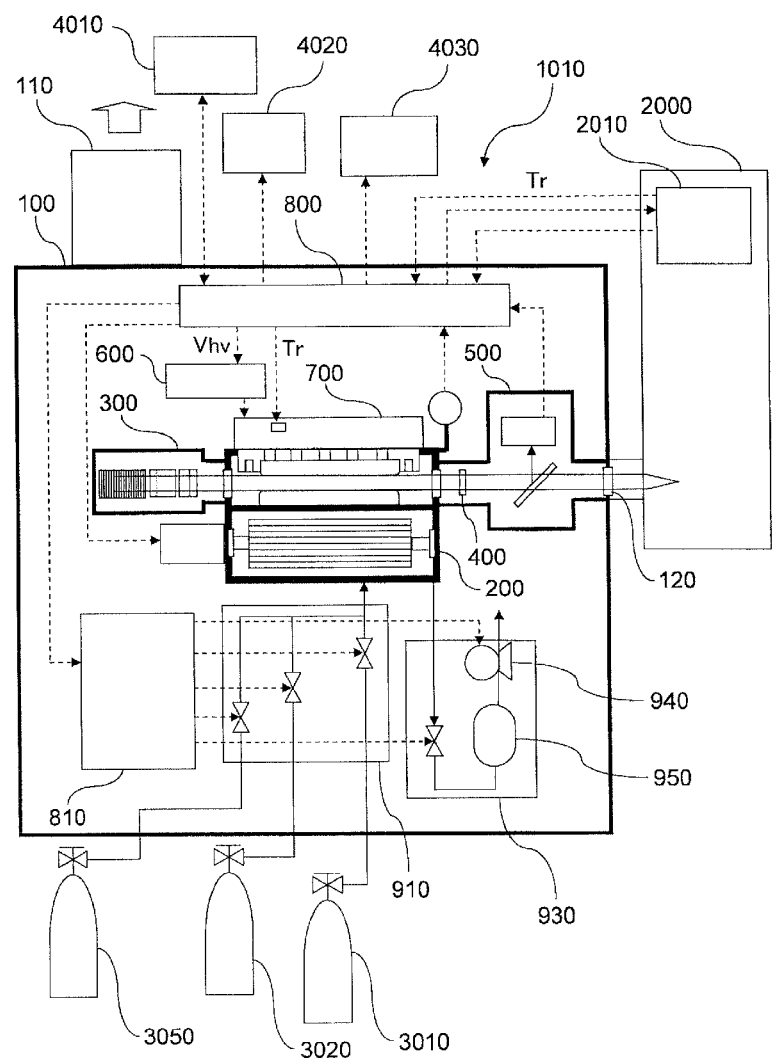
FIG. 7 is a diagram illustrating a configuration of a laser gas system of the laser unit according to the first embodiment of the disclosure.

FIG. 7 is a diagram illustrating a configuration of a laser gas system of the laser unit according to the first embodiment of the disclosure. Components of the laser unit illustrated in FIG. 7 substantially same as those of the laser unit illustrated in FIG. 3 are denoted by the same reference numerals, and any redundant description thereof is omitted. Components of a semiconductor exposure apparatus illustrated in FIG. 7 substantially same as those of the semiconductor exposure apparatus illustrated in FIG. 3 are denoted by the same reference numerals, and any redundant description thereof is omitted.

In the laser gas system of the laser unit 1010, the first gas cylinder 3010, the second gas cylinder 3020, and the fifth gas cylinder 3050 may be coupled to the laser gas feeder 910 through piping. The first gas cylinder 3010 may contain mixed gas of fluorine, argon, and neon. The second gas cylinder 3020 may contain mixed gas of argon and neon. The fifth gas cylinder 3050 may contain helium gas. The first gas cylinder 3010, the second gas cylinder 3020, and the fifth gas cylinder 3050 may be coupled to the chamber 200 through the laser gas feeder 910.

In the laser gas feeder 910, the piping that couples the first gas cylinder 3010 to the chamber 200 may be provided with a gas system operation valve. The feeding of the mixed gas of fluorine, argon, and neon from the first gas cylinder 3010 to the chamber 200 may be started or stopped by the gas system operation valve provided in the piping that couples the first gas cylinder 3010 to the chamber 200. The gas system operation valve provided in the piping that couples the first gas cylinder 3010 to the chamber 200 may be controlled by the gas controller 810.

In the laser gas feeder 910, the piping that couples the second gas cylinder 3020 to the chamber 200 may be provided with a gas system operation valve. The feeding of the mixed gas of argon and neon from the second gas cylinder 3020 to the chamber 200 may be started or stopped by the gas system operation valve provided in the piping that couples the second gas cylinder 3020 to the chamber 200. The gas system operation valve provided in the piping that couples the second gas cylinder 3020 to the chamber 200 may be controlled by the gas controller 810.

In the laser gas feeder 910, the piping that couples the fifth gas cylinder 3050 to the chamber 200 may be provided with a gas system operation valve. The feeding of the helium gas from the fifth gas cylinder 3050 to the chamber 200 may be started or stopped by the gas system operation valve provided in the piping that couples the fifth gas cylinder 3050 to the chamber 200. The gas system operation valve provided in the piping that couples the fifth gas cylinder 3050 to the chamber 200 may be controlled by the gas controller 810.

In the laser gas system of the laser unit 1010, the exhaust unit 930 may be coupled to the chamber 200 through piping. The exhaust unit 930 may be provided to allow the laser gas to be ejected to the inside of the housing 100 through the piping.

In the exhaust unit 930, the piping that couples the exhaust unit 930 to the chamber 200 may be provided with a gas system operation valve. The exhaust of the laser gas from the chamber 200 to the inside of the housing 100 may be started or stopped by the gas system operation valve provided in the piping that couples the exhaust unit 930 to the chamber 200. The gas system operation valve provided in the piping that couples the exhaust unit 930 to the chamber 200 may be controlled by the gas controller 810.

In the exhaust unit 930, the piping that couples the exhaust unit 930 to the chamber 200 may be provided with a vacuum pump 940. The vacuum pump 940 may exhaust the laser gas in the chamber 200 from the chamber 200 to the outside of the chamber 200 through the piping that couples the exhaust unit 930 to the chamber 200. The vacuum pump 940 may be provided at downstream of the gas system operation valve provided in the piping that couples the exhaust unit 930 to the chamber 200. The operation of the vacuum pump 940 may be controlled by the gas controller 810.

In the exhaust unit 930, the piping that couples the exhaust unit 930 to the chamber 200 may be provided with a fluorine gas trap 950. The fluorine gas trap 950 may trap fluorine contained in the laser gas from the chamber 200. The laser gas from which fluorine is removed may be ejected by the fluorine gas trap 950 from the exhaust unit 930 to the inside of the housing 100. The fluorine gas trap 950 may be provided between the gas system operation valve and the vacuum pump 940 that are provided in the piping that couples the exhaust unit 930 to the chamber 200.

Figure 8:
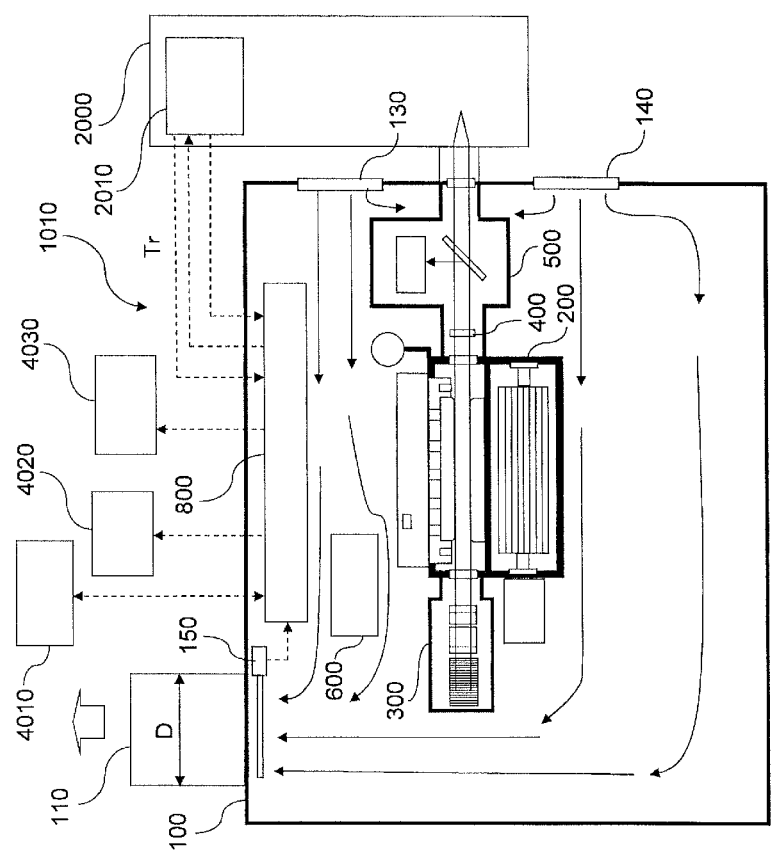
FIG. 8 is a diagram illustrating a configuration of a ventilation system of the laser unit according to the first embodiment of the disclosure.

FIG. 8 is a diagram illustrating a configuration of a ventilation system of the laser unit according to the first embodiment of the disclosure. Components of the laser unit illustrated in FIG. 8 substantially same as those of the laser unit illustrated in FIG. 3 are denoted by the same reference numerals, and any redundant description thereof is omitted. Components of a semiconductor exposure apparatus illustrated in FIG. 8 substantially same as those of the semiconductor exposure apparatus illustrated in FIG. 3 are denoted by the same reference numerals, and any redundant description thereof is omitted.

In the ventilation system of the laser unit 1010, a first inlet 130 and a second inlet 140 may be provided on the housing 100. The air may be introduced from the outside of the housing 100 to the inside of the housing 100 through the first inlet 130 and the second inlet 140. The devices provided in the housing 100 may be cooled by the air introduced inside the housing 100. The air introduced inside the housing 100 may be ejected to the outside of the housing 100 through the ventilation port 110. A wind velocity sensor 150 may be provided inside the housing 100. The wind velocity sensor 150 may measure the velocity of the air passing through the ventilation port 110. The wind velocity sensor 150 may be coupled to the laser controller 800. Data of the velocity of the air measured by the wind velocity sensor 150 may be transmitted to the laser controller 800.

3.2 Operation of Laser Unit According to First Embodiment of Disclosure

Figure 9:
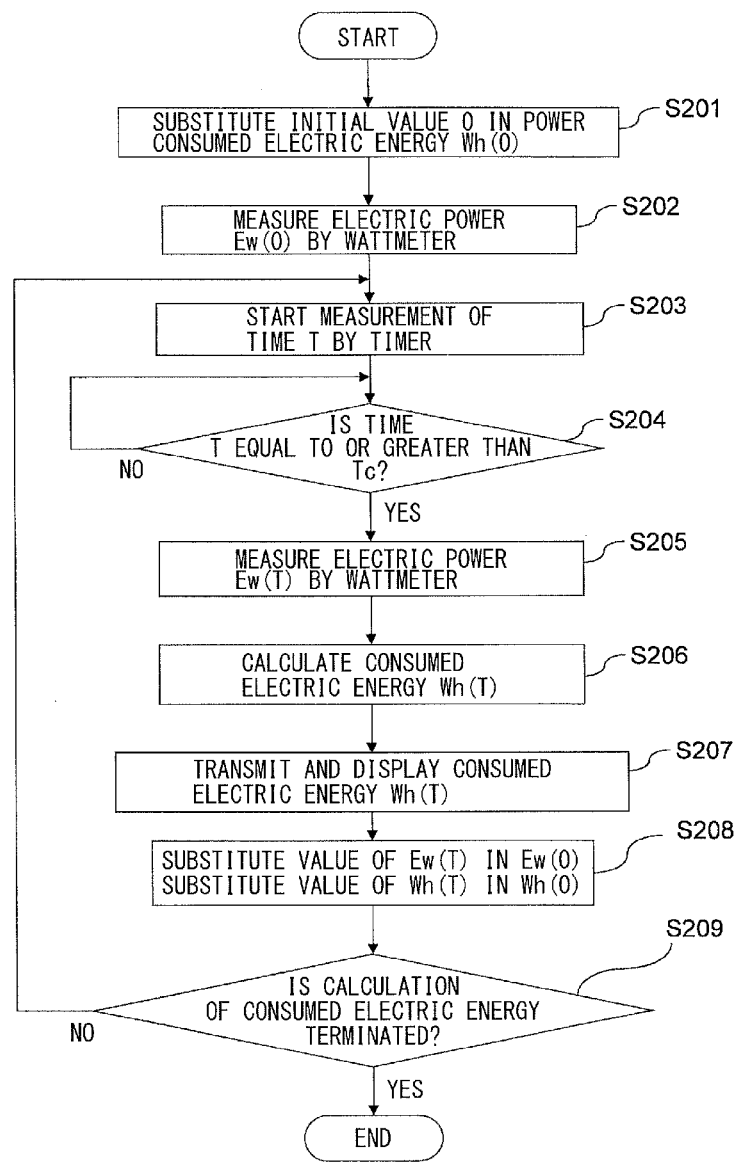
FIG. 9 is a diagram illustrating a method of calculating electric energy consumed by the laser unit provided with a wattmeter, according to the first embodiment of the disclosure.

FIG. 9 is a diagram illustrating a method of calculating electric energy consumed by the laser unit provided with a wattmeter, according to the first embodiment of the disclosure.

At step S201, the laser controller 800 may substitute an initial value 0 in consumed electric energy Wh(0).

At step S202, the laser controller 800 may measure, with use of the wattmeter 5010, electric power Ew(0) supplied from the power source to the motor 240, the charger 600, the laser controller 800, and the other devices 820, at time 0 (time T=0).

At step S203, the laser controller 800 may reset the time T of a timer (not illustrated) that is included in the laser controller 800, and may start measurement of the time T by the timer.

At step S204, the laser controller 800 may determine whether or not the time T measured by the timer is equal to or greater than a predetermined value Tc. The predetermined value Tc may be a cycle of measurement of the consumed electric energy Wh of the laser unit 1010. The predetermined value Tc may be, for example, (1/3600) hours or greater and (1/60) hours or less. When the time T is equal to or greater than the predetermined value Tc, the laser controller 800 may proceed to step S205. When the time T is less than the predetermined value Tc, the laser controller 800 may repeat the step S204.

At step S205, the laser controller 800 may measure, with use of the wattmeter 5010, electric power Ew(T) supplied from the power source to the motor 240, the charger 600, the laser controller 800, and the other devices 820, at the time T ($\geq$Tc).

At step S206, the laser controller 800 may calculate the electric energy Wh(T) consumed by the laser unit 1010, for example, based on the electric power Ew(T) measured by the wattmeter 5010. It may be assumed that the electric power is linearly varied from Ew(0) to Ex(T) during a period from the time 0 to the time T. The electric energy Wh(T) consumed by the laser unit 1010 may be calculated according to the following expression.

$$Wh(T)=\{Ew(T)+Ew(0)\}(T/2)+Wh(0)$$

At step S207, the laser controller 800 may transmit and display the calculated consumed electric energy Wh(T) to/on the user interface 4020.

At step S208, the laser controller 800 may substitute the value of Ew(T) in Ew(0) and may substitute the value of Wh(T) in Wh(0) in order to obtain an integrated value of the consumed electric energy Wh(T).

At step S209, the laser controller 800 may determine whether to terminate the calculation of the consumed electric energy. When not terminating the calculation of the consumed electric energy, the laser controller 800 may proceed to step S203.

The electric energy consumed by the laser unit 1010 may be calculated in such a manner.

Figure 10A:
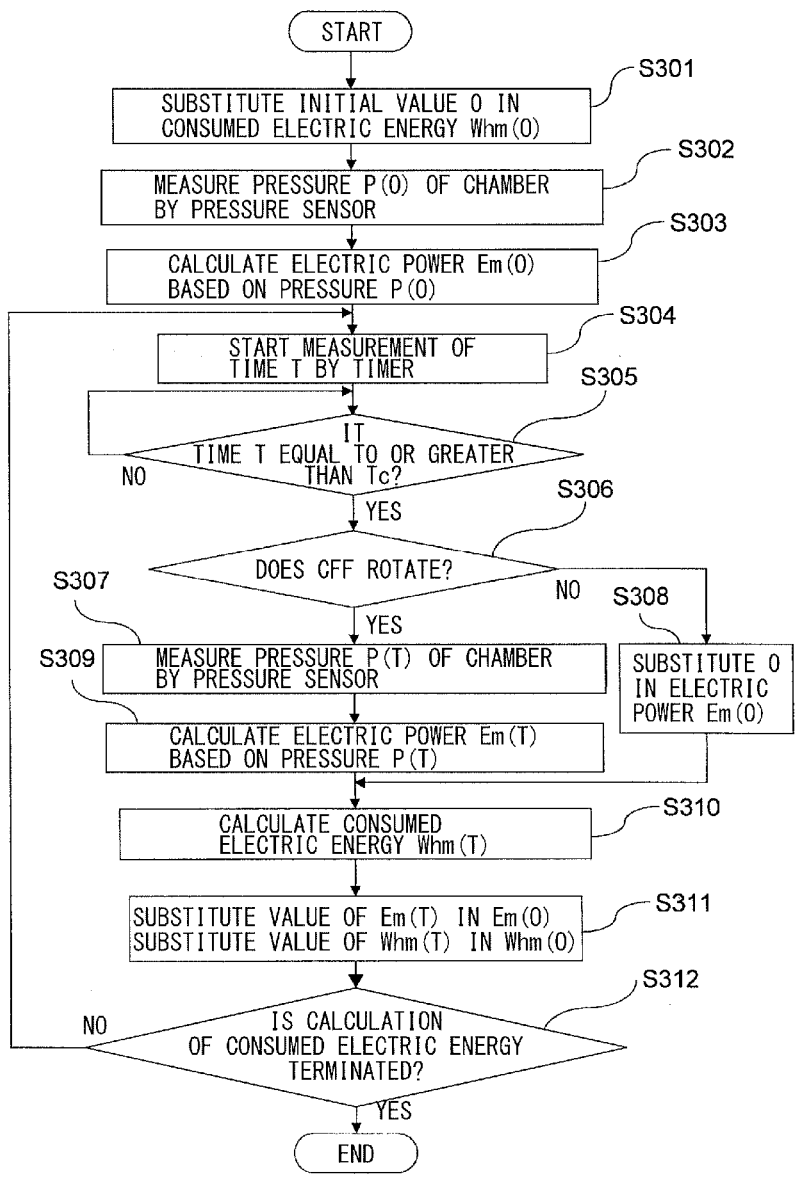
FIG. 10A is a diagram illustrating a method of calculating electric energy consumed by a motor included in a laser unit not provided with a wattmeter, according to the first embodiment of the disclosure.

FIG. 10A is a diagram illustrating a method of calculating the electric energy consumed by the motor included in the laser unit not provided with a wattmeter, according to the first embodiment of the disclosure.

At step S301, the laser controller 800 may substitute the initial value 0 in electric energy Whm(0) consumed by the motor 240.

At step S302, the laser controller 800 may measure, with use of the pressure sensor 270, pressure P(0) of the laser gas contained in the chamber 200 at time 0 (time T=0).

At step S303, the laser controller 800 may calculate electric power Em(0) of the motor 240 at the time 0, based on the pressure P(0) of the laser gas measured by the pressure sensor 270. It may be assumed that the electric power Em(0) of the motor 240 at the time 0 is proportional to the pressure P(0) of the laser gas measured by the pressure sensor 270. When a gas pressure coefficient is denoted by $\alpha$ and an offset coefficient is denoted by $\beta$, the electric power Em(0) of the motor 240 at the time 0 may be calculated according to an expression of Em(0)=$\alpha$·P(0)+$\beta$. The gas pressure coefficient α and the offset coefficient β may be previously measured or may be set values. The gas pressure coefficient α and the offset coefficient β may be stored in a memory (not illustrated) included in the laser controller 800. The laser controller 800 may read the gas pressure coefficient α and the offset coefficient β from the memory.

At step S304, the laser controller 800 may reset the time T of the timer (not illustrated) included in the laser controller 800 and may start measurement of the time T by the timer.

At step S305, the laser controller 800 may determine whether or not the time T measured by the timer is equal to or greater than a predetermined value Tc. The predetermined value Tc may be a cycle of the measurement of the electric energy Wh consumed by the motor 240. The predetermined value Tc may be, for example, (1/3600) hours or greater and (1/60) hours or less. When the time T is equal to or greater than the predetermined value Tc, the laser controller 800 may proceed to step S306. When the time T is less than the predetermined value Tc, the laser controller 800 may repeat the step S305.

At step S306, the laser controller 800 may determine whether the cross flow fan rotates. When the cross flow fan 230 rotates, the laser controller 800 may proceed to step S307. When the cross flow fan 230 does not rotate, the laser controller 800 may proceed to step S308.

At step S307, the laser controller 800 may measure, by the pressure sensor 270, the pressure P(T) of the laser gas contained in the chamber 200, at the time T.

At step S308, the laser controller 800 may substitute 0 in the electric power Em(0) of the motor 240 at the time 0. Thereafter, the laser controller 800 may proceed to step S310.

At step S309, the laser controller 800 may calculate the electric power Em(T) of the motor 240 at the time T, based on the pressure P(T) of the laser gas measured by the pressure sensor 270. It may be assumed that the electric power Em(T) of the motor 240 at the time T is proportional to the pressure P(T) of the laser gas measured by the pressure sensor 270. When the gas pressure coefficient is denoted by α and the offset coefficient is denoted by β, the electric power Em(T) of the motor 240 at the time T may be calculated according to an expression of $Em(T)=\alpha \cdot P(T)+\beta$. The gas pressure coefficient α and the offset coefficient β may be those described above.

At step S310, the electric energy Whm(T) consumed by the motor 240 may be calculated, based on, for example, the electric power Em(T) of the motor 240 at the time T. It may be assumed that the electric power may be linearly varied from Em(0) to Em(T) during a period from time 0 to time T. The electric energy Whm(T) consumed by the motor 240 may be calculated according to an expression of $Whm(T)=\{Em(T)+Em(0)\}(T/2)+Whm(0)$.

At step S311, the laser controller 800 may substitute the value of Em(T) in Em(0) and may substitute the value of Whm(T) in Whm(0) in order to obtain the integrated value of the consumed electric energy Whm(T).

At step S312, the laser controller 800 may determine whether to terminate the calculation of the electric energy consumed by the motor 240. When not terminating the calculation of the electric energy consumed by the motor 240, the laser controller 800 may proceed to step S304.

The electric energy Whm consumed by the motor 240 may be calculated in such a manner.

To change the rotation speed of the motor 240, the electric power Em(T) of the motor 240 at the time T may be calculated according to an expression of $Em(T)=(\alpha \cdot P(T)+\beta) \cdot (\omega(T)/\omega(0))^3$, where P(T) may be the pressure of the laser gas at the time T, α may be the gas pressure coefficient, β may be the offset constant, ω(T) may be the rotation speed of the motor 240 at the time T, and ω(0) may be the rotation speed of the motor 240 at the time 0.

Figure 10B:
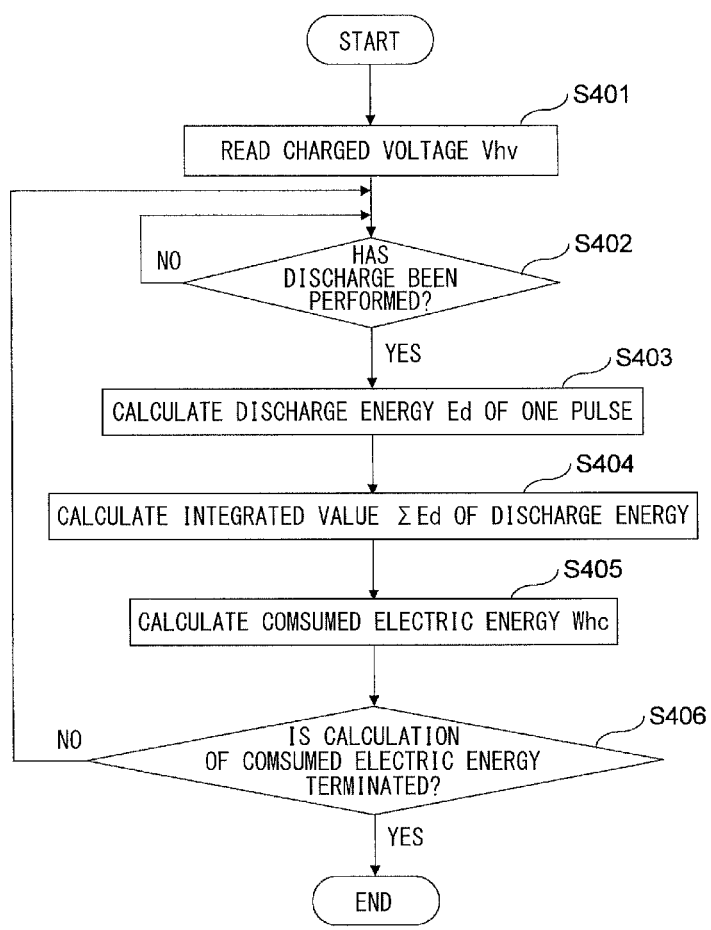
FIG. 10B is a diagram illustrating a method of calculating electric energy consumed by a charger included in the laser unit not provided with a wattmeter, according to the first embodiment of the disclosure.

FIG. 10B is a diagram illustrating a method of calculating the electric energy consumed by the charger included in the laser unit not provided with a wattmeter, according to the first embodiment of the disclosure.

At step S401, the laser controller 800 may read the charged voltage Vhv to be applied to the charger 600.

At step S402, the laser controller 800 may determine whether discharge has been performed between the first electrode 250a and the second electrode 250b by the charger 600. When the discharge has been performed between the electrode 250a and the second electrode 250b, the laser controller 800 may proceed to step S403. When the discharge has not been performed between the first electrode 250a and the second electrode 250b, the laser controller 800 may repeat the step S402.

At step S403, the laser controller 800 may calculate the discharge energy Ed (unit: J) of one pulse, based on the value of the charged voltage Vhv. The discharge energy Ed of one pulse may be calculated according to an expression of $Ed=a(Vhv)^2+b(Vhv)+c$, where a, b, and c may be predetermined coefficients. The predetermined coefficients a, b, and c may be previously measured, or may be set values. The predetermined coefficients a, b, and c may be stored in a memory (not illustrated) included in the laser controller 800. The laser controller 800 may read the predetermined coefficients a, b, and c from the memory.

At step S404, the laser controller 800 may calculate the integrated value ΣEd of the discharge energy of a plurality of pulses.

At step S405, the laser controller 800 may calculate the electric energy Whc consumed by the charger 600, based on the integrated value ΣEd of the discharge energy of the plurality of pulses. When γ is a conversion factor, the electric energy Whc consumed by the charger 600 may be calculated according to an expression of $Whc=\gamma \cdot \Sigma Ed$. The conversion factor γ may be 1/3600000 kWh/J.

At step S406, the laser controller 800 may determine whether to terminate the calculation of the electric energy consumed by the charger 600. When not terminating the calculation of the electric energy consumed by the charger 600, the laser controller 800 may proceed to step S402.

The electric energy Whc consumed by the charger 600 may be calculated in such a manner.

Figure 10C:
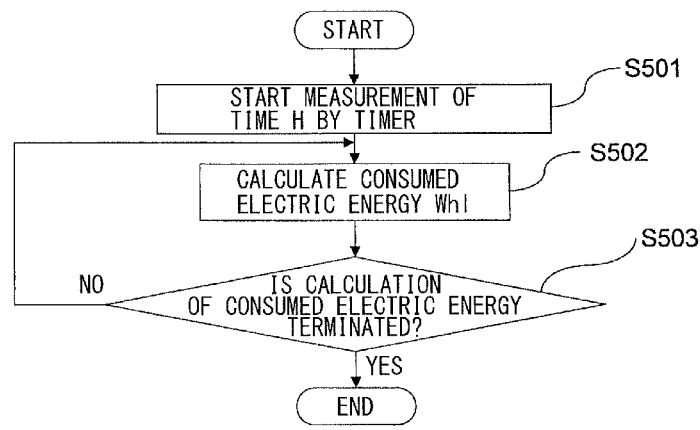
FIG. 10C is a diagram illustrating a method of calculating electric energy consumed by a laser controller and other devices that are included in the laser unit not provided with a wattmeter, according to the first embodiment of the disclosure.

FIG. 10C is a diagram illustrating a method of calculating the electric energy consumed by the laser controller and the other devices that are included in the laser unit not provided with a wattmeter, according to the first embodiment of the disclosure.

At step S501, the laser controller 800 may reset the time H of the timer (not illustrated) included in the laser controller 800, and may start measurement of the time H by the timer.

At step S502, the laser controller 800 may calculate the electric energy Wh1 consumed by the laser controller 800 and the other devices, based on the electric power of the laser controller 800 and the other devices. The electric energy Wh1 consumed by the laser controller 800 and the other devices may be calculated according to an expression of $Wh1=E1 \cdot H$, where E1 may be the electric power of the laser controller 800 and the other devices. The electric power E1 may be a fixed value independent of operation state of the laser unit 1010.

At step S503, the laser controller 800 may determine whether to terminate the calculation of the electric energy consumed by the laser controller 800 and the other devices. When not terminating the calculation of the electric energy consumed by the laser controller 800 and the other devices, the laser controller 800 may proceed to step S502.

The electric energy Wh1 consumed by the laser controller 800 and the other devices may be calculated in such a manner.

Figure 10D:
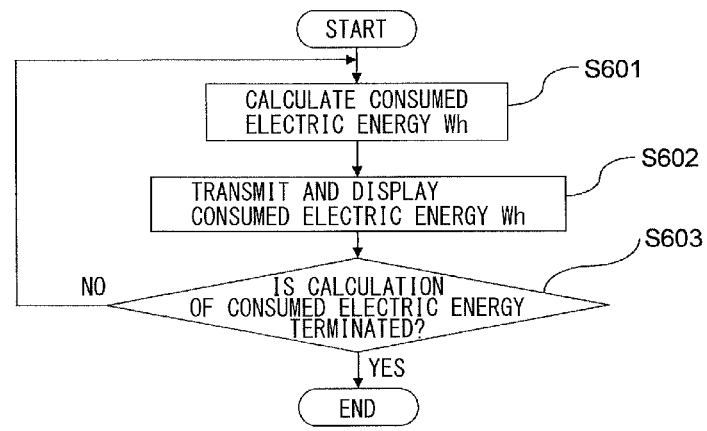
FIG. 10D is a diagram illustrating a method of calculating entire electric energy consumed by the laser unit not provided with a wattmeter, according to the first embodiment of the disclosure.

FIG. 10D is a diagram illustrating a method of calculating entire electric energy consumed by the laser unit not provided with a wattmeter, according to the first embodiment of the disclosure.

At step S601, the entire electric energy Wh consumed by the laser unit 1010 may be calculated, based on the electric energy Whm consumed by the motor 240, the electric energy Whc consumed by the charger 600, and the electric energy Wh1 consumed by the laser controller 800 and the other devices. The entire electric energy Wh consumed by the laser unit 1010 may be calculated according to an expression of Wh=Whm+Whc+Wh1.

At step S602, the laser controller 800 may transmit the calculated consumed electric energy Wh to the user interface 4020, and may display the calculated consumed electric energy on the user interface 4020.

At step S603, the laser controller 800 may determine whether to terminate the calculation of the electric energy consumed by the laser unit 1010. When not terminating the calculation of the electric energy consumed by the laser unit 1010, the laser controller 800 may proceed to step S601.

The electric energy Wh consumed by the laser unit 1010 may be calculated in such a manner.

Figure 11:
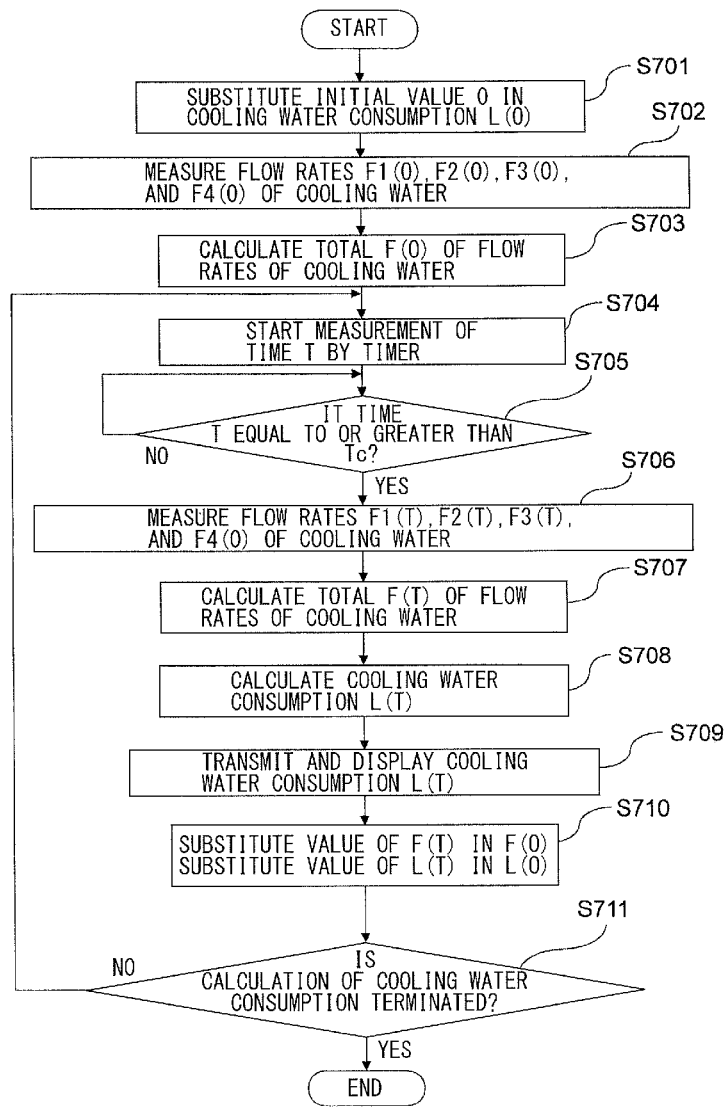
FIG. 11 is a diagram illustrating a method of calculating cooling water consumption in the laser unit according to the first embodiment of the disclosure.

FIG. 11 is a diagram illustrating a method of calculating consumption of the cooling water in the laser unit according to the first embodiment of the disclosure.

At step S701, the laser controller 800 may substitute an initial value 0 in consumption L(0) of the cooling water in the laser unit 1010.

At step S702, the laser controller 800 may measure, by the flowmeter F1, the flow rate F1(0) of the cooling water that passes through the charger 600, at the time 0 (time T=0). The laser controller 800 may measure, by the flowmeter F2, the flow rate F2(0) of the cooling water that passes through the pulse power module 700, at the time 0 (time T=0). The laser controller 800 may measure, by the flowmeter F3, the flow rate F3(0) of the cooling water that passes through the heat exchanger 280, at the time 0 (time T=0). The laser controller 800 may measure, by the flowmeter F4, the flow rate F4(0) of the cooling water that passes through the motor 240, at the time 0 (time T=0).

At step S703, the laser controller 800 may calculate a total F(0) of the flow rates of the cooling water passing through the laser unit 1010 at the time 0 (time T=0), based on the flow rates F1(0), F2(0), F3(0), and F4(0). The total F(0) of the flow rates of the cooling water passing through the laser unit 1010 at the time 0 may be calculated according to an expression of $F(0)=F1(0)+F2(0)+F3(0)+F4(0)$.

At step S704, the laser controller 800 may reset the time T of the timer (not illustrated) included in the laser controller 800, and may start the measurement of the time T by the timer.

At step S705, the laser controller 800 may determine whether or not the time T measured by the timer is equal to or greater than the predetermined value Tc. The predetermined value Tc may be a cycle of the measurement of the electric energy Wh consumed by the laser unit 1010. The predetermined value Tc may be, for example, (1/3600) hours or greater and (1/60) hours or less. When the time T is equal to or greater than the predetermined value Tc, the laser controller 800 may proceed to step S706. When the time T is less than the predetermined value Tc, the laser controller 800 may repeat the step S705.

At step S706, the laser controller 800 may measure, by the flowmeter F1, the flow rate F1(T) of the cooling water passing through the charger 600, at the time T. The laser controller 800 may measure, by the flowmeter F2, the flow rate F2(T) of the cooling water passing through the pulse power module 700, at the time T. The laser controller 800 may measure, by the flowmeter F3, the flow rate F3(T) of the cooling water passing through the heat exchanger 280, at the time T. The laser controller 800 may measure, by the flowmeter F4, the flow rate F4(T) of the cooling water passing through the motor 240, at the time T.

At step S707, the laser controller 800 may calculate the total F(T) of the flow rates of the cooling water flowing through the laser unit 1010 at the time T, based on the flow rates F1(T), F2(T), F3(T), and F4(T). The total F(T) of the flow rates of the cooling water flowing through the laser unit 1010 at the time T may be calculated according to an expression of $F(T)=F1(T)+F2(T)+F3(T)+F4(T)$.

At step S708, the laser controller 800 may calculate the consumption L(T) of the cooling water in the laser unit 1010, based on, for example, the total F(T) of the flow rates of the cooling water flowing through the laser unit 1010, at the time T. It may be assumed that the consumption of the cooling water in the laser unit 1010 is linearly varied from F(0) to F(T) during a period from time 0 to time T. The consumption L(T) of the cooling water in the laser unit 1010 may be calculated according to an expression of $L(T)=\{F(T)+F(0)\}(T/2)+L(0)$.

At step S709, the laser controller 800 may transmit the calculated consumption L(T) of the cooling water to the user interface 4020 and may display the calculated consumption L(T) on the user interface 4020.

At step S710, the laser controller 800 may substitute the value of F(T) in F(0) and may substitute the value of L(T) in L(0) in order to obtain an integrated value of the consumption L(T) of the cooling water.

At step S711, the laser controller 800 may determine whether to terminate the calculation of the consumption of the cooling water. When not terminating the calculation of the consumption of the cooling water, the laser controller 800 may proceed to step S704.

The consumption of the cooling water in the laser unit 1010 may be calculated in such a manner.

Figure 12:
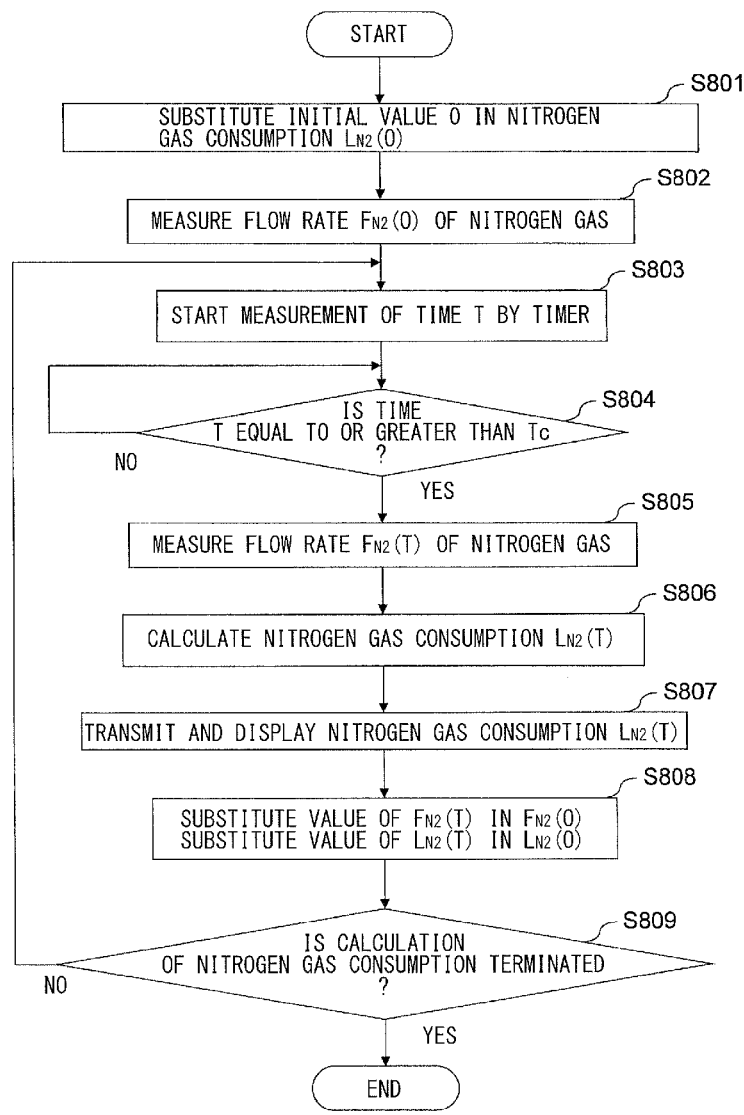
FIG. 12 is a diagram illustrating a method of calculating nitrogen gas consumption in the laser unit according to the first embodiment of the disclosure.

FIG. 12 is a diagram illustrating a method of calculating consumption of nitrogen gas in the laser unit according to the first embodiment of the disclosure.

At step S801, the laser controller 800 may substitute an initial value 0 in consumption $L_{N2}(0)$ of the nitrogen gas to be fed to the laser unit 1010.

At step S802, the laser controller 800 may measure, by the flowmeter $F_{N2}$, the flow rate $F_{N2}(0)$ of the nitrogen gas to be fed to the laser unit 1010, at time 0 (time T=0).

At step S803, the laser controller 800 may reset the time T of the timer (not illustrated) included in the laser controller 800 and may start measurement of the time T by the timer.

At step S804, the laser controller 800 may determine whether or not the time T measured by the timer is equal to or greater than the predetermined value Tc. The predetermined value Tc may be a cycle of measurement of the electric energy Wh consumed by the laser unit 1010. The predetermined value Tc may be, for example, (1/3600) hours or greater and (1/60) hours or less. When the time T is equal to or greater than the predetermined value Tc, the laser controller 800 may proceed to step S805. When the time T is less than the predetermined value Tc, the laser controller 800 may repeat the step S804.

At step S805, the laser controller 800 may measure, by the flowmeter $F_{N2}$, the flow rate $F_{N2}(T)$ of the nitrogen gas to be fed to the laser unit 1010, at the time T.

At step S806, the laser controller 800 may calculate the consumption $L_{N2}(T)$ of the nitrogen gas to be fed to the laser unit 1010, based on, for example, the flow rate $F_{N2}(T)$ of the nitrogen gas to be fed to the laser unit 1010, at the time T. It may be assumed that the flow rate of the nitrogen gas to be fed to the laser unit 1010 is linearly varied from $F_{N2}(0)$ to $F_{N2}(T)$ during a period from time 0 to time T. The consumption $L_{N2}(T)$ of the nitrogen gas to be fed to the laser unit 1010 may be calculated according to an expression of $L_{N2}(T)=\{F_{N2}(T)+F_{N2}(0)\}(T/2)+L_{N2}(0)$.

At step S807, the laser controller 800 may transmit the calculated consumption $L_{N2}(T)$ of the nitrogen gas to the user interface 4020 and may display the calculated consumption $L_{N2}(T)$ on the user interface 4020.

At step S808, the laser controller 800 may substitute the value of the flow rate $F_{N2}(T)$ in $F_{N2}(0)$ and may substitute the value of the consumption $L_{N2}(T)$ in $L_{N2}(0)$ in order to obtain an integrated value of the consumption $L_{N2}(T)$ of the nitrogen gas.

At step S809, the laser controller 800 may determine whether to terminate the calculation of the consumption of the nitrogen gas. When not terminating the calculation of the consumption of the nitrogen gas, the laser controller 800 may proceed to step S803.

The consumption of the nitrogen gas to be fed to the laser unit 1010 may be calculated in such a manner.

Figure 13A:
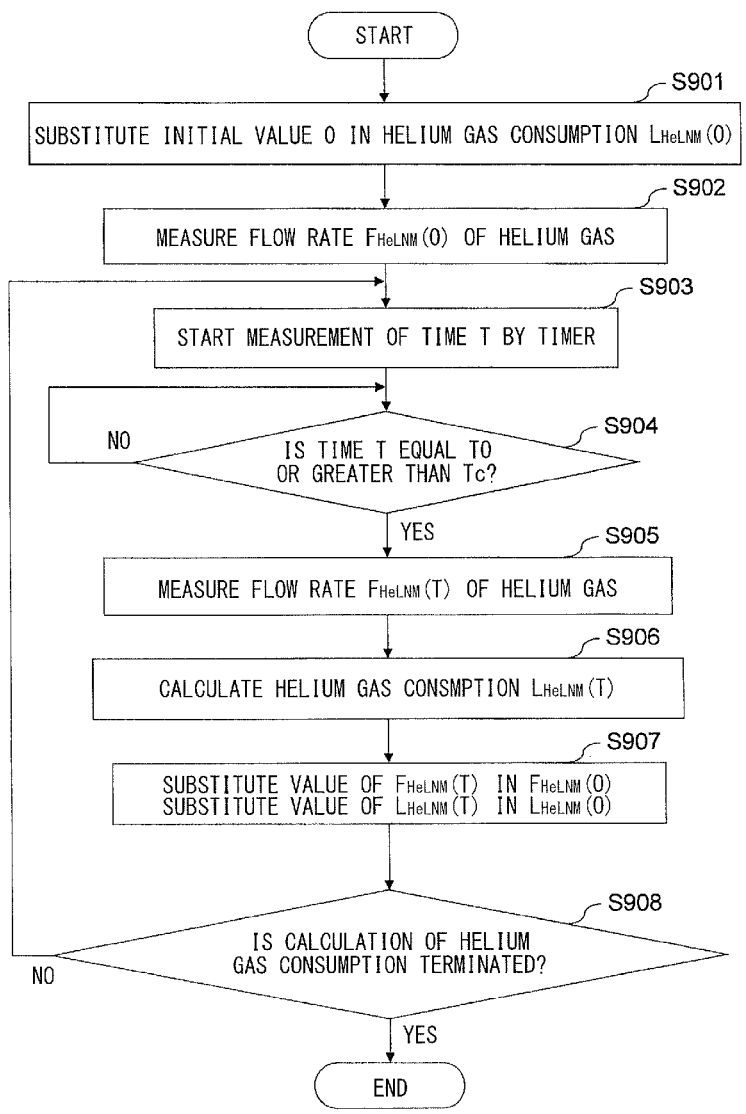
FIG. 13A is a diagram illustrating a method of calculating consumption of helium gas fed to a line narrow module in the laser unit according to the first embodiment of the disclosure.

FIG. 13A is a diagram illustrating a method of calculating consumption of helium gas to be fed to the line narrow module in the laser unit according to the first embodiment of the disclosure.

At step S901, the laser controller 800 may substitute an initial value 0 in the consumption $L_{HeLNM}(0)$ of the helium gas to be fed to the line narrow module 300 in the laser unit 1010.

At step S902, the laser controller 800 may measure, by the flowmeter $F_{He}$, the flow rate $F_{HeLNM}(0)$ of the helium gas to be fed to the line narrow module 300 in the laser unit 1010, at the time 0 (time T=0).

At step S903, the laser controller 800 may reset the time T of the timer (not illustrated) included in the laser controller 800 and may start measurement of the time T by the timer.

At step S904, the laser controller 800 may determine whether or not the time T measured by the timer is equal to or greater than the predetermined value Tc. The predetermined value Tc may be a cycle of measurement of the electric energy Wh consumed by the laser unit 1010. The predetermined value Tc may be, for example, (1/3600) hours or greater and (1/60) hours or less. When the time T is equal to or greater than the predetermined value Tc, the laser controller 800 may proceed to step S905. When the time T is less than the predetermined value Tc, the laser controller 800 may repeat the step S904.

At step S905, the laser controller 800 may measure, by the flowmeter $F_{He}$, the flow rate $F_{HeLNM}(T)$ of the helium gas to be fed to the line narrow module 300 in the laser unit 1010, at the time T.

At step S906, the laser controller 800 may calculate the consumption $L_{HeLNM}(T)$ of the nitrogen gas to be fed to the line narrow module 300 in the laser unit 1010, based on, for example, the flow rate $F_{HeLNM}(T)$ of the helium gas to be fed to the line narrow module 300 in the laser unit 1010 at the time T. It may be assumed that the flow rate of the helium gas to be fed to the line narrow module 300 in the laser unit 1010 is linearly varied from $F_{HeLNM}(0)$ to $F_{HeLNM}(T)$ during a period from the time 0 to the time T. The consumption $L_{HeLNM}(T)$ of the helium gas to be fed to the line narrow module 300 in the laser unit 1010 may be calculated according to an expression of $L_{HeLNM}(T)=\{F_{HeLNM}(T)+F_{HeLNM}(0)\}(T/2)+L_{HeLNM}(0)$.

At step S907, the laser controller 800 may substitute the value of $F_{HeLNM}(T)$ in $F_{HeLNM}(0)$ and may substitute the value of $L_{HeLNM}(T)$ in $L_{HeLNM}(0)$ in order to obtain an integrated value of the consumption $L_{HeLNM}(T)$ of the helium gas.

At step S908, the laser controller 800 may determine whether to terminate the calculation of the consumption of the helium gas. When not terminating the calculation of the consumption of the helium gas, the laser controller 800 may proceed to step S903.

The consumption $L_{HeLNM}$ of the helium gas to be fed to the line narrow module 300 in the laser unit 1010 may be calculated in such a manner.

Figure 13B:
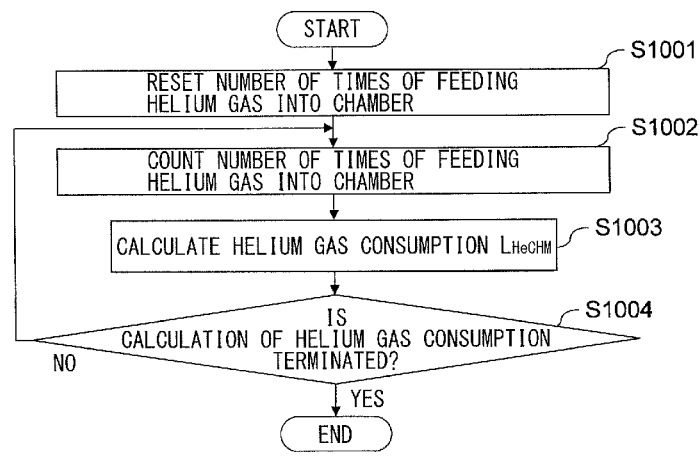
FIG. 13B is a diagram illustrating a method of calculating consumption of helium gas fed to a chamber in the laser unit according to the first embodiment of the disclosure.

FIG. 13B is a diagram illustrating a method of calculating consumption of the helium gas to be fed to the chamber in the laser unit according to the first embodiment of the disclosure.

At step S1001, the laser controller 800 may reset the number of times N of feeding the helium gas to the chamber 200 in the laser unit 1010.

At step S1002, the laser controller 800 may count the number of times N of feeding the helium gas to the chamber 200 in the laser unit 1010.

At step S1003, the laser controller 800 may calculate the consumption $L_{HeCHM}$ of the helium gas fed to the chamber 200 in the laser unit 1010, based on, for example, the number of times N of feeding the helium gas to the chamber 200. The consumption $L_{HeCHM}$ of the helium gas fed to the chamber 200 in the laser unit 1010 may be calculated according to an expression of $L_{HeCHM}=V \cdot N$, where V may be a volume of the helium gas to be fed to the chamber 200 at one time.

At step S1004, the laser controller 800 may determine whether to terminate the calculation of the consumption of the helium gas. When not terminating the calculation of the consumption of the helium gas, the laser controller 800 may proceed to step S1002.

The consumption $L_{HeCHM}$ of the helium gas to be fed to the chamber 200 in the laser unit 1010 may be calculated in such a manner.

Figure 13C:
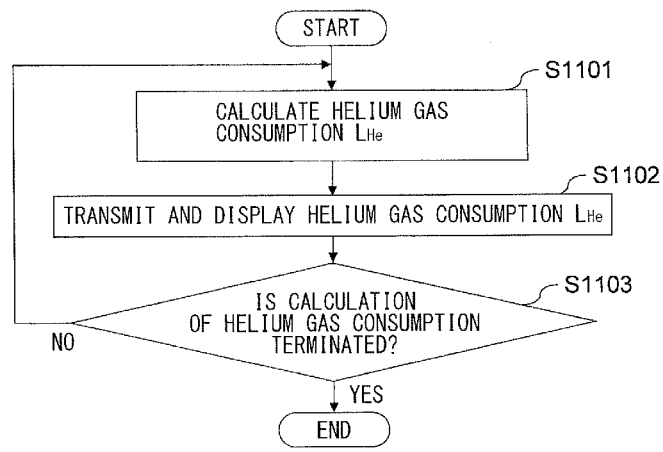
FIG. 13C is a diagram illustrating a method of calculating consumption of helium gas fed to the laser unit according to the first embodiment of the disclosure.

FIG. 13C is a diagram illustrating a method of calculating consumption of the helium gas to be fed to the laser unit according to the first embodiment of the disclosure.

At step S1101, the laser controller 800 may calculate the consumption $L_{He}$ of the helium gas to be fed to the laser unit 1010, based on the consumption $L_{HeLNM}$ of the helium gas to be fed to the line narrow module 300 and the consumption $L_{HeCHM}$ of the helium gas fed to the chamber 200. The consumption $L_{He}$ of the helium gas to be fed to the laser unit 1010 may be calculated according to an expression of $L_{He}=L_{HeLNM}+L_{HeCHM}$.

At step S1102, the laser controller 800 may transmit the calculated consumption $L_{He}$ of the helium gas to the user interface 4020 and may display the calculated consumption $L_{He}$ on the user interface 4020.

At step S1103, the laser controller 800 may determine whether to terminate the calculation of the consumption of the helium gas to be fed to the laser unit 1010. When not terminating the calculation of the consumption of the helium gas to be fed to the laser unit 1010, the laser controller 800 may proceed to step S1101.

The consumption $L_{He}$ of the helium gas to be fed to the laser unit 1010 may be calculated in such a manner.

Figure 14:
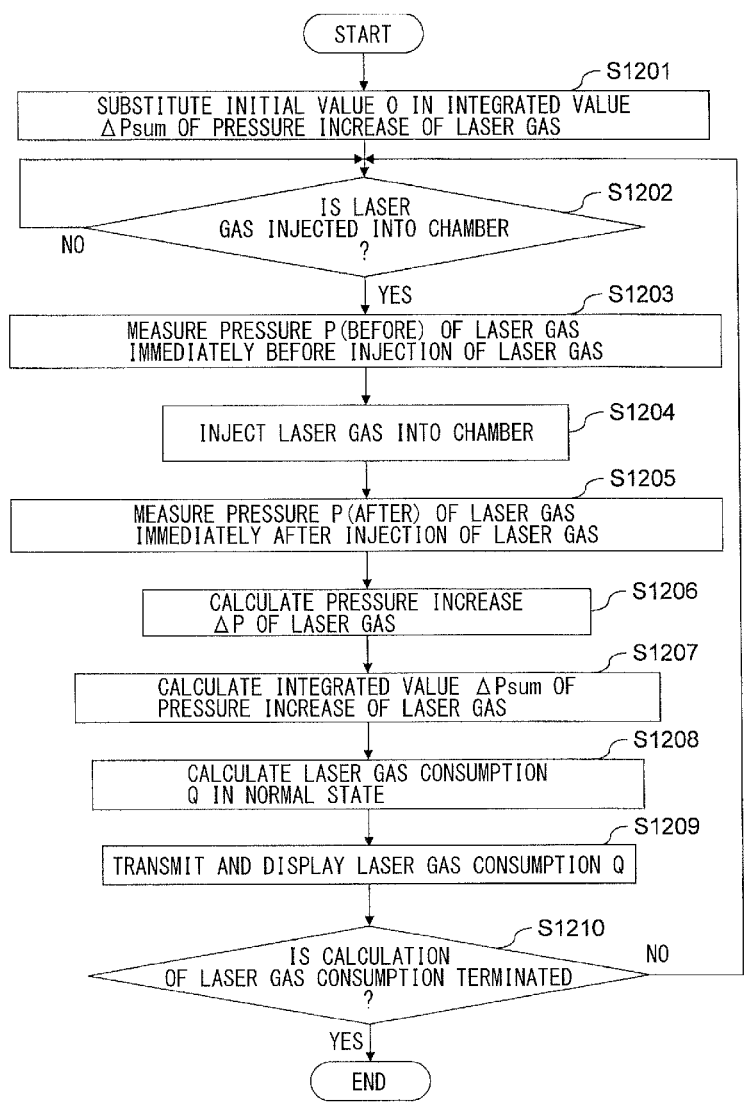
FIG. 14 is a diagram illustrating a method of calculating consumption of laser gas fed to the laser unit according to the first embodiment of the disclosure.

FIG. 14 is a diagram illustrating a method of calculating consumption of the laser gas to be fed to the laser unit according to the first embodiment of the disclosure. In FIG. 14, the laser gas may be mixed gas of fluorine, argon, and neon to be fed to the chamber 200 from the first gas cylinder 3010. In FIG. 14, the laser gas may be mixed gas of argon and neon to be fed to the chamber 200 from the second gas cylinder 3020.

At step S1201, the laser controller 800 may substitute an initial value 0 in an integrated value ΔPsum of pressure increase of the laser gas in the chamber 200.

At step S1202, the laser controller 800 may determine whether to inject the laser gas to the chamber 200 from one or both of the first gas cylinder 3010 and the second gas cylinder 3020. When the laser gas is injected to the chamber 200 from one or both of the first gas cylinder 3010 and the second gas cylinder 3020, the laser controller 800 may proceed to step S1203. When the laser gas is not injected to the chamber 200 from any of the first gas cylinder 3010 and the second gas cylinder 3020, the laser controller 800 may repeat the step S1202.

At step S1203, the laser controller 800 may measure the pressure P(before) of the laser gas in the chamber 200 immediately before the laser gas is injected to the chamber 200, with use of the pressure sensor 270.

At step S1204, the laser controller 800 may inject the laser gas to the chamber 200 from one or both of the first gas cylinder 3010 and the second gas cylinder 3020. The laser controller 800 may inject the laser gas into the chamber 200 by opening the gas system operation valve provided in the piping that couples one of the first gas cylinder 3010 and the second gas cylinder 3020 to the chamber 200. The laser controller 800 may determine whether or not the pressure of the laser gas in the chamber 200 is equal to or greater than the predetermined pressure with use of the pressure sensor 270. When the pressure of the laser gas in the chamber 200 is equal to or greater than the predetermined pressure, the laser controller 800 may close the gas system operation valve provided in the piping that couples one of the first gas cylinder 3010 and the second gas cylinder 3020 to the chamber 200. When the pressure of the laser gas in the chamber 200 is less than the predetermined pressure, the gas system operation valve may be still opened.

At step S1205, the laser controller 800 may measure pressure P(after) of the laser gas in the chamber 200 immediately after the laser gas is injected into the chamber 200 with use of the pressure sensor 270.

At step S1206, the laser controller 800 may calculate pressure increase ΔP of the laser gas in the chamber 200, based on the pressure P(before) and the pressure P(after). The pressure increase ΔP of the laser gas in the chamber 200 may be calculated according to an expression of ΔP=P(after)−P(before).

At step S1207, the laser controller 800 may calculate the integrated value ΔPsum of the pressure increase of the laser gas in the chamber 200, based on the pressure increase ΔP of the laser gas in the chamber 200. The integrated value ΔPsum of the pressure increase of the laser gas in the chamber 200 may be calculated by integrating the pressure increase ΔP of the laser gas in the chamber 200.

At step S1208, the laser controller 800 may calculate consumption Q of the laser gas in a normal state (volume of the laser gas consumed in the normal state), based on the integrated value ΔPsum of the pressure increase of the laser gas in the chamber 200. The normal state may be a state at the temperature of 0° C. under pressure of 1013 hPa. The consumption Q of the laser gas in the normal state may be calculated according to an expression of Q=(V/P0)·ΔPsum, where V may be a capacity of the chamber 200 and P0 may be 1013 hPa.

At step S1209, the laser controller 800 may transmit and display the calculated consumption Q of the laser gas in the normal state to/on the user interface 4020.

At step S1210, the laser controller 800 may determine whether to terminate the calculation of the consumption of the laser gas to be fed to the laser unit 1010. When not terminating the calculation of the consumption of the laser gas to be fed to the laser unit 1010, the laser controller 800 may proceed to step S1202.

In this way, the consumption Q of the laser gas to be fed to the laser unit 1010 may be calculated.

Figure 15:
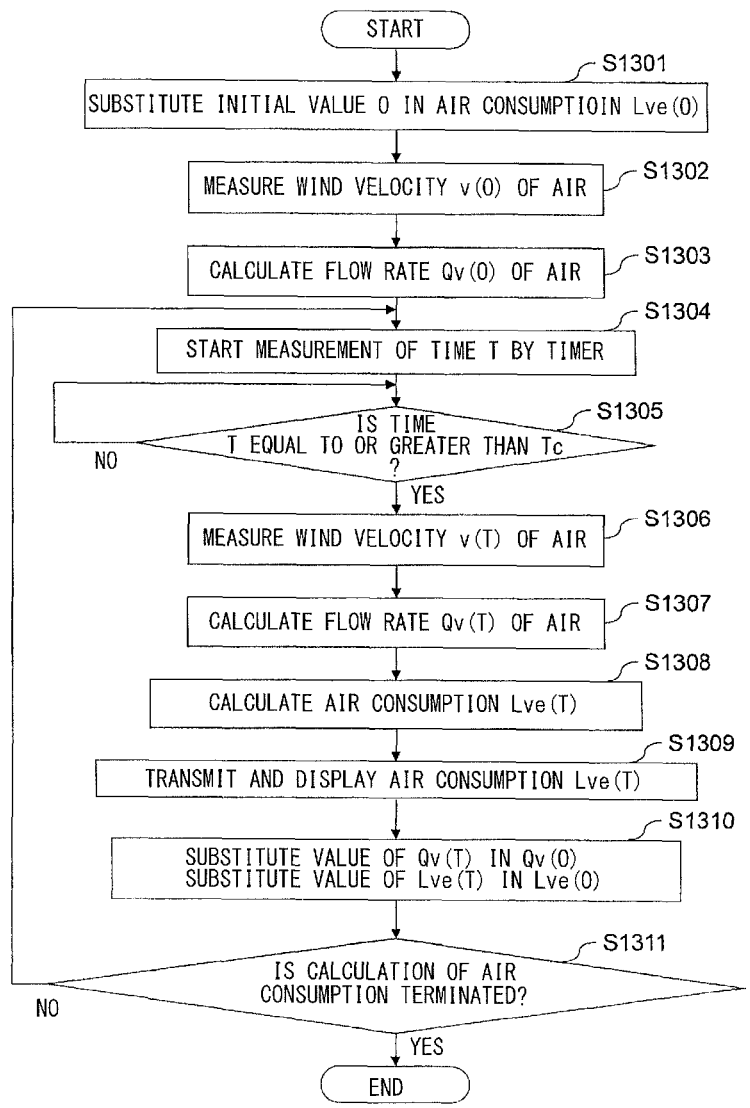
FIG. 15 is a diagram illustrating a method of calculating air consumption by ventilation in the laser unit according to the first embodiment of the disclosure.

FIG. 15 is a diagram illustrating a method of calculating the air consumption by the ventilation in the laser unit according to the first embodiment of the disclosure.

At step S1301, the laser controller 800 may substitute an initial value 0 in the air consumption Lve(0) by the ventilation in the laser unit 1010.

At step S1302, the laser controller 800 may measure a wind velocity v(0) of the air passing through the inside of the laser unit 1010 at the time 0 (time T=0), with use of the wind velocity sensor 150.

At step S1303, the laser controller 800 may calculate a flow rate Qv(0) of the air passing through the inside of the laser unit 1010 at the time 0 (time T=0), based on the wind velocity v(0) of the air. The flow rate Qv(0) of the air passing through the inside of the laser unit 1010 at the time 0 may be calculated according to an expression of Qv(0)=π(D/2)²·v(0) when the ventilation port 110 includes a circular opening with a diameter D.

At step S1304, the laser controller 800 may reset the time T of the timer (not illustrated) included in the laser controller 800 and may start measurement of the time T by the timer.

At step S1305, the laser controller 800 may determine whether or not the time T measured by the timer is equal to or greater than the predetermined value Tc. The predetermined value Tc may be a cycle of measurement of the electric energy Wh consumed by the laser unit 1010. The predetermined value Tc may be, for example, (1/3600) hours or greater and (1/60) hours or less. When the time T is equal to or greater than the predetermined value Tc, the laser controller 800 may proceed to step S1306. When the time T is less than the predetermined value Tc, the laser controller 800 may repeat the step S1305.

At step S1306, the laser controller 800 may measure the wind velocity v(T) of the air passing through the inside of the laser unit 1010 at the time T, with use of the wind velocity sensor 150.

At step S1307, the laser controller 800 may calculate the flow rate Qv(T) of the air passing through the inside of the laser unit 1010 at the time T, based on the wind velocity v(T) of the air. The flow rate Qv(T) of the air passing through the inside of the laser unit 1010 at the time T may be calculated according to an expression of Qv(T)=π(D/2)²·v(T) when the ventilation port 110 includes a circular opening with the diameter D.

At step S1308, the laser controller 800 may calculate the air consumption Lve(T) by the ventilation of the laser unit 1010, based on, for example, the flow rate Qv(T) of the air passing through the inside of the laser unit 1010, at the time T. It may be assumed that the flow rate of the air passing through the inside of the laser unit 1010 is linearly varied from Qv(0) to Qv(T) during a period from time 0 to time T. The air consumption Lve(T) by the ventilation of the laser unit 1010 may be calculated according to an expression of Lve(T)={Qv(T)+Qv(0)}(T/2)+Lve(0).

At step S1309, the laser controller 800 may transmit and display the calculated air consumption Lve(T) to/on the user interface 4020.

At step S1310, the laser controller 800 may substitute the value of Qv(T) in Qv(0) and may substitute the value of Lve(T) in Lve(0) in order to obtain an integrated value of the air consumption Lve(T).

At step S1311, the laser controller 800 may determine whether to terminate the calculation of the air consumption. When not terminating the calculation of the air consumption, the laser controller 800 may proceed to step S1304.

The air consumption by the ventilation of the laser unit 1010 may be calculated in such a manner.

Table 1 illustrates parameters obtained in the laser unit according to any embodiment of the disclosure.

TABLE 1

| Parameters |
| --- |
| Measurement start time |
| Measurement elapsed time |
| Measurement end time |
| Number of pulses of laser light after measurement start |
| Electric power of laser unit (kW) |
| Electric energy consumed by laser unit (kWh) |
| Flow rate of cooling water (liter/hour) |
| Consumption of cooling water (liter) |
| Consumption of mixed gas of argon and neon (liter) |
| Consumption of mixed gas of fluorine, argon, and neon (liter) |
| Flow rate of nitrogen gas (liter/hour) |
| Consumption of nitrogen gas (liter) |
| Flow rate of helium gas (liter/hour) |
| Consumption of helium gas (liter) |
| Flow rate of air for ventilation (liter/hour) |
| Air consumption for ventilation (liter) |
| Total cost per one pulse |

The values of the above-described parameters may be transmitted to the exposure apparatus controller 2010. The values of the above-described parameters may be transmitted to a computer through the Internet line 4010. The values of the above-described parameters may be displayed on the user interface 4020. The laser controller 800 may calculate a ratio (%) of each value of the consumptions of the above-described parameters to the corresponding reference value of the consumptions. The ratio (%) of each value of the consumptions of the above-described parameters to the corresponding reference value of the consumptions may be displayed on the user interface 4020. The laser controller 800 may calculate cost for one pulse relating to each of the consumptions of the above-described parameters. The cost for one pulse relating to each of the consumptions of the above-described parameters may be displayed on the user interface 4020. The laser controller 800 may calculate accumulated cost for a plurality of pulses relating to each of the consumptions of the above-described parameters. The accumulated cost for the plurality of pulses relating to each of the consumptions of the above-described parameters may be displayed on the user interface 4020. The values of the above-described parameters may be transmitted to the FDC system 4030.

Figure 16:
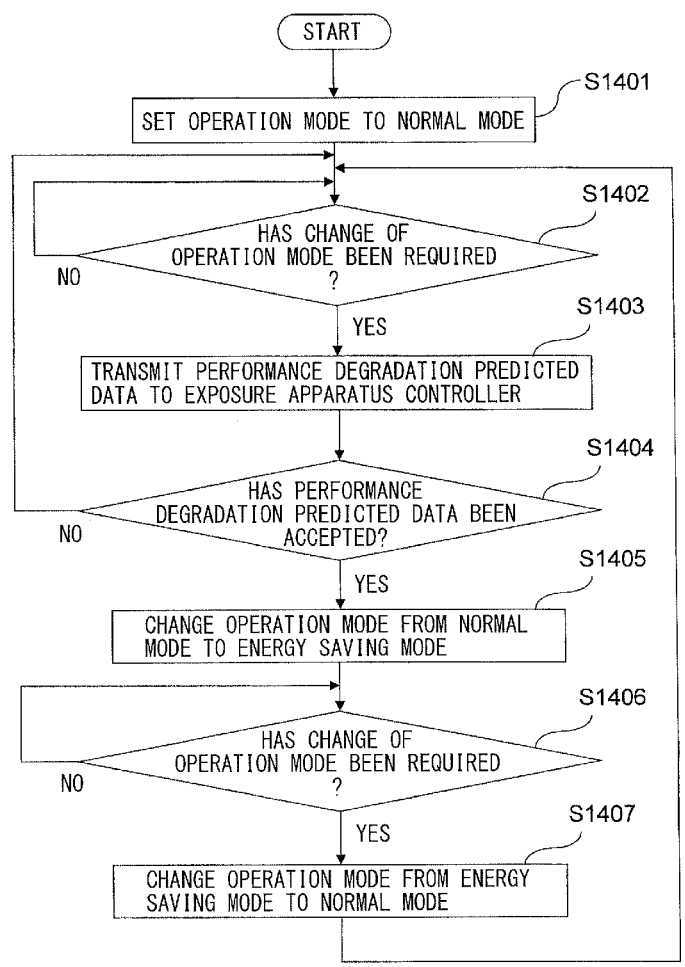
FIG. 16 is a diagram illustrating operation for energy saving that depends on laser gas condition in the laser unit according to the first embodiment of the disclosure.

3.3 Energy Saving and Resource Saving in Laser Unit According to First Embodiment of Disclosure FIG. 16 is a diagram illustrating operation for energy saving depending on a condition of the laser gas in the laser unit according to the first embodiment of the disclosure.

At step S1401, the laser controller 800 may set the operation mode of the laser unit 1010 to the normal mode.

At step S1402, the laser controller 800 may determine whether the change of the operation mode has been required by the exposure apparatus controller 2010. The change of the operation mode may be change from the normal mode to the energy saving mode. When the change of the operation mode has been required by the exposure apparatus controller 2010, the laser controller 800 may proceed to step S1403. When the change of the operation mode has not been required by the exposure apparatus controller 2010, the laser controller 800 may repeat the step S1402.

At step S1403, the laser controller 800 may transmit, to the exposure apparatus controller 2010, performance degradation predicted data for the laser unit 1010 in the case where the operation mode is changed from the normal mode to the energy saving mode. The performance degradation predicted data for the laser unit 1010 may be stored in the memory (not illustrated) included in the laser controller 800. The performance degradation predicted data for the laser unit 1010 may be within a range of energy dispersion σE of the laser light (for example, a maximum value and a minimum value of the energy dispersion σE of the laser light). The energy dispersion σE of the laser light may be dispersion of an energy value of the laser light for the plurality of pulses measured by the pulse energy sensor 520.

At step S1404, the laser controller 800 may determine whether the performance degradation predicted data transmitted to the exposure apparatus controller 2010 has been accepted by the exposure apparatus controller 2010. When the performance degradation predicted data has been accepted by the exposure apparatus controller 2010, the laser controller 800 may proceed to step S1405. When the performance degradation predicted data has not been accepted by the exposure apparatus controller 2010, the laser controller 800 may return to the step S1402.

At step S1405, the laser controller 800 may change the operation mode of the laser unit 1010 from the normal mode to the energy saving mode.

At step S1406, the laser controller 800 may determine whether change of the operation mode has been required by the exposure apparatus controller 2010. The change of the operation mode may be change from the energy saving mode to the normal mode. When change of the operation mode has been required by the exposure apparatus controller 2010, the laser controller 800 may proceed to step S1407. When change of the operation mode has not been required by the exposure apparatus controller 2010, the laser controller 800 may repeat the step S1406.

At step S1407, the laser controller 800 may change the operation mode of the laser unit 1010 from the energy saving mode to the normal energy mode.

In the foregoing way, the laser controller 800 may change the operation mode of the laser unit 1010 and may achieve energy saving of the laser unit 1010 in response to requirement of change of the operation mode by the exposure apparatus controller 2010.

Figure 17:
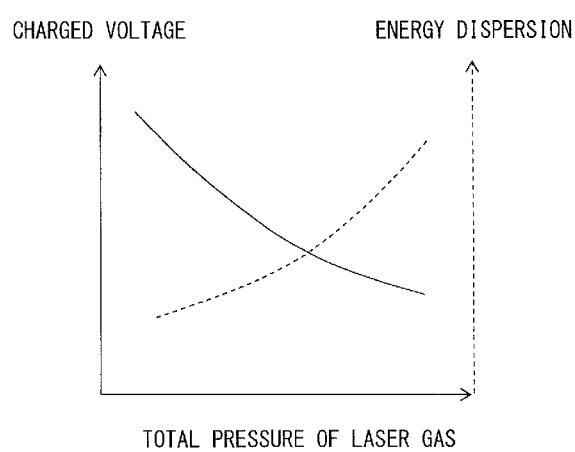
FIG. 17 is a diagram illustrating relationship between entire pressure of laser gas and both of charged voltage and energy dispersion in the laser unit according to the first embodiment of the disclosure.

FIG. 17 is a diagram illustrating relationship between total pressure of the laser gas and both of the charged voltage and the energy dispersion in the laser unit according to the first embodiment of the disclosure. A horizontal axis in FIG. 17 may indicate total pressure of the laser gas in the chamber 200. A vertical axis in FIG. 17 may indicate a charged voltage Vhv applied between the first electrode 250a and the second electrode 250b by the charger 600 or the energy dispersion σE of the laser light.

In the laser unit 1010, the setting value of the energy of the laser light and the partial pressure of the fluorine gas contained in the laser gas may be fixed. When the setting value of the energy of the laser light and the partial pressure of the fluorine gas contained in the laser gas are fixed, the charged voltage Vhv applied between the first electrode 250a and the second electrode 250b by the charger 600 may be reduced as the total pressure Pt of the laser gas increases. The consumed electric power and the electric energy consumed by the charger 600 may be reduced as the total pressure Pt of the laser gas increases. The pulse energy dispersion σE of the laser light, however, may increase as the total pressure Pt of the laser gas increases. The performance degradation predicted data transmitted to the exposure apparatus controller 2010 may be data relating to increase in the pulse energy dispersion σE of the laser light with respect to increase in the total pressure Pt of the laser gas.

Figure 18:
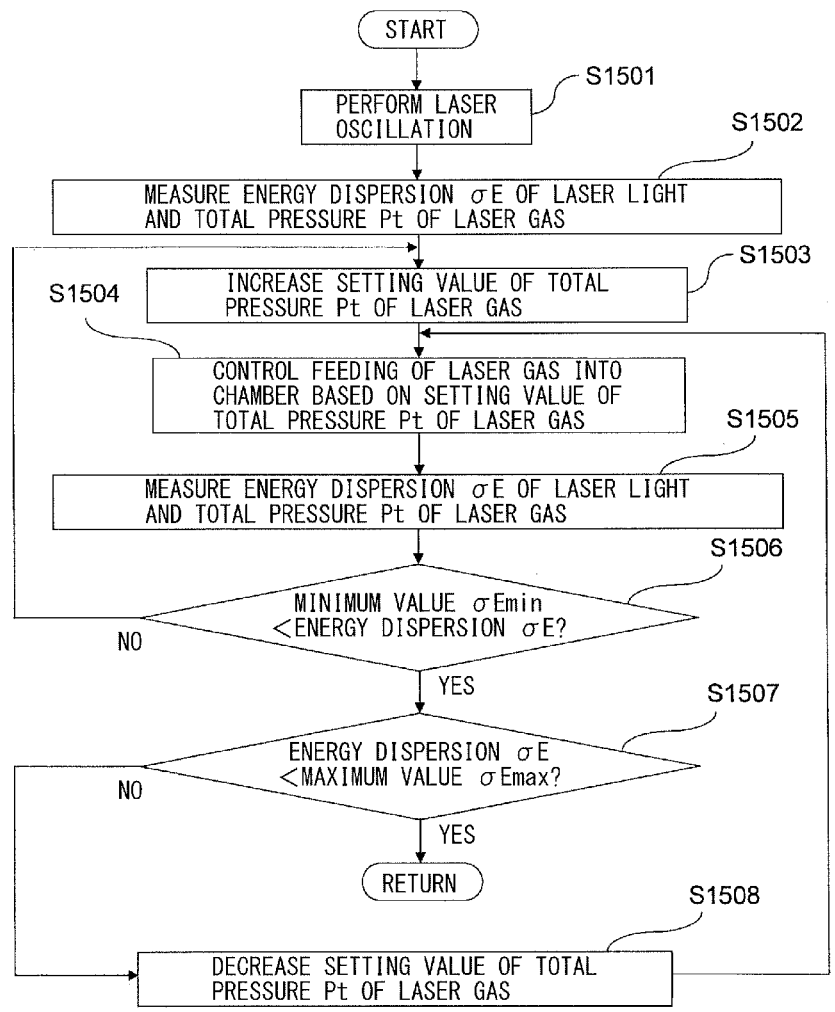
FIG. 18 is a diagram illustrating a subroutine in which a mode is changed from a normal mode to an energy saving mode in response to increase in the entire pressure of the laser gas in the laser unit according to the first embodiment of the disclosure.

FIG. 18 is a diagram illustrating a sub-routine that changes the operation mode from the normal mode to the energy saving mode in response to increase in the total pressure of the laser gas in the laser unit according to the first embodiment of the disclosure.

The sub-routine illustrated in FIG. 18 may be a routine that executes the step S1405 in the main routine illustrated in FIG. 16.

At step S1501, the laser controller 800 may control the laser unit 1010 to perform laser oscillation.

At step S1502, the laser controller 800 may use the pulse energy sensor 520 to measure the energy dispersion σE of the laser light. The laser controller 800 may use the pressure sensor 270 to measure the total pressure Pt of the laser gas.

At step S1503, the laser controller 800 may increase the setting value of the total pressure Pt of the laser gas.

At step S1504, the laser controller 800 may control feeding of the laser gas to the chamber 200 through the gas controller 810, based on the setting value of the total pressure Pt of the laser gas. The laser controller 800 may control the feeding of the laser gas to the chamber 200 to allow the total pressure Pt of the laser gas to be the changed setting value of the total pressure Pt of the laser gas.

At step S1505, the laser controller 800 may use the pulse energy sensor 520 to measure the energy dispersion σE of the laser light. The laser controller 800 may use the pressure sensor 270 to measure the total pressure Pt of the laser gas.

At step S1506, the laser controller 800 may determine whether the energy dispersion σE of the laser light is larger than a predetermined minimum value σEmin of the energy dispersion σE of the laser light. The predetermined minimum value σEmin of the energy dispersion σE of the laser light may be determined depending on a usage condition of the semiconductor exposure apparatus 2000. When the energy dispersion σE of the laser light is larger than the predetermined minimum value σEmin of the energy dispersion σE of the laser light, the laser controller 800 may proceed to step S1507. When the energy dispersion σE of the laser light is equal to or less than the predetermined minimum value σEmin of the energy dispersion σE of the laser light, the laser controller 800 may proceed to the step S1503.

At step S1507, the laser controller 800 may determine whether the energy dispersion σE of the laser light is smaller than a predetermined maximum value σEmax of the energy dispersion σE of the laser light. The predetermined maximum value σEmax of the energy dispersion σE of the laser light may be determined depending on the usage condition of the semiconductor exposure apparatus 2000. When the energy dispersion σE of the laser light is smaller than the predetermined maximum value σEmax of the energy dispersion σE of the laser light, the laser controller 800 may return to the main routine. When the energy dispersion σE of the laser light is equal to or larger than the predetermined maximum value σEmax of the energy dispersion σE of the laser light, the laser controller 800 may proceed to step S1508.

At step S1508, the laser controller 800 may decrease the setting value of the total pressure Pt of the laser gas. After decreasing the setting value of the total pressure Pt of the laser gas, the laser controller 800 may proceed to the step S1504.

In this way, the laser controller 800 may adjust the setting value of the total pressure Pt of the laser gas to allow the energy dispersion σE of the laser light to satisfy the relationship of σEmin<σE<σEmax.

When the energy dispersion σE of the laser light is accepted under the usage condition of the semiconductor exposure apparatus 2000, the setting value of the total pressure Pt of the laser gas in the energy saving mode may be increased with respect to the setting value of the total pressure Pt of the laser gas in the normal mode. This may reduce the charged voltage Vhv to be applied between the first electrode 250a and the second electrode 250b by the charger 600 and may reduce the electric energy consumed by the charger 600.

Figure 19:
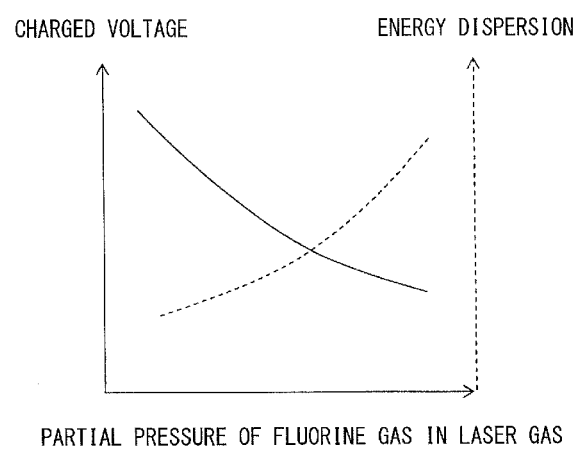
FIG. 19 is a diagram illustrating relationship between partial pressure of fluorine gas in the laser gas and both of charged voltage and energy dispersion in the laser unit according to the first embodiment of the disclosure.

FIG. 19 is a diagram illustrating relationship between the partial pressure of the fluorine gas in the laser gas and both of the charged voltage and the energy dispersion in the laser unit according to the first embodiment of the disclosure. A horizontal axis in FIG. 19 may indicate the partial pressure of the fluorine gas in the laser gas in the chamber 200. A vertical axis in FIG. 19 may indicate the charged voltage Vhv to be applied between the first electrode 250a and the second electrode 250b by the charger 600 and the energy dispersion σE of the laser light.

In the laser unit 1010, the setting value of the energy of the laser light and the total pressure of the laser gas may be fixed. When the setting value of the energy of the laser light and the total pressure of the laser gas are fixed, the charged voltage Vhv to be applied between the first electrode 250a and the second electrode 250b by the charger 600 may be reduced as the partial pressure $P_{F2}$ of the fluorine gas in the laser gas increases. The consumed electric power and the electric energy consumed by the charger 600 may be reduced as the partial pressure $P_{F2}$ of the fluorine gas in the laser gas increases. The pulse energy dispersion σE of the laser light, however, may increase as the partial pressure $P_{F2}$ of the fluorine gas in the laser gas increases. The performance degradation predicted data to be transmitted to the exposure apparatus controller 2010 may be data relating to increase in the pulse energy dispersion σE of the laser light with respect to the increase in the partial pressure $P_{F2}$ of the fluorine gas in the laser gas.

Figure 20:
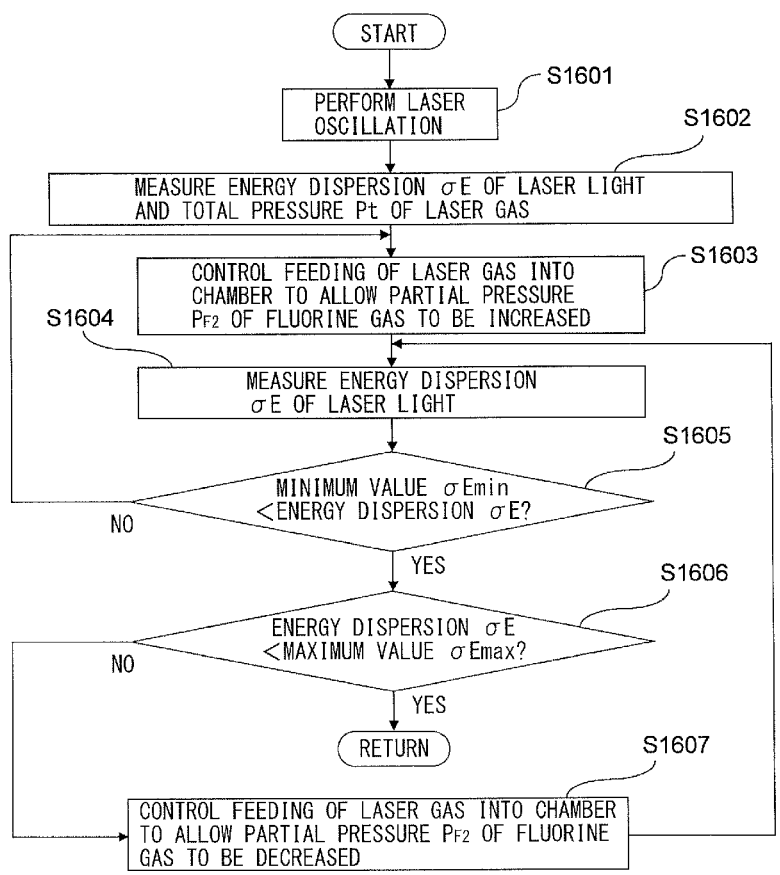
FIG. 20 is a diagram illustrating a subroutine in which a mode is changed from the normal mode to the energy saving mode in response to increase in the partial pressure of the fluorine gas in the laser gas in the laser unit according to the first embodiment of the disclosure.

FIG. 20 is a diagram illustrating a sub-routine that changes the operation mode from the normal mode to the energy saving mode in response to the increase in the partial pressure of the fluorine gas in the laser gas, in the laser unit according to the first embodiment of the disclosure.

The sub-routine illustrated in FIG. 20 may be a routine that executes the step S1405 in the main routine illustrated in FIG. 16.

At step S1601, the laser controller 800 may control the laser unit 1010 to perform laser oscillation.

At step S1602, the laser controller 800 may use the pulse energy sensor 520 to measure the energy dispersion σE of the laser light. The laser controller 800 may use the pressure sensor 270 to measure the total pressure Pt of the laser gas. The laser controller 800 may calculate the partial pressure $P_{F2}$ of the fluorine gas in the laser gas, based on the total pressure Pt of the laser gas, the flow rate of the laser gas to be fed from the first gas cylinder 3010 to the chamber 200, and the flow rate of the laser gas to be fed from the second gas cylinder 3020 to the chamber 200.

At step S1603, the laser controller 800 may so control, through the gas controller 810, feeding of the laser gas to the chamber 200 as to increase the partial pressure $P_{F2}$ of the fluorine gas in the laser gas.

At step S1604, the laser controller 800 may use the pulse energy sensor 520 to measure the energy dispersion σE of the laser light.

At step S1605, the laser controller 800 may determine whether the energy dispersion σE of the laser light is larger than the predetermined minimum value σEmin of the energy dispersion σE of the laser light. The predetermined minimum value σEmin of the energy dispersion σE of the laser light may be determined depending on the usage condition of the semiconductor exposure apparatus 2000. When the energy dispersion σE of the laser light is larger than the predetermined minimum value σEmin of the energy dispersion σE of the laser light, the laser controller 800 may proceed to step S1606. When the energy dispersion σE of the laser light is equal to or less than the predetermined minimum value σEmin of the energy dispersion σE of the laser light, the laser controller 800 may proceed to the step S1603.

At step S1606, the laser controller 800 may determine whether the energy dispersion σE of the laser light is smaller than the predetermined maximum value σEmax of the energy dispersion σE of the laser light. The predetermined maximum value σEmax of the energy dispersion σE of the laser light may be determined depending on the usage condition of the semiconductor exposure apparatus 2000. When the energy dispersion σE of the laser light is smaller than the predetermined maximum value σEmax of the energy dispersion σE of the laser light, the laser controller 800 may return to the main routine. When the energy dispersion σE of the laser light is equal to or larger than the predetermined maximum value σEmax of the energy dispersion σE of the laser light, the laser controller 800 may proceed to step S1607.

At step S1607, the laser controller 800 may so control, through the gas controller 810, the feeding of the laser gas to the chamber 200 as to decrease the partial pressure $P_{F2}$ of the fluorine gas in the laser gas. After decreasing the partial pressure $P_{F2}$ of the fluorine gas in the laser gas, the laser controller 800 may proceed to the step S1604.

In this way, the laser controller 800 may adjust the partial pressure $P_{F2}$ of the fluorine gas in the laser gas to allow the energy dispersion σE of the laser light to satisfy the relationship of σEmin<σE<σEmax.

When the energy dispersion σE of the laser light is accepted under the usage condition of the semiconductor exposure apparatus 2000, the partial pressure $P_{F2}$ of the fluorine gas in the laser gas in the energy saving mode may be increased with respect to the partial pressure $P_{F2}$ of the fluorine gas in the laser gas in the normal mode. This may reduce the charged voltage Vhv to be applied between the first electrode 250a and the second electrode 250b by the charger 600 and may reduce the electric energy consumed by the charger 600.

Figure 21:
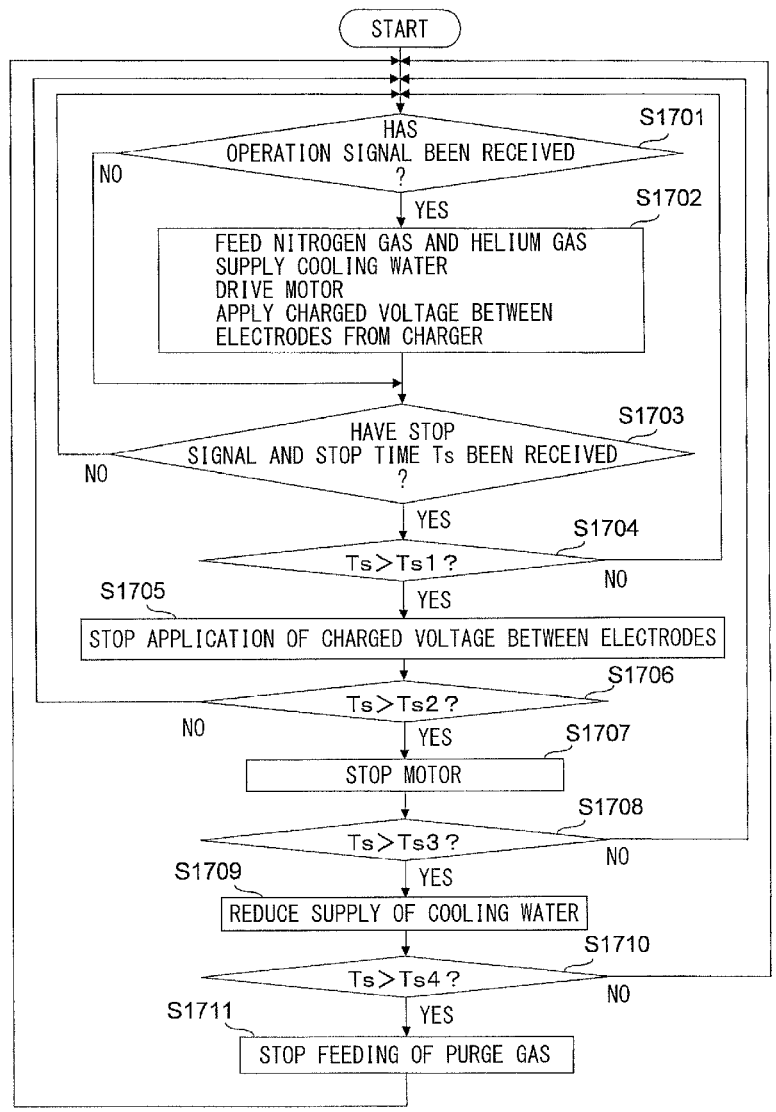
FIG. 21 is a diagram illustrating operation for energy saving and resource saving that depend on stop time in the laser unit according to the first embodiment of the disclosure.

FIG. 21 is a diagram illustrating operation for energy saving and resource saving depending on stop time in the laser unit according to the first embodiment of the disclosure.

At step S1701, the laser controller 800 may determine whether an operation signal of the laser unit 1010 has been received from the exposure apparatus controller 2010 of the semiconductor exposure apparatus 2000. When the operation signal of the laser unit 1010 has been received from the exposure apparatus controller 2010, the laser controller 800 may proceed to step S1702. When the operation signal of the laser unit 1010 has not been received from the exposure apparatus controller 2010, the laser controller 800 may proceed to step S1703.

At step S1702, the laser controller 800 may feed helium gas and nitrogen gas to the line narrow module 300 and the energy monitor 500, respectively, through the purge gas feeder 920. The laser controller 800 may then feed cooling water to the laser unit 1010. The laser controller 800 may then drive the motor 240 that rotates the cross flow fan 230. The laser controller 800 may then apply the charged voltage between the first electrode 250a and the second electrode 250b from the charger 600.

At step S1703, the laser controller 800 may determine whether a stop signal and a stop time Ts of the laser unit 1010 have been received from the exposure apparatus controller 2010 of the semiconductor exposure apparatus 2000. When the stop signal and the stop time Ts of the laser unit 1010 have been received from the exposure apparatus controller 2010, the laser controller 800 may proceed to step S1704. When the stop signal and the stop time Ts of the laser unit 1010 have not been received from the exposure apparatus controller 2010, the laser controller 800 may proceed to the step S1701.

At step S1704, the laser controller 800 may determine whether the stop time Ts is greater than a predetermined stop time Ts1. The predetermined stop time Ts1 may be, for example, 30 seconds. When the stop time Ts is greater than the predetermined stop time Ts1, the laser controller 800 may proceed to step S1705. When the stop time Ts is not greater than the predetermined stop time Ts1, the laser controller 800 may proceed to the step S1701.

At step S1705, the laser controller 800 may stop application of the charged voltage between the first electrode 250a and the second electrode 250b from the charger 600.

At step S1706, the laser controller 800 may determine whether the stop time Ts is greater than a predetermined stop time Ts2. The predetermined stop time Ts2 may be greater than the predetermined stop time Ts1. The predetermined stop time Ts2 may be, for example, 3 minutes or more and 5 minutes or less. When the stop time Ts is greater than the predetermined stop time Ts2, the laser controller 800 may proceed to step S1707. When the stop time Ts is not greater than the predetermined stop time Ts2, the laser controller 800 may proceed to the step S1701.

At step S1707, the laser controller 800 may stop the motor 240 that rotates the cross flow fan 230. The rotation of the cross flow fan 230 may be stopped by stop of the motor 240.

At step S1708, the laser controller 800 may determine whether the stop time Ts is greater than a predetermined stop time Ts3. The predetermined stop time Ts3 may be greater than the predetermined stop time Ts2. The predetermined stop time Ts3 may be, for example, 1 hour or more and 5 hours or less. When the stop time Ts is greater than the predetermined stop time Ts3, the laser controller 800 may proceed to step S1709. When the stop time Ts is not greater than the predetermined stop time Ts3, the laser controller 800 may proceed to the step S1701.

At step S1709, the laser controller 800 may reduce or stop supply of the cooling water to the laser unit 1010. The supply of the cooling water to the laser unit 1010 may be reduced to a minimum flow rate of the cooling water. The cooling of the components of the laser unit 1010 may be reduced or stopped by the reduction or the stop of the supply of the cooling water to the laser unit 1010.

At step S1710, the laser controller 800 may determine whether the stop time Ts is greater than a predetermined stop time Ts4. The predetermined stop time Ts4 may be greater than the predetermined stop time Ts3. The predetermined stop time Ts4 may be, for example, 5 hours or more and 24 hours or less. When the stop time Ts is greater than the predetermined stop time Ts4, the laser controller 800 may proceed to step S1711. When the stop time Ts is not greater than the predetermined stop time Ts4, the laser controller 800 may proceed to step S1701.

At step S1711, the laser controller 800 may stop the feeding of the helium gas to the line narrow module 300 and the feeding of the nitrogen gas to the energy monitor 500. This may stop cleaning of the optical system of the laser unit 1010 by the helium gas and the nitrogen gas.

In this way, one or more of the feeding of the purge gas to the laser unit 1010, the supply of the cooling water to the laser unit 1010, the driving of the motor 240, and the application of the charged voltage may be reduced or stopped depending on the stop time Ts transmitted from the exposure apparatus controller 2010. The energy saving and the resource saving in the laser unit 1010 may be performed depending on the stop time Ts transmitted from the exposure apparatus controller 2010.

Figure 22:
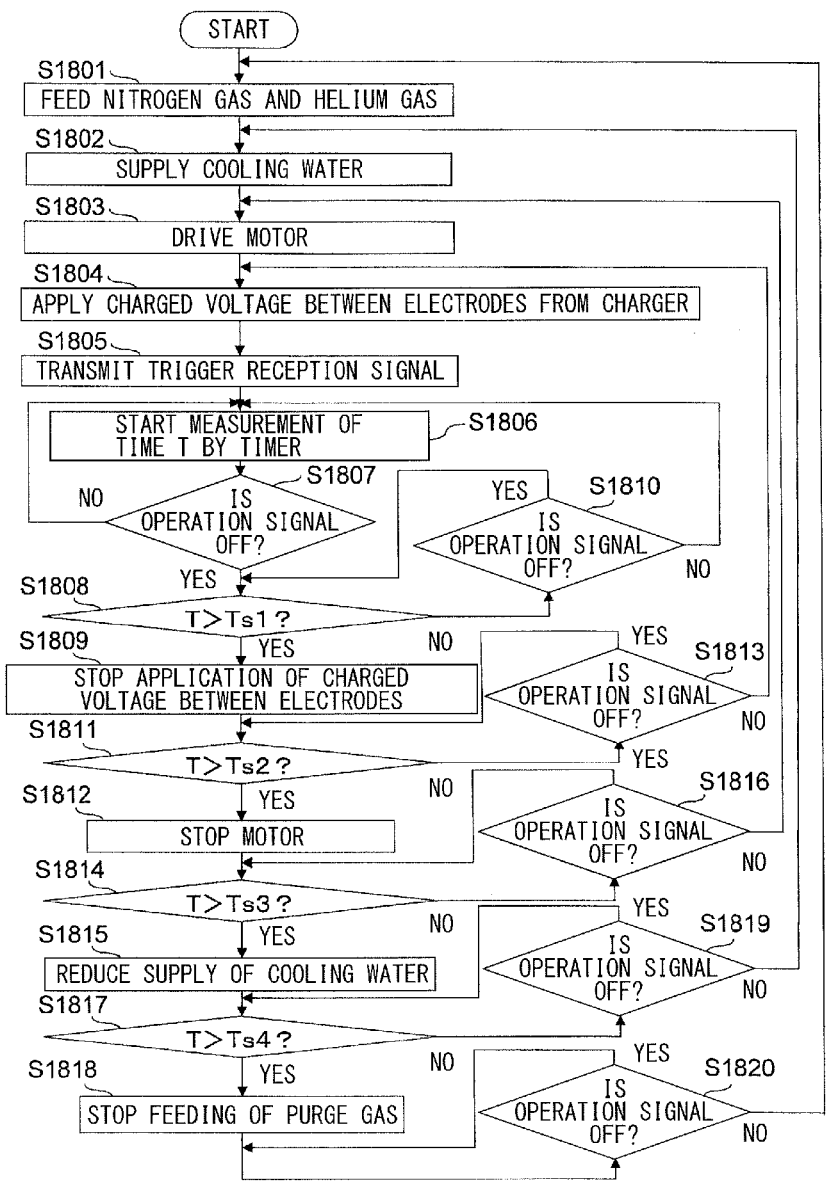
FIG. 22 is a diagram illustrating operation for energy saving and resource saving by monitoring the stop time in the laser unit according to the first embodiment of the disclosure.

FIG. 22 is a diagram illustrating operation for energy saving and resource saving by monitoring the stop time in the laser unit according to the first embodiment of the disclosure.

At step S1801, the laser controller 800 may feed the helium gas and the nitrogen gas to the line narrow module 300 and the energy monitor 500, respectively, through the purge gas feeder 920.

At step S1802, the laser controller 800 may supply the cooling water to the laser unit 1010.

At step S1803, the laser controller 800 may drive the motor 240 that rotates the cross flow fan 230.

At step S1804, the laser controller 800 may apply the charged voltage between the first electrode 250a and the second electrode 250b from the charger 600.

At step S1805, the laser controller 800 may transmit a trigger reception signal to the exposure apparatus controller 2010. The trigger reception signal may be a signal indicating standby of the laser controller 800 to receive trigger from the exposure apparatus controller 2010.

At step S1806, the laser controller 800 may reset the time T of the timer (not illustrated) included in the laser controller 800 and may start measurement of the time T by the timer.

At step S1807, the laser controller 800 may determine whether the operation signal of the laser unit 1010 has not been received from the exposure apparatus controller 2010 (whether the operation signal of the laser unit 1010 is OFF). When the operation signal of the laser unit 1010 has not been received from the exposure apparatus controller 2010, the laser controller 800 may proceed to step S1808. When the operation signal of the laser unit 1010 has been received from the exposure apparatus controller 2010, the laser controller 800 may proceed to the step S1806.

At step S1808, the laser controller 800 may determine whether the time T is greater than the predetermined stop time Ts1. The predetermined stop time Ts1 may be, for example, 5 seconds. When the time T is greater than the predetermined stop time Ts1, the laser controller 800 may proceed to step S1809. When the time T is not greater than the predetermined stop time Ts1, the laser controller 800 may proceed to step S1810.

At step S1809, the laser controller 800 may stop application of the charged voltage between the first electrode 250a and the second electrode 250b from the charger 600.

At step S1810, the laser controller 800 may determine whether the operation signal of the laser unit 1010 has not been received from the exposure apparatus controller 2010 (whether the operation signal of the laser unit 1010 is OFF). When the operation signal of the laser unit 1010 has not been received from the exposure apparatus controller 2010, the laser controller 800 may repeat the step S1808. When the operation signal of the laser unit 1010 has been received from the exposure apparatus controller 2010, the laser controller 800 may proceed to the step S1806.

At step S1811, the laser controller 800 may determine whether the stop time Ts is greater than the predetermined stop time Ts2. The predetermined stop time Ts2 may be greater than the predetermined stop time Ts1. The predetermined stop time period Ts2 may be, for example, 1 minute. When the stop time Ts is greater than the predetermined stop time Ts2, the laser controller 800 may proceed to step S1812. When the stop time Ts is not greater than the predetermined stop time Ts2, the laser controller 800 may proceed to step S1813.

At step S1812, the laser controller 800 may stop the motor 240 that rotates the cross flow fan 230. The rotation of the cross flow fan 230 may be stopped by stop of the motor 240.

At step S1813, the laser controller 800 may determine whether the operation signal of the laser unit 1010 has not been received from the exposure apparatus controller 2010 (whether the operation signal of the laser unit 1010 is OFF). When the operation signal of the laser unit 1010 has not been received from the exposure apparatus controller 2010, the laser controller 800 may repeat the step S1811. When the operation signal of the laser unit 1010 has been received from the exposure apparatus controller 2010, the laser controller 800 may proceed to the step S1804.

At step S1814, the laser controller 800 may determine whether the stop time Ts is greater than the predetermined stop time Ts3. The predetermined stop time Ts3 may be greater than the predetermined stop time Ts2. The predetermined stop time Ts3 may be, for example, 10 minutes. When the stop time Ts is greater than the predetermined stop time Ts3, the laser controller 800 may proceed to step S1815. When the stop time Ts is not greater than the predetermined stop time Ts3, the laser controller 800 may proceed to step S1816.

At step S1815, the laser controller 800 may reduce or stop the supply of the cooling water to the laser unit 1010. The supply of the cooling water to the laser unit 1010 may be reduced to a minimum flow rate of the cooling water. The cooling of the components of the laser unit 1010 may be reduced or stopped by the reduction or the stop of the supply of the cooling water to the laser unit 1010.

At step S1816, the laser controller 800 may determine whether the operation signal of the laser unit 1010 has not been received from the exposure apparatus controller 2010 (whether the operation signal of the laser unit 1010 is OFF). When the operation signal of the laser unit has not been received from the exposure apparatus controller 2010, the laser controller 800 may repeat the step S1814. When the operation signal of the laser unit 1010 has been received from the exposure apparatus controller 2010, the laser controller 800 may proceed to step S1803.

At step S1817, the laser controller 800 may determine whether the stop time Ts is greater than the predetermined stop time Ts4. The predetermined stop time Ts4 may be greater than the predetermined stop time Ts3. The predetermined stop time Ts4 may be, for example, one hour. When the stop time Ts is greater than the predetermined stop time Ts4, the laser controller 800 may proceed to step S1818. When the stop time Ts is not greater than the predetermined stop time Ts4, the laser controller 800 may proceed to step S1819.

At step S1818, the laser controller 800 may stop the feeding of the helium gas to the line narrow module 300 and the feeding of the nitrogen gas to the energy monitor 500. This may stop the cleaning of the optical system in the laser unit 1010 by the helium gas and the nitrogen gas.

At step S1819, the laser controller 800 may determine whether the operation signal of the laser unit 1010 has not been received from the exposure apparatus controller 2010 (whether the operation signal of the laser unit 1010 is OFF). When the operation signal of the laser unit 1010 has not been received from the exposure apparatus controller 2010, the laser controller 800 may repeat the step S1817. When the operation signal of the laser unit 1010 has been received from the exposure apparatus controller 2010, the laser controller 800 may proceed to the step S1802.

At step S1820, the laser controller 800 may determine whether the operation signal of the laser unit 1010 has not been received from the exposure apparatus controller 2010 (whether the operation signal of the laser unit 1010 is OFF). When the operation signal of the laser unit 1010 has not been received from the exposure apparatus controller 2010, the laser controller 800 may be in a standby state. When the operation signal of the laser unit 1010 has been received from the exposure apparatus controller 2010, the laser controller 800 may proceed to the step S1801.

In this way, a duration of the time T in which the operation signal of the laser unit 1010 is not received from the exposure apparatus controller 2010 (a duration of time in which the laser unit is stopped) may be monitored. One or more of the feeding of the purge gas to the laser unit 1010, the supply of the cooling water to the laser unit 1010, the driving of the motor 240, and the application of the charged voltage may be reduced or stopped depending on the duration of the time T in which the laser unit 1010 is stopped. The energy saving and the resource saving of the laser unit 1010 may be performed depending on the duration of the time T in which the laser unit 1010 is stopped.

Figure 23:
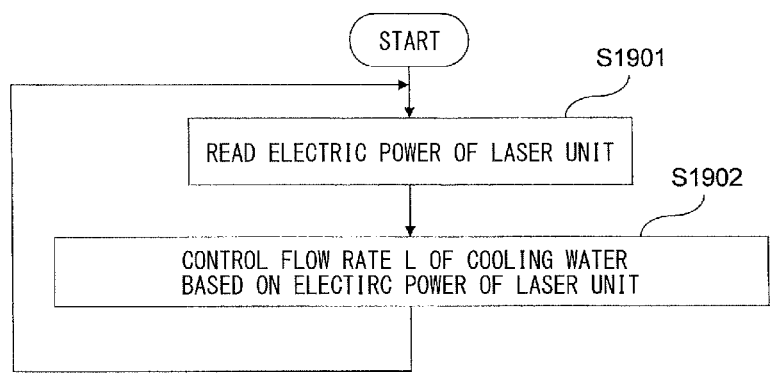
FIG. 23 is a diagram illustrating operation to reduce cooling water consumption in the laser unit according to the first embodiment of the disclosure.

FIG. 23 is a diagram illustrating operation of reducing consumption of the cooling water in the laser unit according to the first embodiment of the disclosure.

At step S1901, the laser controller 800 may read out the electric power of the laser unit 1010. The laser controller 800 may read out the electric power measured by the wattmeter 5010. The laser controller 800 may read out a value of the total power of the motor 240, the charger 600, the laser controller 800, and other devices included in the laser unit 1010. The electric power Ed of the charger 600 may be calculated according to an expression of $Ed = (a \cdot Vhv^2 + b \cdot Vhv + c) \cdot f$, where Vhv may be the charged voltage to be applied between the first electrode 250a and the second electrode 250b, a, b, and c each may be a predetermined coefficient, and f may denote a repetition frequency of pulse.

At step S1902, the laser controller 800 may control the flow rate L of the cooling water in the laser unit 1010, based on the electric power of the laser unit 1010. The flow rate L of the cooling water in the laser unit 1010 may be controlled by using the flow-rate control valve Vw. The flow rate L of the cooling water in the laser unit 1010 may be so controlled as to be proportional to the electric power Ed of the laser unit 1010. A flow-rate control valve may be provided in each piping for the cooling water in the laser unit 1010. The flow rate L of the cooling water in the laser unit 1010 may be controlled by the flow-rate control valve provided in the piping for the cooling water in the laser unit 1010. The flow rate of the cooling water passing through the charger 600 may be so controlled, by the flow-rate control valve provided in the piping for the cooling water that passes through the charger 600, as to be proportional to the electric power Ed of the charger 600. The flow rate of the cooling water passing through the pulse power module 700 may be so controlled, by the flow-rate control valve provided in the piping for the cooling water that passes through the pulse power module 700, as to be proportional to the electric power Ed of the charger 600. The flow rate of the cooling water passing through the heat exchanger 280 may be so controlled, by the flow-rate control valve provided in the piping for the cooling water that passes through the heat exchanger 280, as to be proportional to the electric power Ed of the charger 600. The flow rate of the cooling water passing through the motor 240 may be so controlled, by the flow-rate control valve provided in the piping for the cooling water that passes through the motor 240, as to be proportional to the electric power Em of the motor.

In this way, controlling the flow rates of the cooling water in the laser unit 1010 based on the electric power of the laser unit 1010 may reduce the consumption of the cooling water in the laser unit 1010.

Figure 24:
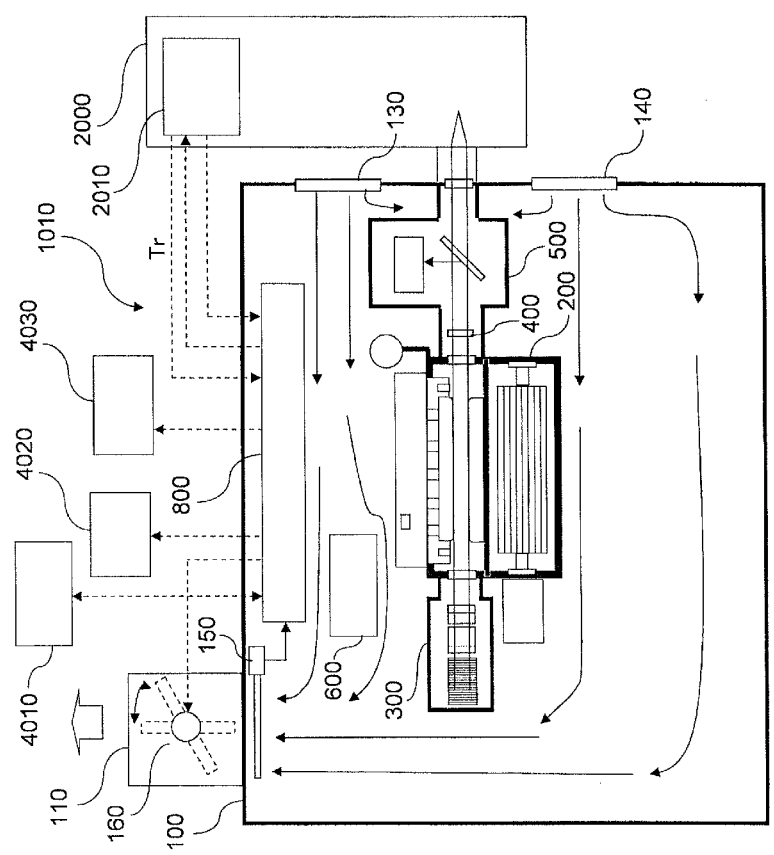
FIG. 24 is a diagram illustrating a configuration to reduce air consumption by the ventilation in the laser unit according to the first embodiment of the disclosure.

FIG. 24 is a diagram illustrating a configuration that reduces the air consumption by the ventilation in the laser unit according to the first embodiment of the disclosure. Components of the laser unit illustrated in FIG. 24 substantially same as those of the laser unit illustrated in FIG. 8 are denoted by the same reference numerals, and any redundant description thereof is omitted. Components of a semiconductor exposure apparatus illustrated in FIG. 24 substantially same as those of the semiconductor exposure apparatus illustrated in FIG. 8 are denoted by the same reference numerals, and any redundant description thereof is omitted.

An automatic butterfly valve 160 may be provided in the ventilation port 110 of the laser unit 1010. The automatic butterfly valve 160 may be coupled to the laser controller 800. The laser controller 800 may control the automatic butterfly valve 160, based on the electric power of the laser unit 1010. Controlling the automatic butterfly valve 160 may adjust the flow rate of the air by the ventilation in the laser unit 1010. The flow rate of the air by the ventilation in the laser unit 1010 may be so adjusted as to be proportional to the electric power of the laser unit 1010. Controlling the automatic butterfly valve 160 may reduce the air consumption by the ventilation in the laser unit 1010.

Figure 25:
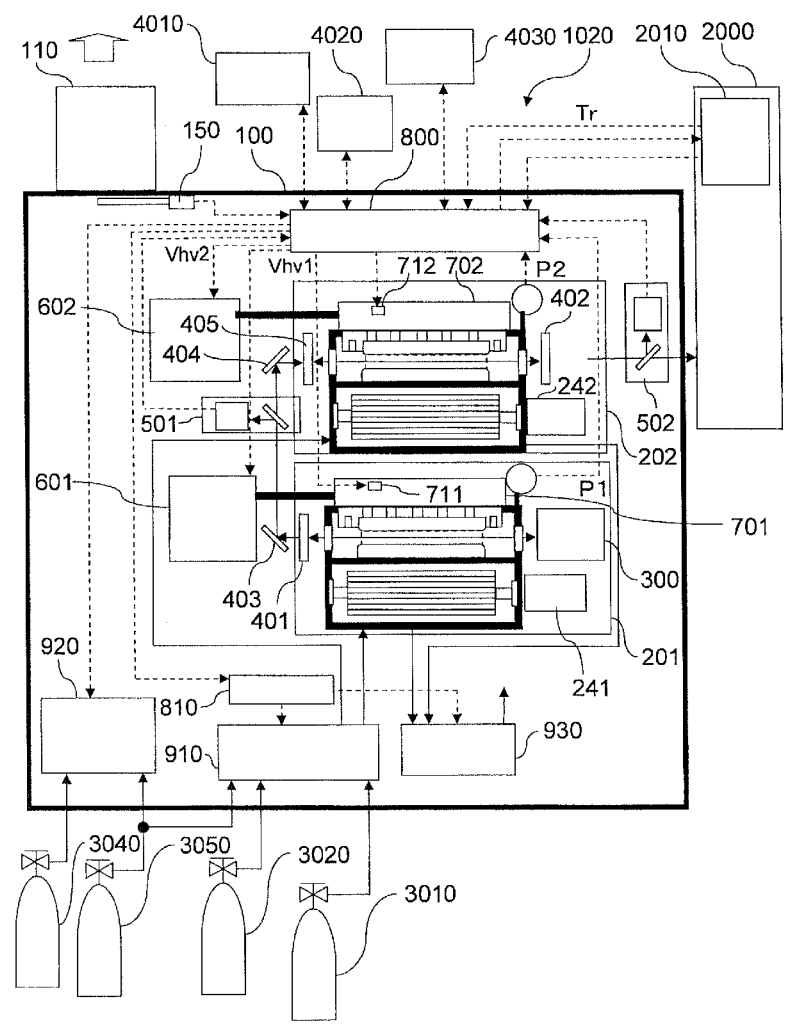
FIG. 25 is a diagram illustrating a configuration of a laser unit according to a second embodiment of the disclosure.

4. Laser Unit According to Second Embodiment of Disclosure 4.1 Configuration and Operation of Laser Unit According to Second Embodiment of Disclosure FIG. 25 is a diagram illustrating a configuration of a laser unit according to a second embodiment of the disclosure. Components of the laser unit illustrated in FIG. 25 substantially same as those of the laser unit illustrated in FIG. 3 or FIG. 8 are denoted by the same reference numerals, and any redundant description thereof is omitted. Components of a semiconductor exposure apparatus illustrated in FIG. 25 substantially same as those of the semiconductor exposure apparatus illustrated in FIG. 3 or FIG. 8 are denoted by the same reference numerals, and any redundant description thereof is omitted.

A laser unit 1020 illustrated in FIG. 25 may include a master oscillator and a power oscillator.

The master oscillator may include a first chamber 201, a first motor 241, a first pulse power module 701, the line narrow module 300, and a first output coupling mirror 401. The first motor 241 and the first pulse power module 701 may be included in the first chamber 201. The first chamber 201, the first output coupling mirror 401, and the line narrow module 300 may configure a laser resonator. The first pulse power module 701 may include a first semiconductor switch 711. The first pulse power module 701 may apply a pulsed voltage between a pair of electrodes included in the first chamber 201. The first motor 241 may drive a cross flow fan included in the first chamber 201.

The power oscillator may include a second chamber 202, a second motor 242, a second pulse power module 702, a second output coupling mirror 402, and a partial reflection mirror 405. The second motor 242 and the second pulse power module 702 may be included in the second chamber 202. The second chamber 202, the second output coupling mirror 402, and the partial reflection mirror 405 may configure a laser resonator. The second pulse power module 702 may include a second semiconductor switch 712. The second pulse power module 701 may apply a pulsed voltage between a pair of electrodes included in the second chamber 202. The second motor 242 may drive a cross flow fan included in the second chamber 202.

The laser unit 1020 may include a first high-reflection mirror 403, a second high-reflection mirror 404, a first energy monitor 501, a second energy monitor 502, a first charger 601, and a second charger 602.

The mixed gas of fluorine, argon, and neon contained in the first gas cylinder 3010 may be fed to the first chamber 201 and the second chamber 202 through the laser gas feeder 910. The mixed gas of argon and neon contained in the second gas cylinder 3020 may be fed to the first chamber 201 and the second chamber 202 through the laser gas feeder 910. The gas contained in the first chamber 201 and the gas contained in the second chamber 202 may be exhausted to the inside of the housing 100 through the exhaust unit 930.

When the first semiconductor switch 711 is turned on, a pulsed voltage Vhv1 may be applied between the pair of electrodes included in the first chamber 201 by the first charger 601 and the first pulse power module 701. When the second semiconductor switch 712 is turned on, a pulsed voltage Vhv2 may be applied between the pair of electrodes included in the second chamber 202 by the second charger 602 and the second pulse power module 702.

A wavelength band of the laser light generated by discharge between the pair of electrodes included in the first chamber 201 may be narrowed by the line narrow module 300. The laser light with the wavelength band narrowed by the line narrow module 300 may be outputted from the first output coupling mirror 401. The laser light outputted from the first output coupling mirror 401 may be reflected by the first high-reflection mirror 403 and the second high-reflection mirror 404. A part of the laser light reflected by the first high-reflection mirror 403 and the second high-reflection mirror 404 may enter the second chamber 202 through the partial reflection mirror 405. The light entering the second chamber 202 may be amplified between the partial reflection mirror 405 and the second output coupling mirror 402. The amplified laser light may enter the semiconductor exposure apparatus 2000 through the second output coupling mirror 402.

The first energy sensor 501 may be provided between the first high-reflection mirror 403 and the second high-reflection mirror 404. The first energy sensor 501 may monitor the energy of the laser light outputted from the first chamber 201. The second energy sensor 502 may be provided between the second output coupling mirror 402 and the semiconductor exposure apparatus 2000. The second energy sensor 502 may monitor the energy of the laser light outputted from the second chamber 202. The pressure of the laser gas contained in the first chamber 201 may be measured by a pressure sensor provided in the first chamber 201. The pressure of the laser gas contained in the second chamber 202 may be measured by a pressure sensor provided in the second chamber 202.

Figure 26:
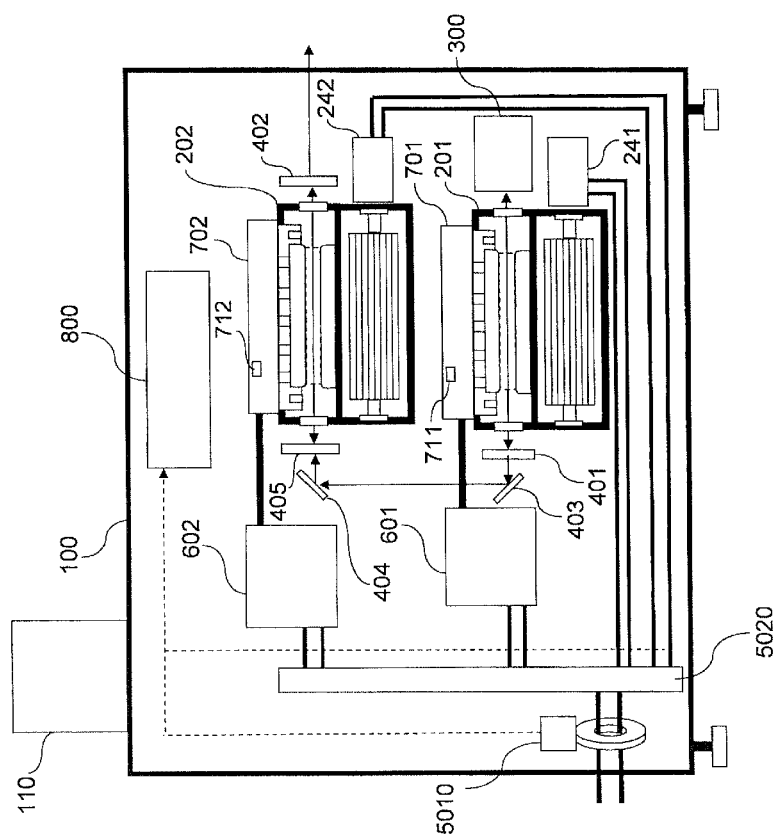
FIG. 26 is a diagram illustrating a configuration of a power system of the laser unit according to the second embodiment of the disclosure.

FIG. 26 is a diagram illustrating a configuration of a power system of the laser unit according to the second embodiment of the disclosure. Components of the laser unit illustrated in FIG. 26 substantially same as those of the laser unit illustrated in FIG. 4 or FIG. 25 are denoted by the same reference numerals, and any redundant description thereof is omitted. Components of a semiconductor exposure apparatus illustrated in FIG. 26 substantially same as those of the semiconductor exposure apparatus illustrated in FIG. 4 or FIG. 25 are denoted by the same reference numerals, and any redundant description thereof is omitted.

In the power system of the laser unit 1020, the first motor 241, the second motor 242, the first charger 601, the second charger 602, the laser controller 800, and other devices (not illustrated) may be coupled to a power source (not illustrated). The other devices may include a control section as with the gas controller 810 and a system retaining electric power during standby of the laser unit 1020. The first motor 241, the second motor 242, the first charger 601, the second charger 602, the laser controller 800, and the other devices may be fed with electric power from the power source. The first motor 241, the second motor 242, the first charger 601, and the second charger 602 may be fed with electric power from the power source through, for example, a terminal board 5020.

The electric power fed from the power source to the first motor 241, the second motor 242, the first charger 601, the second charger 602, the laser controller 800, and the other devices may be measured by the wattmeter 5010.

The electric power fed from the power source to the first motor 241, the second motor 242, the first charger 601, the second charger 602, the laser controller 800, and the other devices may be calculated by the laser controller 800.

The total electric energy Wh consumed by the laser unit 1020 may be calculated based on electric energy Whm1 consumed by the first motor 241, electric energy Whm2 consumed by the second motor 242, electric energy Whc1 consumed by the first charger 601, electric energy Whc2 consumed by the second charger 602, and the electric energy Wh1 consumed by the laser controller 800 and the other devices. The total electric energy Wh consumed by the laser unit 1010 may be calculated according to an expression of Wh=Whm1+Whm2+Whc1+Whc2+Wh1.

The electric energy Whm1 consumed by the first motor 241 and the electric energy Whm2 consumed by the second motor 242 may be calculated according to the following expressions:

$$Em1=\alpha1\cdot P1+\beta1$$

$$Whm1=Em1\cdot Hm$$

$$Em2=\alpha2\cdot P2+\beta2$$

$$Whm2=Em2\cdot Hm$$

where P1 may be the pressure of the laser gas in the first chamber 201, P2 may be the pressure of the laser gas in the second chamber 202, $\alpha1$ may be a gas pressure coefficient of the first chamber 201, $\alpha2$ may be a gas pressure coefficient of the second chamber 202, $\beta1$ may be an offset constant of the first chamber 201, $\beta2$ may be an offset constant of the second chamber 202, Em1 may be electric power consumed by the first motor 241, Em2 may be electric power consumed by the second motor 242, and Hm may be operation time of the first motor 241 and the second motor 242.

The gas pressure coefficients $\alpha1$ and $\alpha2$ and the offset constants $\beta1$ and $\beta2$ each may be measured in advance or each may be a setting value. The gas pressure coefficients $\alpha1$ and $\alpha2$ and the offset constants $\beta1$ and $\beta2$ may be stored in a memory (not illustrated) included in the laser controller 800. The laser controller 800 may read $\alpha1$, $\alpha2$, $\beta1$, and $\beta2$ from the memory.

The electric energy Whc1 consumed by the first charger 601 and the electric energy Whc2 consumed by the second charger 602 may be calculated in the following manner.

The discharge energy Ed1 of one pulse of the first charger 601 and the discharge energy Ed2 of one pulse of the second charger 602 may be calculated according to the following expressions:

$$Ed1=a1(Vhv1)^2+b1(Vhv1)+c1$$

$$Ed2=a2(Vhv2)^2+b2(Vhv2)+c2$$

where Vhv1 may be the charged voltage to be applied between the pair of electrodes in the first chamber 201, Vhv2 may be the charged voltage to be applied between the pair of electrodes in the second chamber 202, and a1, a2, b1, b2, c1, and c2 each may be a predetermined coefficient.

The predetermined coefficients a1, a2, b1, b2, c1, and c2 each may be measured in advance or each may be a setting value. The predetermined coefficients a1, a2, b1, b2, c1, and c2 may be stored in a memory (not illustrated) in the laser controller 800. The laser controller 800 may read out the predetermined coefficients a1, a2, b1, b2, c1, and c2 from the memory.

The electric energy Whc1 consumed by the first charger 601 and the electric energy Whc2 consumed by the second charger 602 may be calculated with use of a conversion factor $\gamma$ according to the following expressions:

$$Whc1=\gamma\cdot\Sigma Ed1$$

$$Whc2=\gamma\cdot\Sigma Ed2$$

where $\Sigma Ed1$ may be an accumulated value of the discharge energy Ed1 of the plurality of pulses of the first charger 601, $\Sigma Ed2$ may be an accumulated value of the discharge energy Ed2 of the plurality of pulses of the second charger 602, and $\gamma$ may be $1/3600000$ kWh/J.

The electric energy Wh1 consumed by the laser controller 800 and the other devices may be calculated according to an expression of $Wh1=E1\cdot H1$, where E1 may be the electric power consumed by the laser controller 800 and the other devices and H1 may be a time period from start to end of calculation of the electric power consumed by the laser controller 800 and the other devices. H1 may be a fixed value independent of the operation state of the laser unit 1020.

The electric energy Wh consumed by the laser unit 1020 may be calculated in such a manner.

The electric power fed from the power source to the first motor 241, the second motor 242, the first charger 601, the second charger 602, the laser controller 800, and the other devices may be controlled by the laser controller 800.

Figure 27:
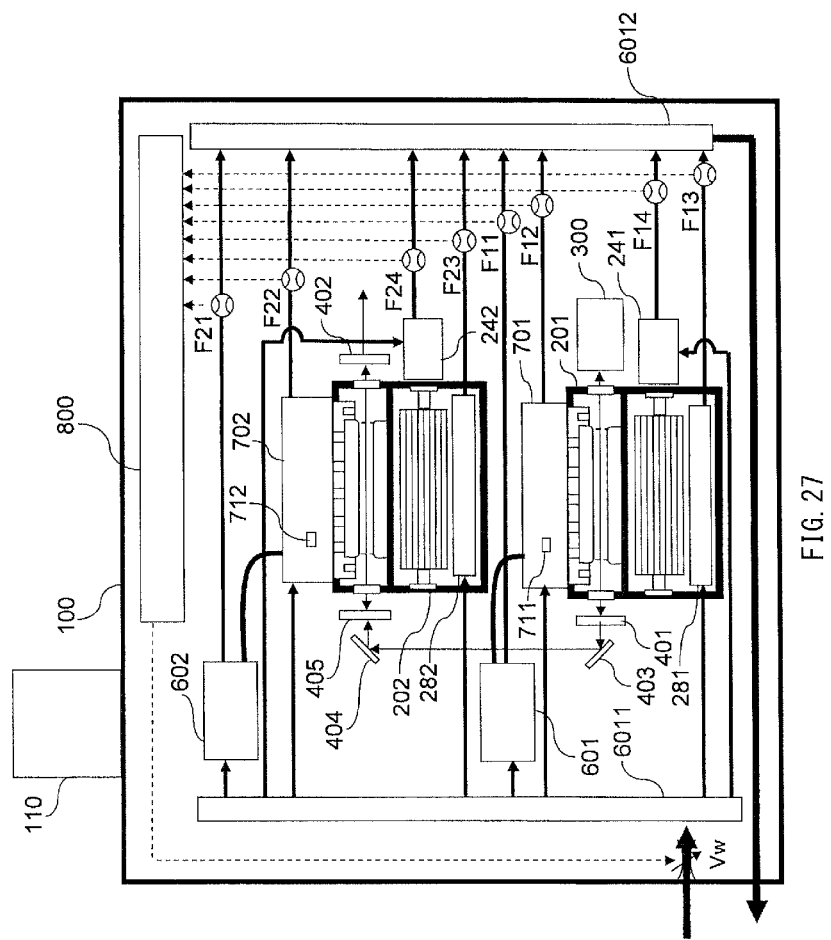
FIG. 27 is a diagram illustrating a configuration of a cooling system of the laser unit according to the second embodiment of the disclosure.

FIG. 27 is a diagram illustrating a configuration of a cooling system of the laser unit according to the second embodiment of the disclosure. Components of the laser unit illustrated in FIG. 27 substantially same as those of the laser unit illustrated in FIG. 5 or FIG. 25 are denoted by the same reference numerals, and any redundant description thereof is omitted. Components of a semiconductor exposure apparatus illustrated in FIG. 27 substantially same as those of the semiconductor exposure apparatus illustrated in FIG. 5 or FIG. 25 are denoted by the same reference numerals, and any redundant description thereof is omitted.

In the cooling system of the laser unit 1020, the first motor 241, the second motor 242, a first heat exchanger 281, a second heat exchanger 282, the first charger 601, the second charger 602, the first pulse power module 701, and the second pulse power module 702 may be coupled to a cooling water tank (not illustrated) through a first manifold 6011, a second manifold 6012, and piping. The first heat exchanger 281 may be provided in the first chamber 201, and the second heat exchanger 282 may be provided in the second chamber 202. The cooling water may be fed from the cooling water tank to the first motor 241, the second motor 242, the first heat exchanger 281, the second heat exchanger 282, the first charger 601, the second charger 602, the first pulse power module 701, and the second pulse power module 702 through the first manifold 6011 and the piping. The first motor 241, the second motor 242, the first heat exchanger 281, the second heat exchanger 282, the first charger 601, the second charger 602, the first pulse power module 701, and the second pulse power module 702 may be cooled by the cooling water. The cooling water fed to the first motor 241, the second motor 242, the first heat exchanger 281, the second heat exchanger 282, the first charger 601, the second charger 602, the first pulse power module 701, and the second pulse power module 702 may be returned to the cooling water tank through the second manifold 6012 and the piping.

The flow rate of the cooling water fed to each of the first motor 241, the second motor 242, the first heat exchanger 281, the second heat exchanger 282, the first charger 601, the second charger 602, the first pulse power module 701, and the second pulsed poser module 702 may be adjusted by a flow-rate control valve Vw provided in the piping. The flow-rate control valve Vw may be controlled by the laser controller 800.

The flow rate of the cooling water passing through the first charger 601 may be measured by a flowmeter F11. The flow rate of the cooling water passing through the first pulse power module 701 may be measured by a flowmeter F12. The flow rate of the cooling water passing through the first heat exchanger 281 may be measured by the flowmeter F13. The flow rate of the cooling water passing through the first motor 241 may be measured by the flowmeter F14. The flow rate of the cooling water passing through the second charger 602 may be measured by a flowmeter F21. The flow rate of the cooling water passing through the second pulse power module 702 may be measured by a flowmeter F22. The flow rate of the cooling water passing through the second heat exchanger 282 may be measured by a flowmeter F23. The flow rate of the cooling water passing through the second motor 242 may be measured by a flowmeter F24. The flow rate of the cooling water measured by each of the flowmeter F11, the flowmeter F12, the flowmeter F13, the flowmeter F14, the flowmeter F21, the flowmeter F22, the flowmeter F23, and the flowmeter F24 may be transmitted to the laser controller 800.

The total F(T) of the flow rates of the cooling water flowing through the laser unit 1020 at the time T may be calculated according to an expression of F(T)=F11(T)+F12(T)+F13(T)+F14(T)+F21(T)+F22(T)+F23(T)+F24(T), where F11(T), F12(T), F13(T), F14(T), F21(T), F22(T), F23(T), and F24(T) may be the flow rates of the cooling water measured by the flowmeters F11, F12, F13, F14, F21, F22, F23, and F24, respectively.

Figure 28:
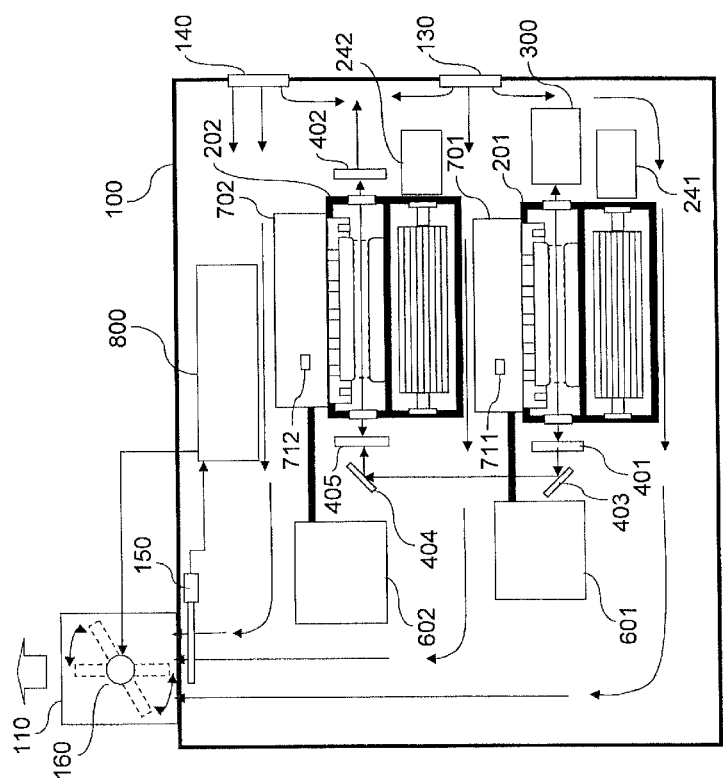
FIG. 28 is a diagram illustrating a configuration to reduce air consumption by ventilation in the laser unit according to the second embodiment of the disclosure.

4.2 Energy Saving and Resource Saving in Laser Unit According to Second Embodiment of Disclosure FIG. 28 is a diagram illustrating a configuration of reducing the air consumption by the ventilation in the laser unit according to the second embodiment of the disclosure. Components of the laser unit illustrated in FIG. 28 substantially same as those of the laser unit illustrated in FIG. 24 or FIG. 25 are denoted by the same reference numerals, and any redundant description thereof is omitted. Components of a semiconductor exposure apparatus illustrated in FIG. 28 substantially same as those of the semiconductor exposure apparatus illustrated in FIG. 24 or FIG. 25 are denoted by the same reference numerals, and any redundant description thereof is omitted.

The ventilation port 110 of the laser unit 1020 may be provided with the automatic butterfly valve 160. The automatic butterfly valve 160 may be coupled to the laser controller 800. The laser controller 800 may control the automatic butterfly valve 160, based on the electric power of the laser unit 1020. Controlling the automatic butterfly valve 160 may adjust the flow rate of the air by the ventilation in the laser unit 1020. The flow rate of the air by the ventilation in the laser unit 1020 may be so adjusted as to be proportional to the electric power of the laser unit 1020. Controlling the automatic butterfly valve 160 may reduce the air consumption by the ventilation in the laser unit 1020.

Figure 29:
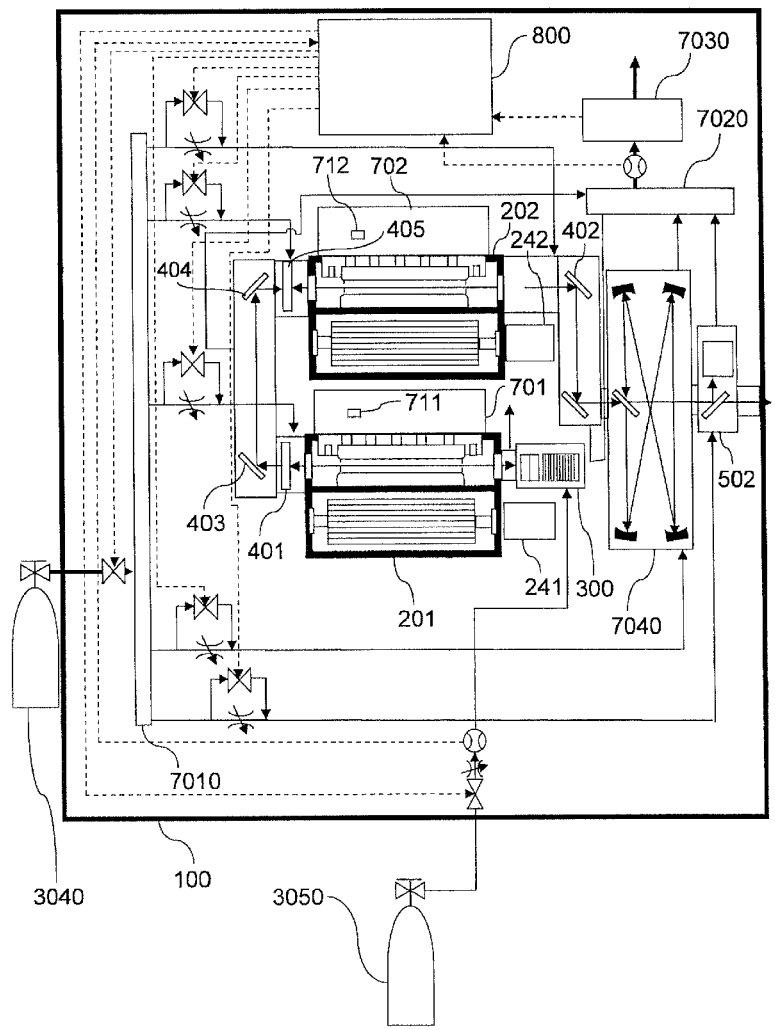
FIG. 29 is a diagram illustrating a configuration of a purge gas system of the laser unit according to the second embodiment of the disclosure.

FIG. 29 is a diagram illustrating a configuration of a purge gas system of the laser unit according to the second embodiment of the disclosure. Components of the laser unit illustrated in FIG. 29 substantially same as those of the laser unit illustrated in FIG. 6 or FIG. 25 are denoted by the same reference numerals, and any redundant description thereof is omitted. Components of a semiconductor exposure apparatus illustrated in FIG. 29 substantially same as those of the semiconductor exposure apparatus illustrated in FIG. 6 or FIG. 25 are denoted by the same reference numerals, and any redundant description thereof is omitted.

The purge gas system of the laser unit 1020 may include the fourth gas cylinder 3040 containing nitrogen gas and the fifth gas cylinder 3050 containing helium gas.

The nitrogen gas may be fed to the first chamber 201, the second chamber 202, the second energy monitor 502, and an optical pulse stretcher (OPS) 7040 through a first gas manifold 7010 and piping. The nitrogen gas may be exhausted into the housing 100 through the first chamber 201 and a second gas manifold 7020. The first chamber 201, the second chamber 202, the second energy monitor 502, and the optical pulse stretcher 7040 may be cleaned by the nitrogen gas.

The optical pulse stretcher 7040 may increase the pulse width of the laser light outputted from the laser unit 1020. The optical pulse stretcher 7040 may include a half mirror and a mirror to allow the laser light passing through the half mirror and the laser light reflected by the half mirror to include optical path difference or phase difference.

The helium gas may be fed from the fifth gas cylinder 3050 to the line narrow module 300 through the piping. The helium gas may be exhausted into the housing 100 through the first chamber 201. The line narrow module 300 may be cleaned by the helium gas.

A valve may be provided between the fourth gas cylinder 3040 and the first gas manifold 7010. An automatic nitrogen gas flow-rate adjuster (not illustrated) may be provided between the fourth gas cylinder 3040 and the first gas manifold 7010. The automatic nitrogen gas flow-rate adjuster may be coupled to the laser controller 800 and may be controlled by the laser controller 800. A bypass valve and a nitrogen gas flow-rate adjuster may be provided in each of the piping between the first gas manifold 7010 and the first chamber 201, the piping between the first gas manifold 7010 and the second chamber 202, the piping between the first gas manifold 7010 and the second energy monitor 502, and the piping between the first gas manifold 7010 and the optical pulse stretcher 7040. The flow rate of the nitrogen gas fed from the fourth gas cylinder to each of the first chamber 201, the second chamber 202, the second energy monitor 502, and the optical pulse stretcher 7040 may be adjusted by the valve, the bypass valve, and the nitrogen gas flow-rate adjuster. Adjusting the bypass valve may effectively adjust the flow rate of the nitrogen gas fed from the fourth gas cylinder to each of the first chamber 201, the second chamber 202, the second energy monitor 502, and the optical pulse stretcher 7040. A nitrogen gas flowmeter may be provided in the piping that is provided to exhaust the nitrogen gas into the housing 100 through the second manifold 7020. Alternatively, a nitrogen gas flowmeter may be provided in the piping between the fourth gas cylinder 3040 and the first gas manifold 7010. The flow rate of the nitrogen gas exhausted from the fourth gas cylinder 3040 into the housing 100 may be measured by the nitrogen gas flowmeter.

A valve and a helium gas flow-rate adjuster may be provided in the piping between the fifth gas cylinder 3050 and the line narrow module 300. The flow rate of the helium gas fed from the fifth gas cylinder 3050 to the line narrow module 300 may be adjusted by the valve and the helium gas flow-rate adjuster. A helium gas flowmeter may be provided in the piping between the fifth gas cylinder 3050 and the line narrow module 300. The flow rate of the helium gas fed from the fifth gas cylinder 3050 to the line narrow module 300 may be measured by the helium gas flowmeter.

The valve provided in each of the piping between the fourth gas cylinder 3040 and the first chamber 201, the piping between the fourth gas cylinder 3040 and the second chamber 202, the piping between the fourth gas cylinder 3040 and the second energy monitor 502, and the piping between the fourth gas cylinder 3040 and the optical pulse stretcher 7040, and the valve provided in the piping between the fifth gas cylinder 3050 and the line narrow module 300 may be coupled to the laser controller 800 and may be controlled by the laser controller 800. The flow rate of the nitrogen gas measured by the nitrogen gas flowmeter may be transmitted to the laser controller 800. The flow rate of the helium gas measured by the helium gas flowmeter may be transmitted to the laser controller 800.

An oxygen concentration meter 7030 may be provided in the piping that exhausts the nitrogen gas into the housing 100 through the second manifold 7020. The oxygen concentration meter 7030 may be provided to measure concentration of oxygen gas that is contained as impurity in the nitrogen gas exhausted into the housing 100 through the second manifold 7020. The concentration of the oxygen gas contained as impurity in the nitrogen gas may be transmitted to the laser controller 800. Adjusting one or both of the valve for the nitrogen gas and the nitrogen gas flow-rate adjuster may control the concentration of the oxygen gas as the impurity measured by the oxygen concentration meter 7030.

Figure 30A:
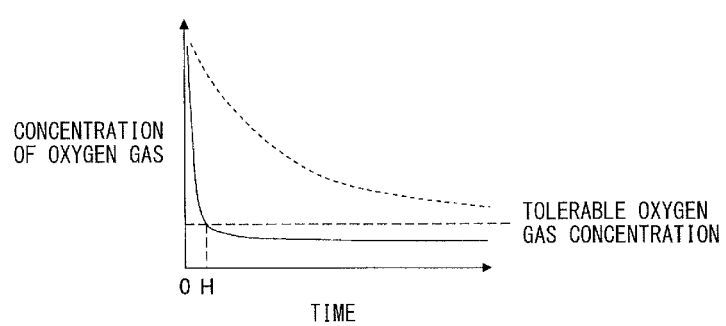
FIG. 30A is a diagram illustrating relationship between concentration of oxygen gas as impurity contained in nitrogen gas and a nitrogen gas feeding time in the laser unit according to the second embodiment of the disclosure.

FIG. 30A is a diagram illustrating relationship between nitrogen-gas feeding time and the concentration of the oxygen gas contained as the impurity in the nitrogen gas in the laser unit according to the second embodiment of the disclosure. In FIG. 30A, a dashed line illustrates a case where the bypass valve is closed in the laser unit 1020. In FIG. 30A, a solid line illustrates a case where the bypass valve is opened in the laser unit 1020. As illustrated in FIG. 30A, when the nitrogen-gas feeding time is increased, the concentration of the oxygen gas contained as impurity in the nitrogen gas may be decreased. As illustrated in FIG. 30A, the concentration of the oxygen gas in the case where the bypass valve is opened may be decreased in time shorter than that in the case where the bypass valve is closed. A time H in FIG. 30A may indicate a time from feeding start of the nitrogen gas until the concentration of the oxygen gas contained as impurity in the nitrogen gas reaches tolerable oxygen gas concentration (maximum concentration of the oxygen gas that may be contained as impurity in the nitrogen gas). The tolerable oxygen gas concentration may be, for example, 10 ppm.

Figure 30B:
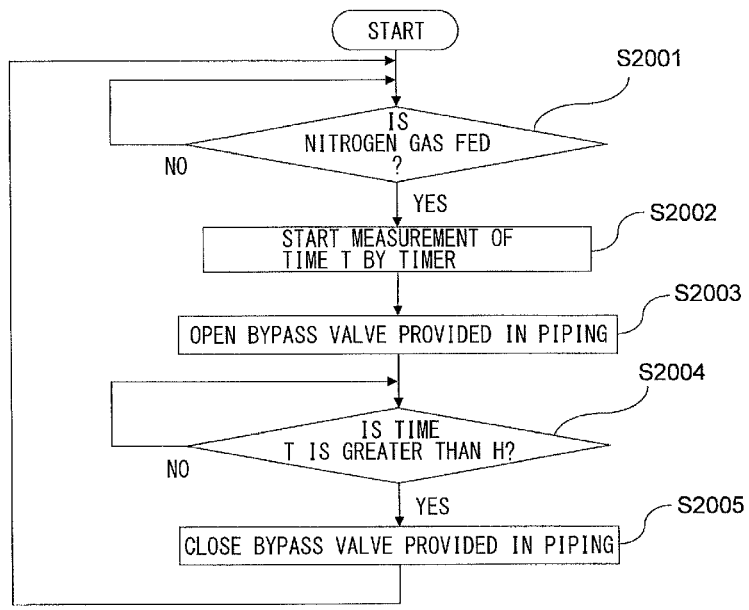
FIG. 30B is a diagram illustrating a first example of a method of reducing nitrogen gas consumption in the laser unit according to the second embodiment of the disclosure.

FIG. 30B is a diagram illustrating a first example of a method of reducing the nitrogen gas consumption in the laser unit according to the second embodiment of the disclosure.

At step S2001, the laser controller 800 may determine whether to feed the nitrogen gas to the laser unit 1020. When feeding the nitrogen gas to the laser unit 1020, the laser controller 800 may use the valve and the nitrogen gas flow-rate adjuster that are provided in the piping, to feed the nitrogen gas to the laser unit 1020, and the laser controller 800 may proceed to step S2002. When not feeding the nitrogen gas to the laser unit 1020, the laser controller 800 may repeat the process at the step S2001.

At step S2002, the laser controller 800 may reset the time T of the timer (not illustrated) included in the laser controller 800, and may start measurement of the time T by the timer.

At step S2003, the laser controller 800 may open the bypass valve provided in the piping.

At step S2004, the laser controller 800 may determine whether the time T measured by the timer is greater than the predetermined time H. When the time T measured by the timer is greater than the predetermined time H, the laser controller 800 may proceed to step S2005. When the time T measured by the timer is equal to or shorter than the predetermined time H, the laser controller 800 may repeat the step S2004.

At step S2005, the laser controller 800 may close the bypass valve provided in the piping.

The amount of the nitrogen gas to be fed to the laser unit 1020 may be increased by opening the bypass valve until the elapsed time from the feeding of the nitrogen gas in the laser unit 1020 reaches the predetermined time H. The amount of the nitrogen gas to be fed to the laser unit 1020 may be increased by opening the bypass valve until the concentration of the oxygen gas contained as impurity in the nitrogen gas reaches the tolerable oxygen gas concentration. The nitrogen gas may be fed to the laser unit 1020 while the bypass valve is opened to allow the concentration of the oxygen gas contained as impurity in the nitrogen gas to be more effectively decreased.

When the elapsed time after the feeding start of the nitrogen gas in the laser unit 1020 reaches the predetermined time H, the amount of the nitrogen gas to be fed to the laser unit 1020 may be decreased by closing the bypass valve. When the concentration of the oxygen gas contained as impurity in the nitrogen gas reaches the tolerable oxygen gas concentration, the amount of the nitrogen gas to be fed to the laser unit 1020 may be decreased by closing the bypass valve. The nitrogen gas may be fed to the laser unit 1020 while the bypass valve is closed to allow the concentration of the oxygen gas contained as impurity in the nitrogen gas to be equal to or less than the tolerable oxygen gas concentration.

In place of the bypass valve provided in the laser unit 1020, an automatic nitrogen gas flow-rate adjuster may be provided between the fourth gas cylinder 3040 and the first gas manifold 7010. The automatic nitrogen gas flow-rate adjuster may be coupled to the laser controller 800 and may be controlled by the laser controller 800. The amount of the nitrogen gas to be fed to the laser unit 1020 may be increased by the automatic nitrogen gas flow-rate adjuster until the clasped time from the feeding start of the nitrogen gas in the laser unit 1020 reaches the predetermined time H.

The nitrogen gas consumption in the laser unit according to the second embodiment of the disclosure may be reduced in such a manner.

Figure 30C:
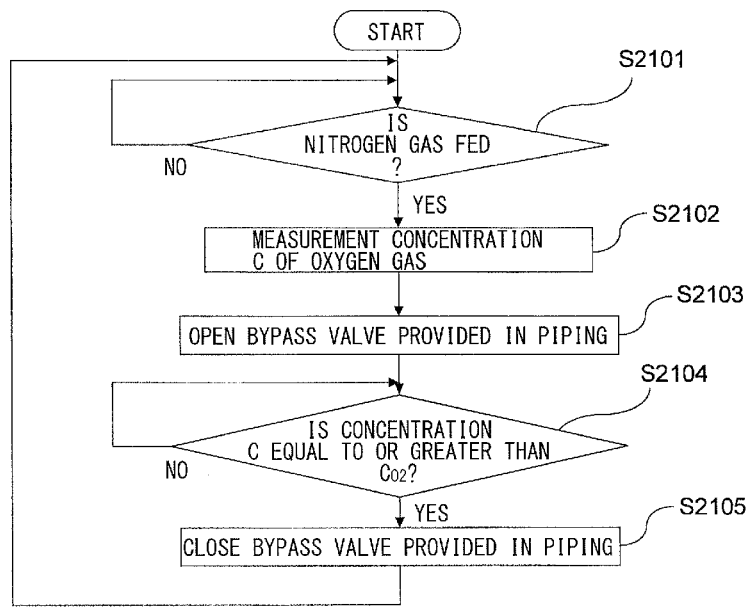
FIG. 30C is a diagram illustrating a second example of the method of reducing the nitrogen gas consumption in the laser unit according to the second embodiment of the disclosure.

FIG. 30C is a diagram illustrating a second example of the method of reducing the nitrogen gas consumption in the laser unit according to the second embodiment of the disclosure.

At step S2101, the laser controller 800 may determine whether to feed the nitrogen gas to the laser unit 1020. When feeding the nitrogen gas to the laser unit 1020, the laser controller 800 may use the valve and the nitrogen gas flow-rate adjuster that are provided in the piping, to feed the nitrogen gas to the laser unit 1020, and the laser controller 800 may proceed to step S2102. When not feeding the nitrogen gas to the laser unit 1020, the laser controller 800 may repeat the process at step S2101.

At the step S2102, the laser controller 800 may measure the concentration C of the oxygen gas contained as impurity in the nitrogen gas with use of the oxygen concentration meter 7030.

At step S2103, the laser controller 800 may open the bypass valve provided in the piping.

At step S2104, the laser controller 800 may determine whether or not the measured value of the concentration C of the oxygen gas contained as impurity in the nitrogen gas is equal to or greater than the tolerable oxygen gas concentration. When the measured value of the concentration C of the oxygen gas contained as impurity in the nitrogen gas is equal to or greater than tolerable oxygen gas concentration $C_{O2}$, the laser controller 800 may proceed to step S2105. When the measured value of the concentration C of the oxygen gas contained as impurity in the nitrogen gas is smaller than the tolerable oxygen gas concentration $C_{O2}$, the laser controller 800 may repeat the step S2104.

At step S2105, the laser controller 800 may close the bypass valve provided in the piping.

The amount of the nitrogen gas to be fed to the laser unit 1020 may be increased by opening the bypass valve until the measured value of the concentration of the oxygen gas contained as impurity in the nitrogen gas reaches the tolerable oxygen gas concentration. The nitrogen gas may be fed to the laser unit 1020 while the bypass valve is opened to allow the concentration of the oxygen gas contained as impurity in the nitrogen gas to be more effectively decreased.

When the measured value of the concentration of the oxygen gas contained as impurity in the nitrogen gas reaches the tolerable oxygen gas concentration, the amount of the nitrogen gas to be fed to the laser unit 1020 may be decreased by closing the bypass valve. The nitrogen gas may be fed to the laser unit 1020 while the bypass valve is closed to allow the concentration of the oxygen gas contained as impurity in the nitrogen gas to be equal to or less than the tolerable oxygen gas concentration.

In place of the bypass valve provided in the laser unit 1020, an automatic nitrogen gas flow-rate adjuster may be provided between the fourth gas cylinder 3040 and the first gas manifold 7010. The automatic nitrogen gas flow-rate adjuster may be coupled to the laser controller 800 and may be controlled by the laser controller 800. The amount of the nitrogen gas to be fed to the laser unit 1020 may be increased by the automatic nitrogen gas flow-rate adjuster until the measured value of the concentration of the oxygen gas contained as impurity in the nitrogen gas reaches the tolerable oxygen gas concentration.

The nitrogen gas consumption in the laser unit according to the second embodiment of the disclosure may be reduced in such a manner.

5. Others 5.1 Pulse Power Module

Figure 31:
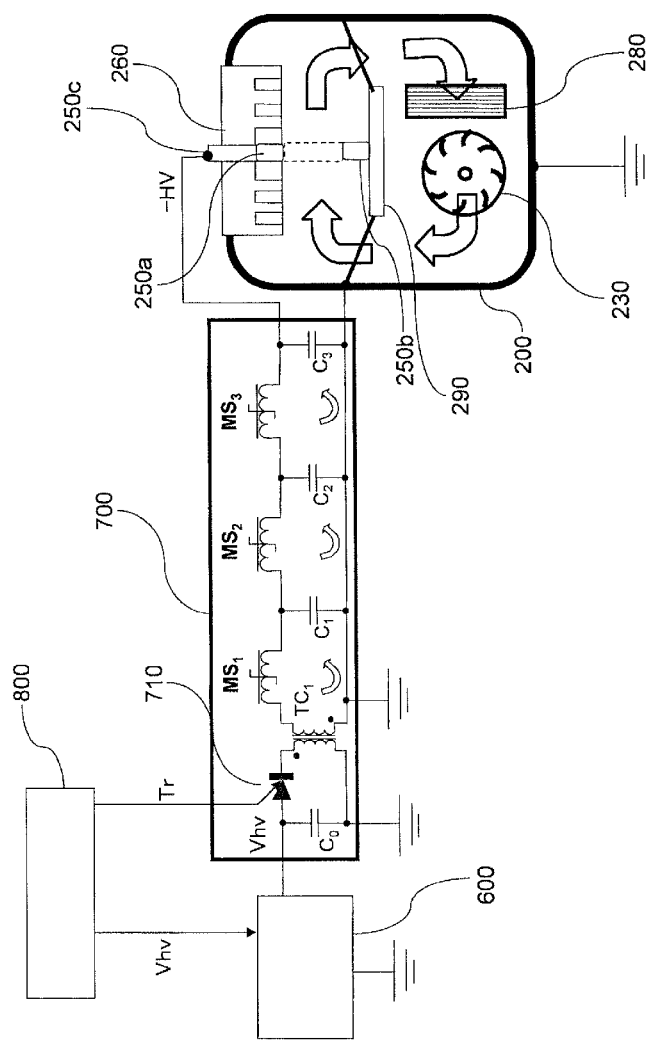
FIG. 31 is a diagram illustrating the pulse power module according to any of the embodiments of the disclosure.

FIG. 31 is a diagram illustrating a pulse power module according to any of the embodiments of the disclosure.

The pulse power module 700 may be coupled to the charger 600 and the chamber 200. The pulse power module 700 and the charger 600 may be coupled to the laser controller 800.

When receiving a charge signal from the laser controller 800, the charger 600 may apply the charged voltage Vhv to a charging capacitor included in the pulse power module 700. The charging capacitor may include a capacitance $C_0$. The energy to be stored, by the charged voltage Vhv from the charger 600, in the charging capacitor including the capacitance $C_0$ may be $(\frac{1}{2})C_0(Vhv)^2$. The discharge energy per one pulse in the chamber 200 may be $(\frac{1}{2})C_0(Vhv)^2$.

Transmitting the trigger Tr relating to the discharge from the laser controller 800 to the semiconductor switch included in the pulse power module 700 may generate the pulsed voltage.

The pulse power module 700 may include, in addition to the semiconductor switch 710 and the charging capacitor including the capacitance $C_0$, a transformer $TC_1$, magnetic switches $MS_1$, $MS_2$, and $MS_3$, and capacitors $C_1$, $C_2$, and $C_3$. The transformer $TC_1$, the magnetic switches $MS_1$, $MS_2$, and $MS_3$, and the capacitors $C_1$, $C_2$, and $C_3$ included in the pulse power module 700 may configure a magnetic pulse compression circuit. The pulse width of the pulsed voltage may be compressed by the magnetic pulse compression circuit in the pulse power module 700.

The pulsed voltage with the compressed pulse width may be applied to a current introduction terminal 250c and an electrode holder 290 that are included in the chamber 200. The pulsed voltage with the compressed pulse width may be applied between the first electrode 250a and the second electrode 250b. The first electrode 250a may be coupled to the current introduction terminal 250c and may be shaped by an electric insulator 260. The second electrode 250b may be coupled to the electrode holder 290. The discharge of the laser gas fed to the clearance between the first electrode 250a and the second electrode 250b may be caused by the pulsed voltage applied between the first electrode 250a and the second electrode 250b. The laser light may be caused by the discharge of the laser gas.

The laser gas fed to the clearance between the first electrode 250a and the second electrode 250b may be circulated in the chamber 200 by the cross flow fan 230. The laser gas circulated by the cross flow fan 230 may be cooled by the heat exchanger 280.

5.2 Control Section (Controller)

Figure 32:
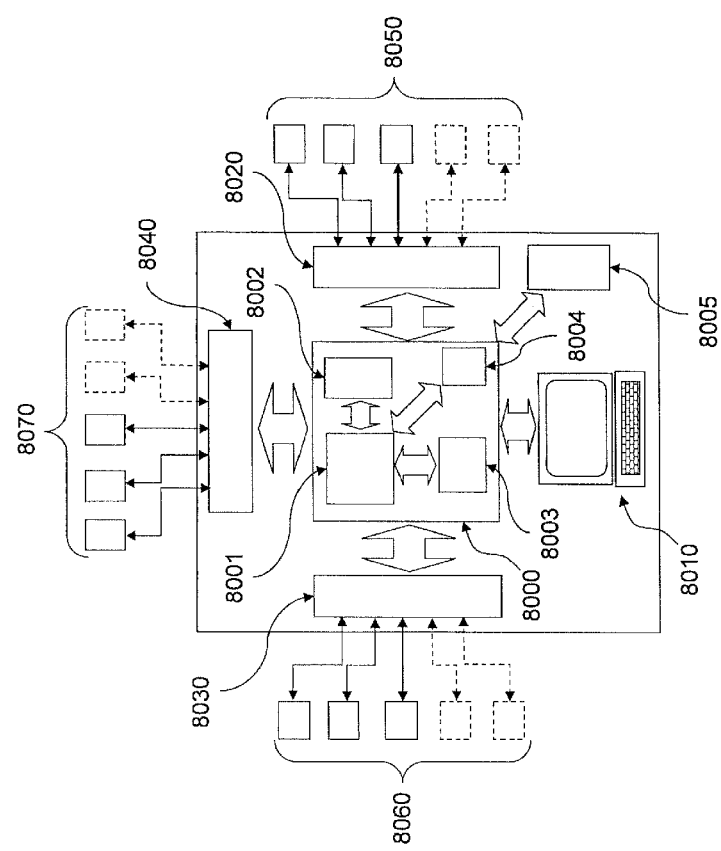
FIG. 32 is a diagram illustrating the controller according to any of the embodiments of the disclosure.

FIG. 32 is a diagram illustrating the controllers according to any of the embodiments of the disclosure.

Each controller according to any of the embodiments of the disclosure may be configured of a general-purpose control apparatus such as a computer and a programmable controller. For example, each controller may be configured as follows.

<Configuration>

Each controller may include a processing section 8000, a storage memory 8005, a user interface 8010, a parallel input/output (I/O) controller 8020, a serial I/O controller 8030, and an analog-to-digital (A/D) and digital-to-analog (D/A) converter 8040. The storage memory 8005, the user interface 8010, the parallel I/O controller 8020, the serial I/O controller 8030, and the A/D and D/A converter 8040 may be coupled to the processing section 8000. The processing section 8000 may include a central processing unit (CPU) 8001, a memory 8002, a timer 8003, and a graphics processing unit (GPU) 8004. The memory 8002, the timer 8003, and the GPU 8004 may be coupled to the CPU 8001.

<Operation>

The processing section 8000 may load programs stored in the storage memory 8005. The processing section 800 may execute the loaded programs, may read data from the storage memory 8005 according to the execution of the programs, and may write data in the storage memory 8005.

The parallel I/O controller 8020 may be coupled to devices operable to perform communication through parallel I/O ports. The parallel I/O controller 8020 may control communication by a digital signal through the parallel I/O port that is performed in the execution of the programs by the processing section 8000.

The serial I/O controller 8030 may be coupled to devices operable to perform communication through serial I/O ports. The serial I/O controller 8030 may control communication by a digital signal through the serial I/O ports that is performed in the execution of the programs by the processing section 8000.

The A/D and D/A converter 8040 may be coupled to devices operable to perform communication through analog ports. The A/D and D/A converter 8040 may control communication by an analog signal through the analog ports that is performed in the execution of the programs by the processing section 8000.

The user interface 8010 may provide an operator with display showing a progress of the execution of the programs executed by the processing unit 8000, such that the operator is able to instruct the processing unit 8000 to stop execution of the programs or to execute an interruption routine.

The CPU 8001 of the processing section 8000 may execute arithmetic processing of the programs. The memory 8002 may temporarily hold the programs in the execution process of the programs by the CPU 8001 or may temporarily hold data in the arithmetic process. The timer 8003 may measure time and elapsed time to output the time and the elapsed time to the CPU 8001 according to the execution of the programs. When image data is input to the processing section 8000, the GPU 8004 may process the image data according to the execution of the programs, and may output the processing result to the CPU 8001.

<Connected Devices>

The devices that are coupled to the parallel I/O controller 8020 and are operable to perform communication through the parallel I/O ports may be other controllers, for example.

The devices that are coupled to the serial I/O controller 8030 and are operable to perform communication through the serial I/O ports may be, for example but not limited to, a DC high-voltage power source.

The devices that are coupled to the A/D and D/A converter 8040 and are operable to perform communication through the analog ports may be, for example but not limited to, a pressure sensor.

5.3 Computer-Readable Storage Medium

Figure 33:
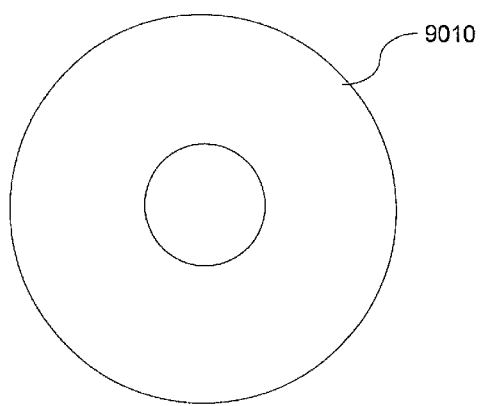
FIG. 33 is a diagram illustrating a computer-readable storage medium according to any of the embodiments of the disclosure.

FIG. 33 is a diagram illustrating a computer-readable storage medium according to any of the embodiments of the disclosure.

In a CD-ROM 9010 serving as the computer-readable storage medium, programs to calculate the energy consumption and the resource consumption in the laser unit according to any of the embodiments of the disclosure and to display the calculated energy consumption and the calculated resource consumption may be recorded. The programs recorded in the CD-ROM 9010 may be loaded and executed by a general-purpose computer. Examples of the computer-readable storage medium may include Floppy (registered trademark) disk, DVD-ROM, BD-ROM, and a hard disk.

The foregoing description is intended to be merely illustrative rather than limiting. It should therefore be appreciated that variations may be made in example embodiments of the disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Also, the singular forms "a", "an", and "the" used in the specification and the appended claims include plural references unless expressly and unequivocally limited to one referent.

What is claimed is:

1. A laser unit comprising:
  a pair of electrodes;
  a fan configured to make flow of gas fed to a clearance between the electrodes;
  a motor configured to rotate the fan;
  a display configured to display one or both of electric power consumed by the laser unit and electric energy consumed by the laser unit; and
  a charger configured to apply a voltage between the electrodes,
  the electric power consumed by the laser unit including one or more of electric power consumed by the charger, electric power consumed by the motor, and a sum of the electric power consumed by the charger and the electric power consumed by the motor,
  the electric energy consumed by the laser unit including one or more of electric energy consumed by the charger, electric energy consumed by the motor, and a sum of the electric energy consumed by the charger and the electric energy consumed by the motor,
  the electric power consumed by the motor being calculated based on pressure of the gas fed to the clearance between the electrodes, and
  the electric energy consumed by the motor being calculated based on the pressure of the gas fed to the clearance between the electrodes.

2. The laser unit according to claim 1, wherein the electric energy consumed by the charger is obtained by integrating the electric energy consumed through applying the voltage to the pair of electrodes.

3. The laser unit according to claim 1, further comprising a standby-power supply configured to supply the laser unit with standby electric power, wherein
  the electric power consumed by the laser unit includes a sum of electric power consumed by the charger, the electric power consumed by the motor, and electric power consumed by the standby-power supply, and
  the electric energy consumed by the laser unit includes a sum of electric energy consumed by the charger, the electric energy consumed by the motor, and electric energy consumed by the standby-power supply.

4. The laser unit according to claim 1, further comprising a controller configured to calculate one or both of the electric power consumed by the laser unit and the electric energy consumed by the laser unit.

5. The laser unit according to claim 4, wherein the controller further controls a flow rate of water cooling at least the charger and the motor, based on one or both of the electric power consumed by the laser unit and the electric energy consumed by the laser unit.

6. The laser unit according to claim 4, wherein the controller further controls a flow rate of air cooling at least the charger and the motor, based on one or both of the electric power consumed by the laser unit and the electric energy consumed by the laser unit.

7. The laser unit according to claim 4, further comprising:
  a laser resonator configured to amplify light resulting from applying the voltage to the pair of electrodes;
  an optical system configured to guide the light amplified by the laser resonator; and
  an oxygen concentration meter configured to measure concentration of oxygen in gas passing through the optical system, wherein
  the controller further controls a flow rate of the gas passing through the optical system, based on the concentration of the oxygen in the gas passing through the optical system.

8. The laser unit according to claim 4, further comprising an energy dispersion measurement device configured to measure energy dispersion of laser light emitted from the laser unit, wherein
  the controller further controls, based on the energy dispersion, composition of the gas fed to the clearance between the electrodes.

* * * * *